US009526342B2

(12) United States Patent
Thuma et al.

(10) Patent No.: US 9,526,342 B2
(45) Date of Patent: Dec. 27, 2016

(54) BLOW MOLDED RESIN FURNITURE HAVING A STABILIZING BOX STRUCTURE

(71) Applicant: Suncast Technologies, LLC, Palm Beach Gardens, FL (US)

(72) Inventors: Michael Thuma, La Grange, IL (US); Torrence Anderson, Overland Park, KS (US); Michael R. Vogler, Oswego, IL (US)

(73) Assignee: Suncast Technologies, LLC, Palm Beach Gardens, FL (US)

( * ) Notice: Subject to any disclaimer, the term of this patent is extended or adjusted under 35 U.S.C. 154(b) by 0 days.

(21) Appl. No.: 14/473,727

(22) Filed: Aug. 29, 2014

(65) Prior Publication Data

US 2015/0130233 A1 May 14, 2015

Related U.S. Application Data

(60) Provisional application No. 61/902,634, filed on Nov. 11, 2013.

(51) Int. Cl.

| A47C 7/62 | (2006.01) |
| A47C 7/00 | (2006.01) |
| A47C 1/14 | (2006.01) |
| A47C 7/54 | (2006.01) |
| A47C 7/56 | (2006.01) |
| B29C 49/00 | (2006.01) |
| A47C 4/02 | (2006.01) |
| A47C 4/03 | (2006.01) |
| A47C 5/12 | (2006.01) |
| A47C 11/00 | (2006.01) |
| A47C 17/86 | (2006.01) |
| B29L 31/44 | (2006.01) |

(52) U.S. Cl.
CPC . *A47C 7/00* (2013.01); *A47C 1/14* (2013.01); *A47C 4/02* (2013.01); *A47C 4/03* (2013.01); *A47C 5/12* (2013.01); *A47C 7/54* (2013.01); *A47C 7/56* (2013.01); *A47C 7/62* (2013.01); *A47C 11/00* (2013.01); *A47C 17/86* (2013.01); *B29C 49/0015* (2013.01); *B29L 2031/44* (2013.01)

(58) Field of Classification Search
CPC ............... A47C 1/14; A47C 4/02; A47C 7/54; A47C 4/03; A47C 5/12; B29L 2031/443
USPC .............................. 297/188.1, 188.09, 440.1, 440.13, 297/440.14, 440.23, 452.65
See application file for complete search history.

(56) References Cited

U.S. PATENT DOCUMENTS

| D161,172 | S | * | 12/1950 | Greene | ....................... 297/188.1 |
| 2,532,863 | A | * | 12/1950 | Taylor | .................... A47C 4/021 206/503 |
| 3,870,366 | A | * | 3/1975 | Rogers | ..................... A47B 3/06 297/440.23 |

(Continued)

FOREIGN PATENT DOCUMENTS

WO WO2011077363 6/2011

*Primary Examiner* — Adriana Figueroa
(74) *Attorney, Agent, or Firm* — McHale & Slavin, P.A.

(57) ABSTRACT

The invention involves a system and method for constructing lawn furniture. The system includes box type beam members as well as a large box structure supported above a ground surface. The box structure provides rigidity and stability to the furniture while also functioning as storage space. The components are formed to ship in a dissembled compact state and snap together with minimal use of fasteners and tools.

11 Claims, 91 Drawing Sheets

(56) References Cited

U.S. PATENT DOCUMENTS

| | | | |
|---|---|---|---|
| 3,887,234 A * | 6/1975 | Curtis | A47C 5/12 248/188.1 |
| 4,883,317 A * | 11/1989 | Davenport | A47D 1/00 297/188.04 |
| 4,919,485 A * | 4/1990 | Guichon | A47C 4/03 297/440.15 |
| D321,613 S * | 11/1991 | Gandy | D6/336 |
| 5,454,331 A * | 10/1995 | Green | A47B 47/042 108/180 |
| 5,718,475 A * | 2/1998 | Watts | A47B 83/02 297/127 |
| 5,902,009 A | 5/1999 | Singh et al. | |
| 5,938,281 A * | 8/1999 | Keils | A47C 11/00 297/118 |
| 6,074,000 A | 6/2000 | Wagner | |
| D427,788 S * | 7/2000 | Paul | D6/336 |
| 6,082,816 A | 7/2000 | Gottlieb et al. | |
| D442,809 S | 5/2001 | de Windt, Jr. et al. | |
| 6,241,312 B1 * | 6/2001 | Watts | A47B 3/14 297/125 |
| 6,386,612 B2 | 5/2002 | Hofmann et al. | |
| D483,190 S * | 12/2003 | Richardson | D6/336 |
| 6,824,029 B2 | 11/2004 | Tuel, Jr. et al. | |
| 6,883,873 B2 * | 4/2005 | Haney | A47C 11/00 297/451.8 |
| 7,028,859 B2 * | 4/2006 | Moon | B65D 11/1873 220/4.28 |
| 7,422,289 B2 * | 9/2008 | Kim | B60N 2/686 297/452.18 |
| 7,530,631 B2 | 5/2009 | Skelly et al. | |
| 7,568,767 B2 * | 8/2009 | Richardson | A47C 4/02 297/440.1 |
| 8,544,944 B1 | 10/2013 | Gelley | |
| 8,684,466 B2 * | 4/2014 | Blair | A47C 13/005 297/440.1 |
| 8,998,316 B2 * | 4/2015 | Naughton | 29/527.1 |
| 2004/0262977 A1 * | 12/2004 | Dibattista | B29C 49/20 297/452.65 |
| 2005/0168041 A1 * | 8/2005 | Glance | B60N 2/68 297/452.18 |
| 2010/0253127 A1 * | 10/2010 | Haimoff | A47C 13/005 297/440.14 |
| 2012/0200126 A1 | 8/2012 | Najjar | |

\* cited by examiner

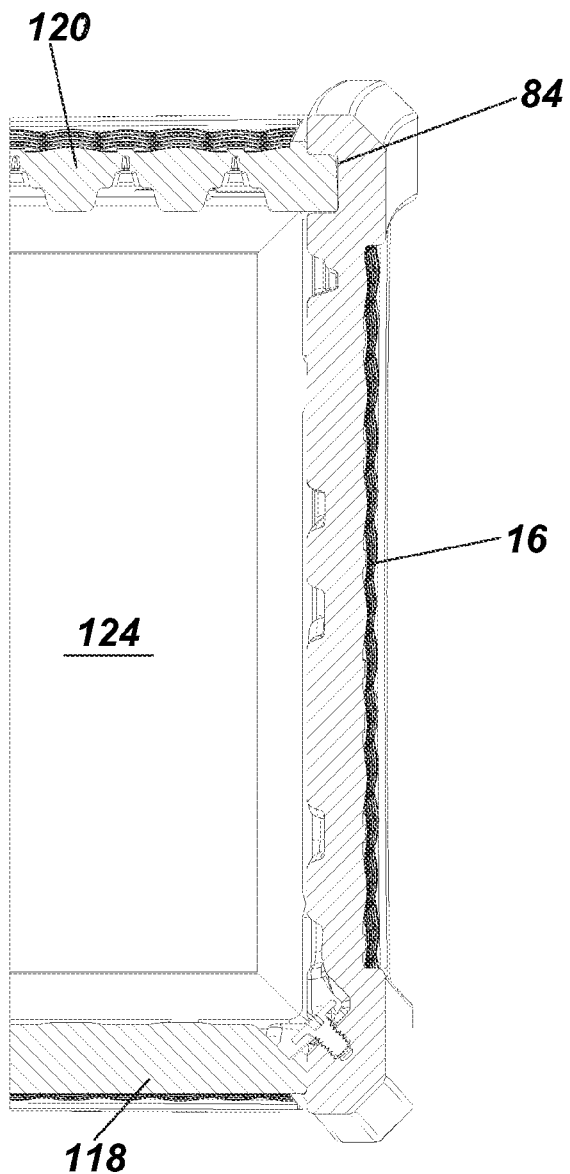
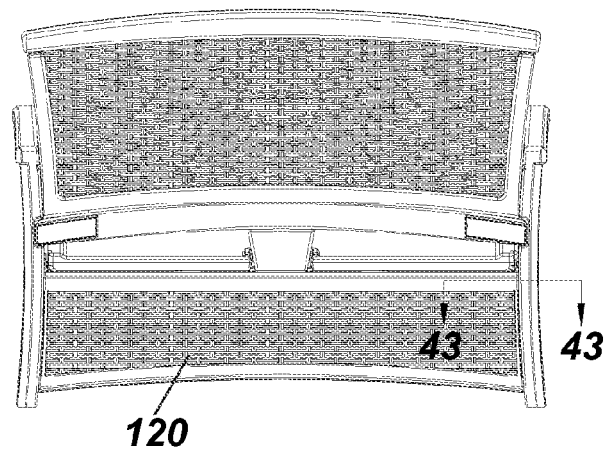
Fig. 42

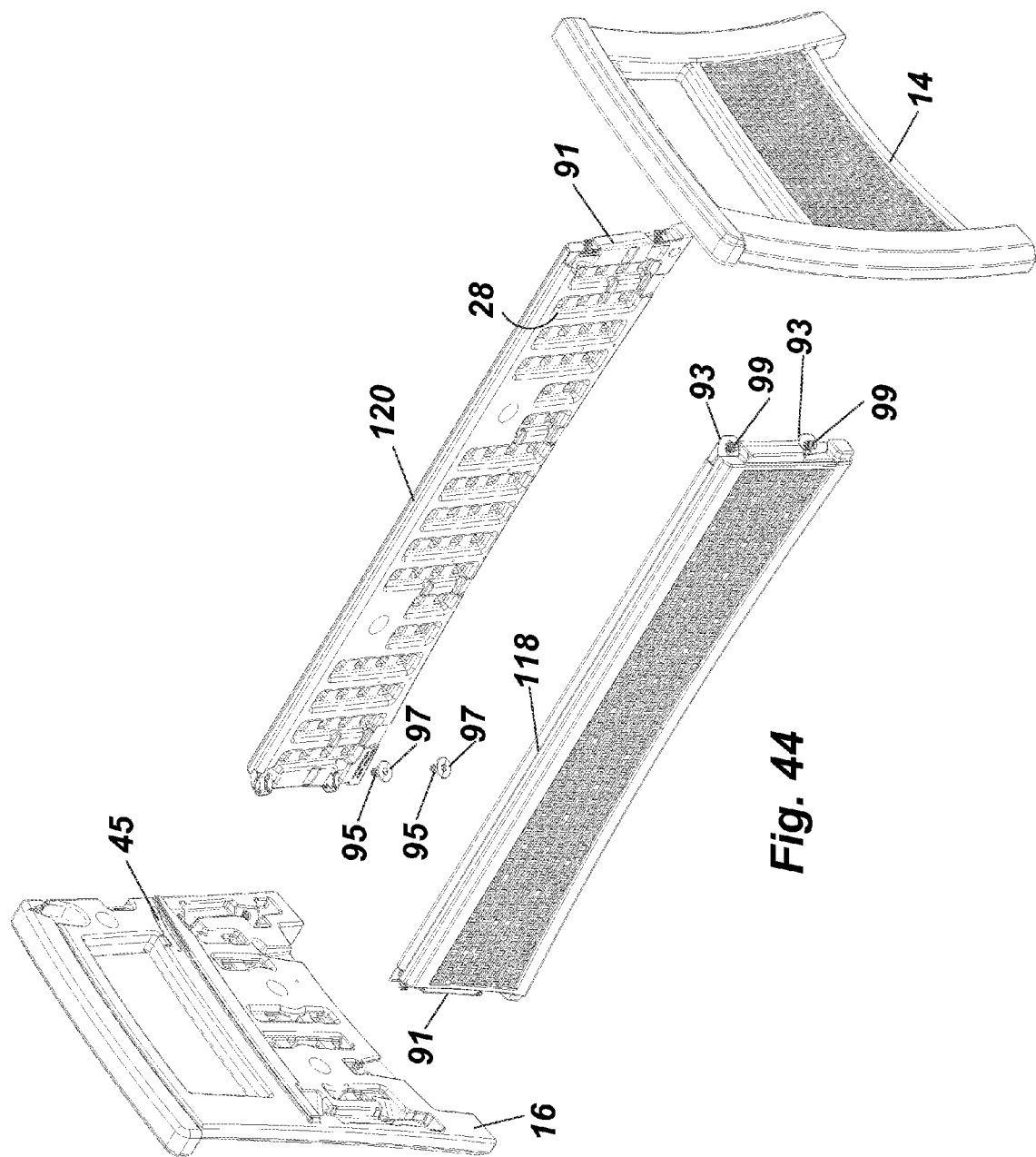

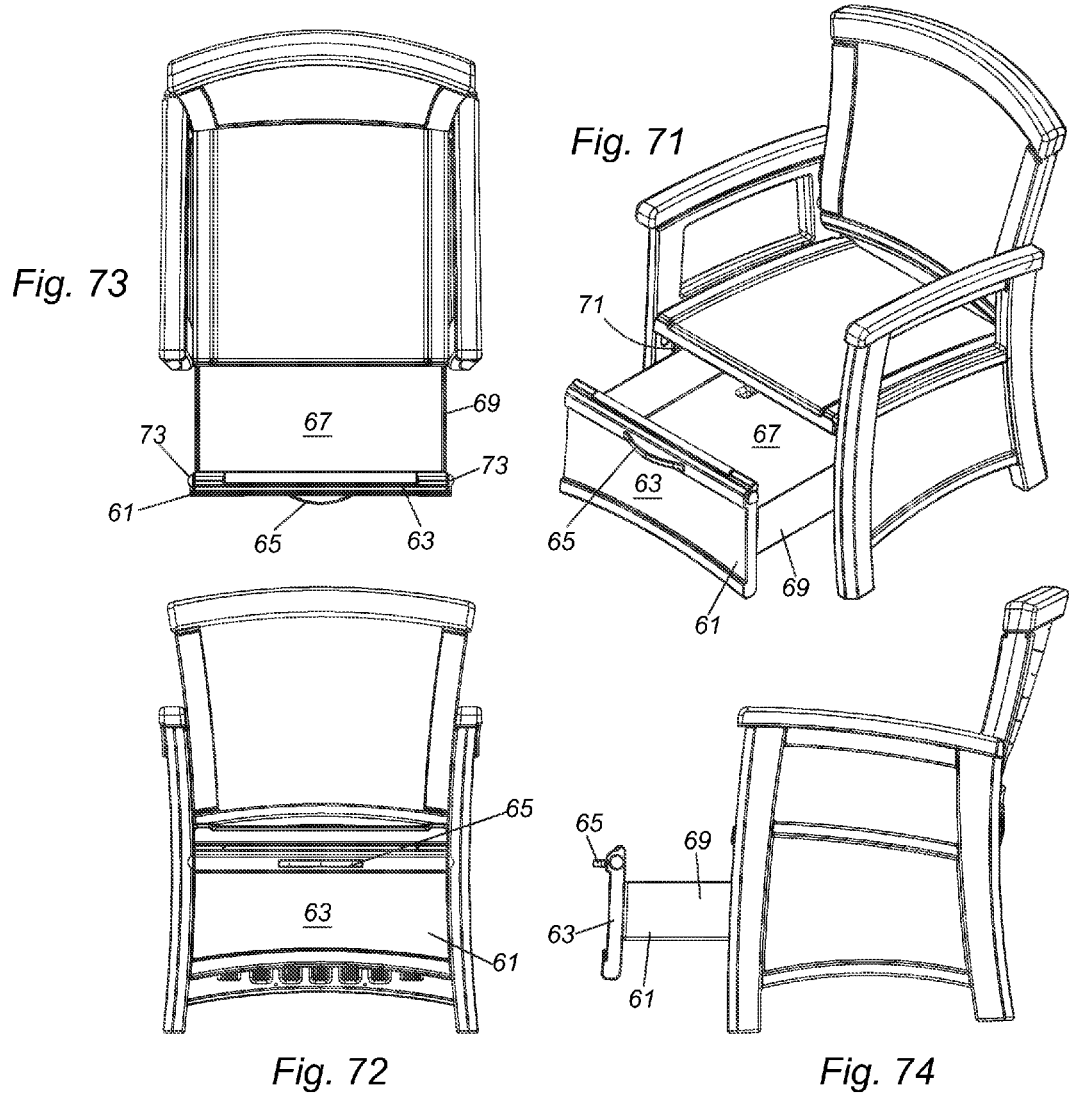

BLOW MOLDED RESIN FURNITURE HAVING A STABILIZING BOX STRUCTURE

RELATED APPLICATIONS

In accordance with 37 C.F.R 1.76, a claim of priority is included in an Application Data Sheet filed concurrently herewith. Accordingly, the present invention claims priority to U.S. Provisional Patent Application No. 61/902,634, filed Nov. 11, 2013, entitled, "BLOW MOLDED RESIN FURNITURE HAVING A STABILIZING BOX STRUCTURE". The contents of each of the above referenced applications are herein incorporated by reference in its entirety.

FIELD OF INVENTION

The present invention generally relates to resin furniture, and more particularly to a blow molded box structure for providing structural rigidity to resin furniture, which may also be utilized for storage.

BACKGROUND INFORMATION

Resin furniture, such as patio furniture, is known in the art. Resin furniture is typically injection or blow molded as unitary structures to include at least four elongated legs that extend downwardly from a base seat member. A pair of arms is integrally molded to the legs to secure the back member in position. These structures typically are formed as open L-shaped beams, and not enclosed box structures, to allow for nesting of finished assemblies. A drawback to this construction relates to rigidity and stability. The open beams and the elongated legs create a structure that has very limited weight capacity. In addition, the structures feel unstable by allowing flexure of the structure, which creates uneasiness and a feeling that the structure may collapse to those using the furniture.

It is also known to provide storage within a piece of furniture. Typically, furniture with storage is provided in the form of a deck box that resembles a large bench. In a deck box, storage is provided in the form of a large box, which sets directly on the ground surface and a pivoting lid with sufficient strength to allow a person or two to sit on the lid. A downside to this type of seating is the requirement of a large area of very flat surface for the box structure. Placing the box structure on uneven ground can cause pivoting or tipping of the structure when users sit on the top surface. In addition, the deck boxes are not sufficiently portable for use as patio furniture where users move furniture into groupings, which are often changed.

Thus, there is a need in the art for patio furniture that is molded to include additional rigidity provided by box beam members. The furniture should also include a large stabilizing box structure that provides stability to the furniture and doubles as storage space. In addition, the box structure should be supported above the ground surface by a plurality of legs, which allow the structure to be evenly supported even upon uneven ground surfaces.

Finally, there are ergonomic needs that a resin furniture system must satisfy in order to achieve acceptance by the end user. The resin furniture system must be easily and quickly assembled using minimal hardware and requiring a minimal number of tools. Further, the resin furniture system should not require excessive strength to assemble or include heavy component parts. Moreover, the resin furniture system must assemble together in such a way so as not to detract from the aesthetic appearance of the assembled resin furniture.

Thus, the present invention provides a resin furniture system that utilizes a stabilizing box structure which overcomes the disadvantages of prior art lawn or patio furniture systems. The blow molded resin furniture system of the present invention not only provides for relative ease in assembly and increased weight capacity and rigidity, it also permits the stabilizing box structure to be utilized for storage space.

SUMMARY OF THE INVENTION

Briefly, the invention involves a system and method for constructing lawn furniture. The system includes box type beam members, as well as a large box structure supported above a ground surface. The box structure provides rigidity and stability to the furniture while also functioning as storage space. The components are formed to ship in a dissembled compact state and snap together with minimal use of fasteners and tools.

Accordingly, it is an objective of the present invention to provide a system for constructing blow molded resin furniture.

It is a further objective of the present invention to provide a base box structure upon which the resin furniture system is based.

It is yet a further objective of the present invention to provide a box structure, which, in addition to providing structure to the furniture, provides storage space.

It is another objective of the instant invention to provide a system for constructing blow molded resin furniture that can be utilized across a wide variety of furniture types including chairs, loveseats, couches, etc.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE FIGURES

FIG. 42 is a rear view of the embodiment illustrated in FIG. 39;

FIG. 43 is a partial section view taken along lines 43-43 of FIG. 42, illustrating engagement between the panels that form the sides of the structural enclosure;

FIG. 44 is a partial exploded view of the embodiment illustrated in FIG. 39;

FIG. 71 is a top perspective view of an alternative embodiment of the present invention, illustrated with a sliding drawer within the storage space;

FIG. 72 is a front view of the embodiment illustrated in FIG. 71;

FIG. 73 is a top view of the embodiment illustrated in FIG. 71;

FIG. 74 is a right side view of the embodiment illustrated in FIG. 71;

DETAILED DESCRIPTION OF THE PREFERRED EMBODIMENTS

Figure 1:
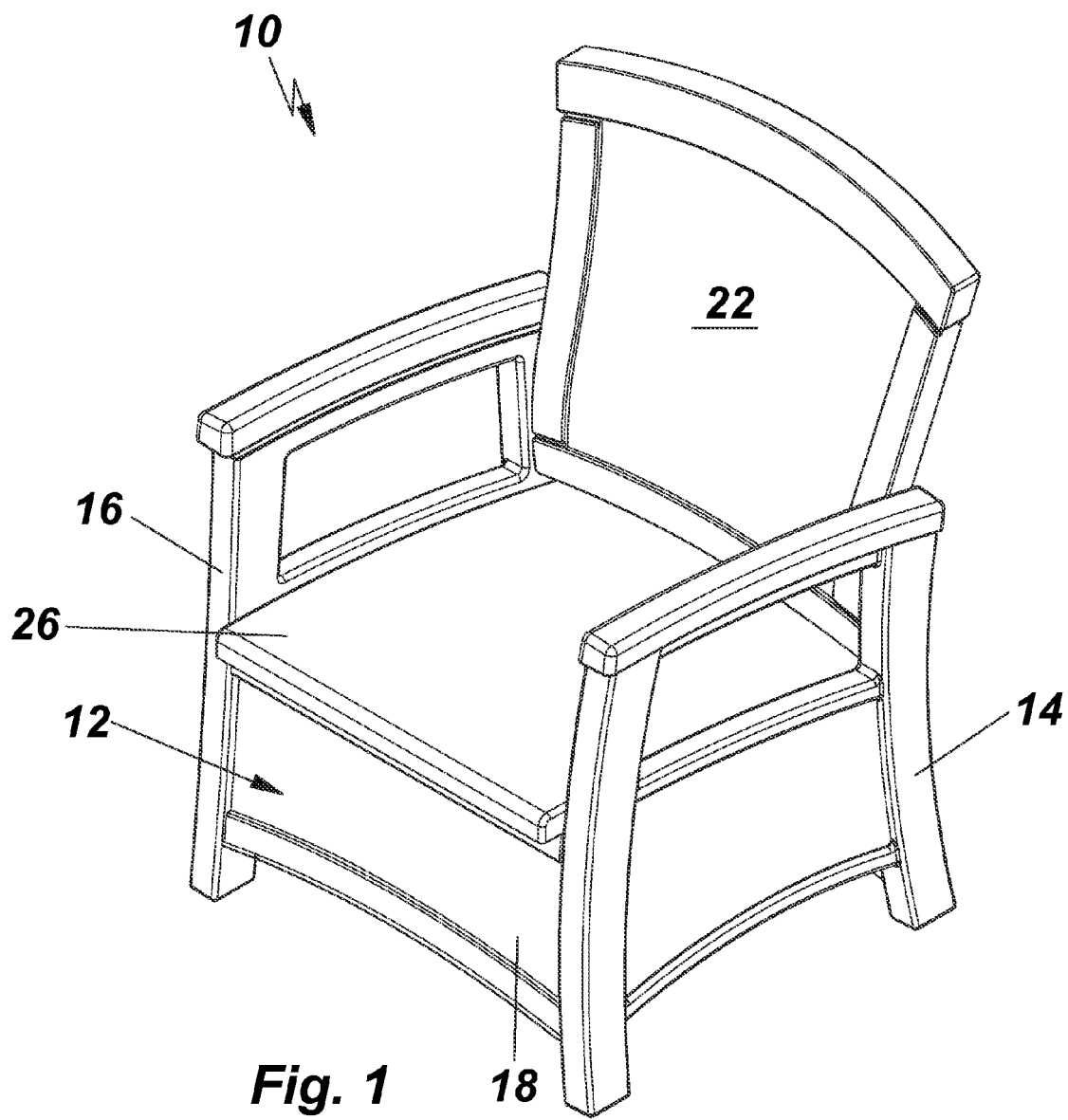
FIG. 1 is a top right perspective view of one embodiment of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Figure 2:
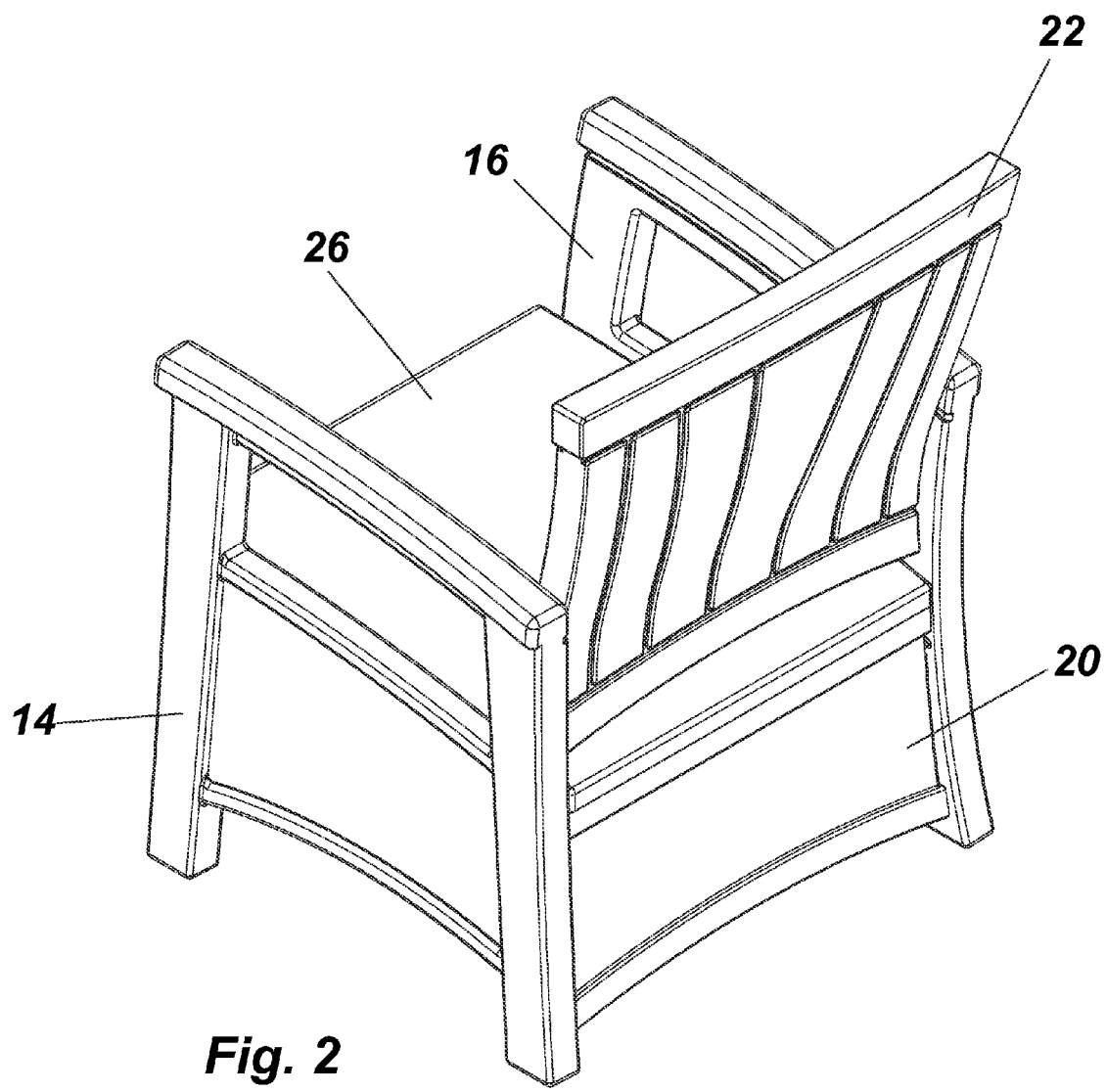
FIG. 2 is a top rear perspective view of the embodiment shown in FIG. 1.
Figure 3:
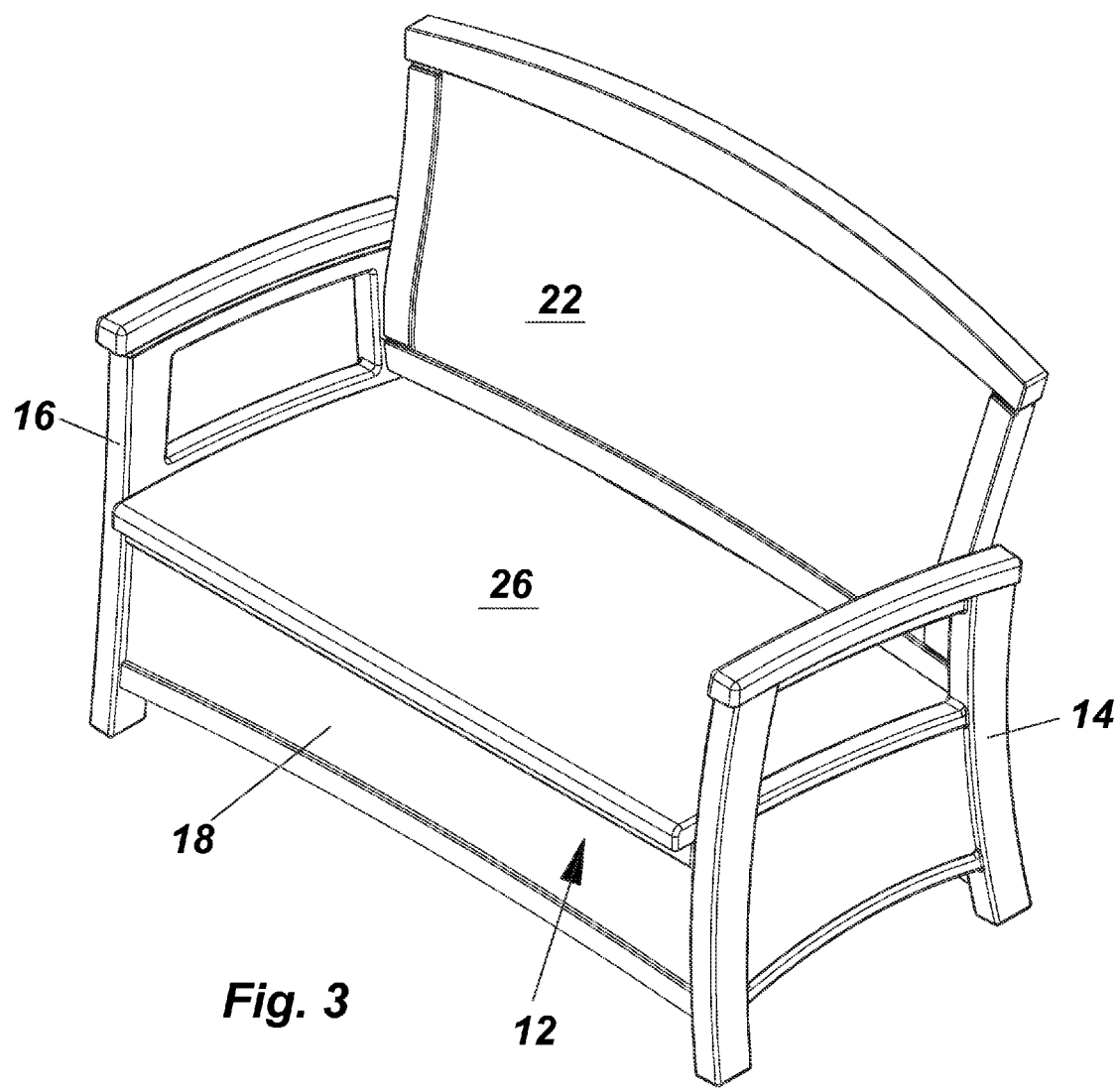
FIG. 3 is a top right perspective view of an alternative embodiment of the present invention.
Figure 4:
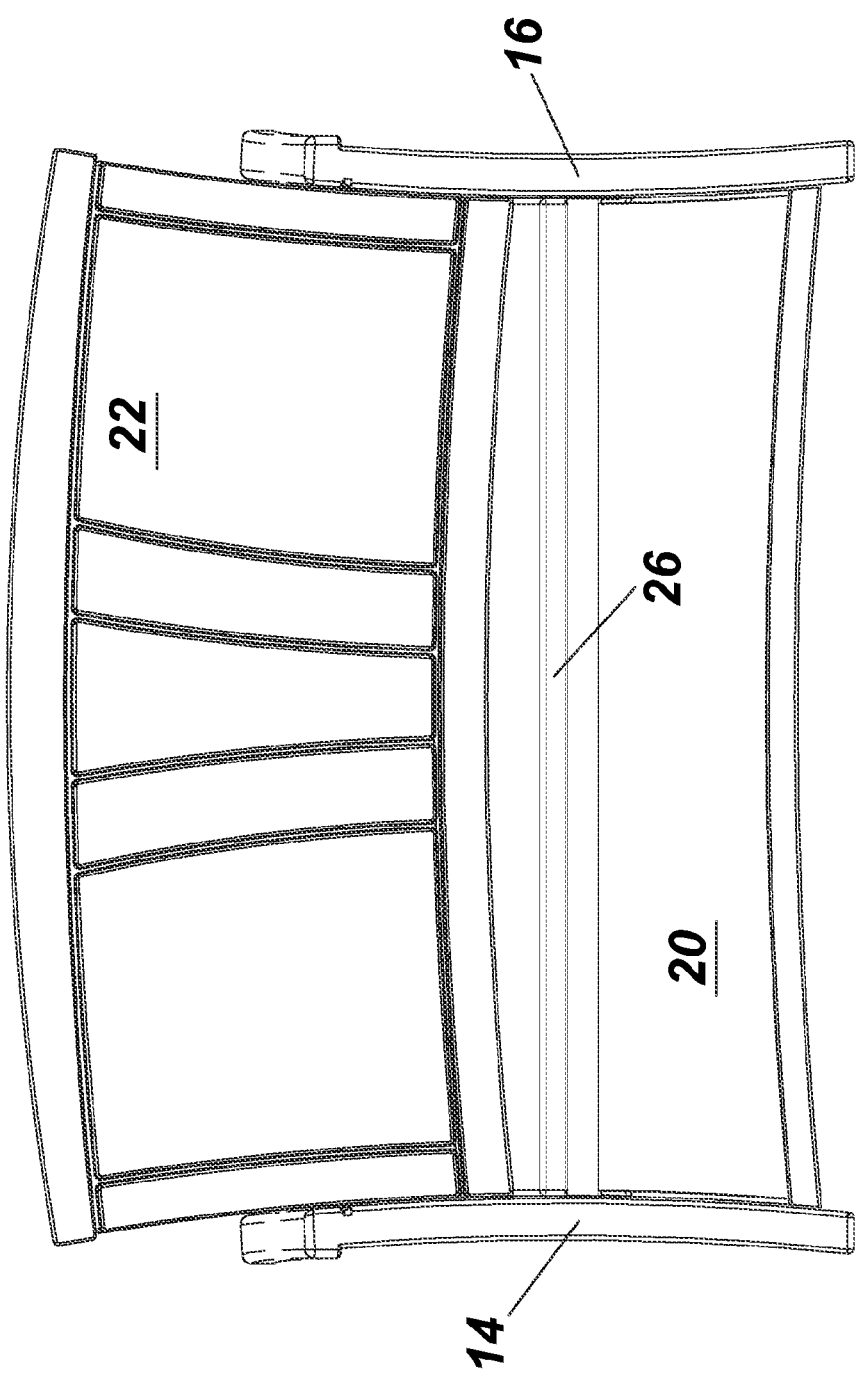
FIG. 4 is a rear view of the embodiment shown in FIG. 3.

Referring generally to FIGS. 1-16, a resin furniture system 10 which provides increased rigidity, weight capacity and storage is illustrated. The system includes a box structure 12 about which the remaining components of the furniture are secured or formed to create a structurally integrated piece of furniture. In general, a piece of furniture in the form of a chair, as illustrated in FIG. 1, includes the box structure 12 formed by a first end structure 14, a second end structure 16, a front panel 18, rear panel 20, back panel 22, base panel 24 and seat panel 26. The first and second end structures 14, 16, as well as the panel members 18, 20, 22, 24 (FIG. 11) and 26, are preferably formed from a resin plastic material by the process of blow molding or injection molding to be fully enclosed hollow structural pieces. Tack offs 28 of various sizes and shapes may be utilized to connect the walls that form the enclosed end structures and panels as desired for additional rigidity and structural integrity. In this manner, the same end structures and assembly techniques can be utilized to construct a family of furniture that includes different lengths; and thus, can accommodate a different number of persons. As shown, FIGS. 1 and 2 illustrate a chair while FIGS. 3 and 4 illustrate a couch or loveseat utilizing the same end structures and panels of different length.

Figure 5:
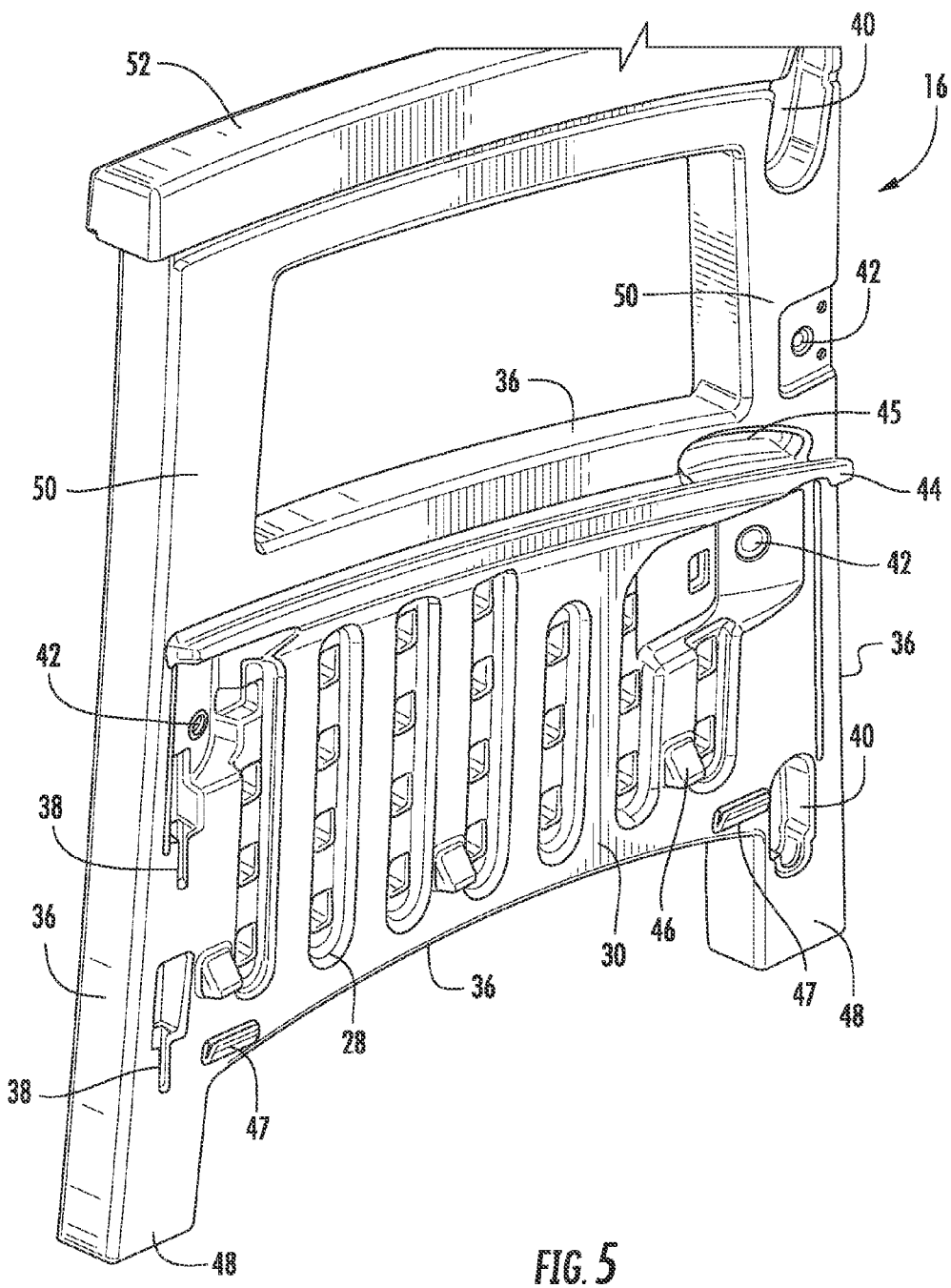
FIG. 5 is a perspective view of a box beam end structure illustrating a side panel for the box structure and a gutter system for keeping water out of the box structure.
Figure 6:
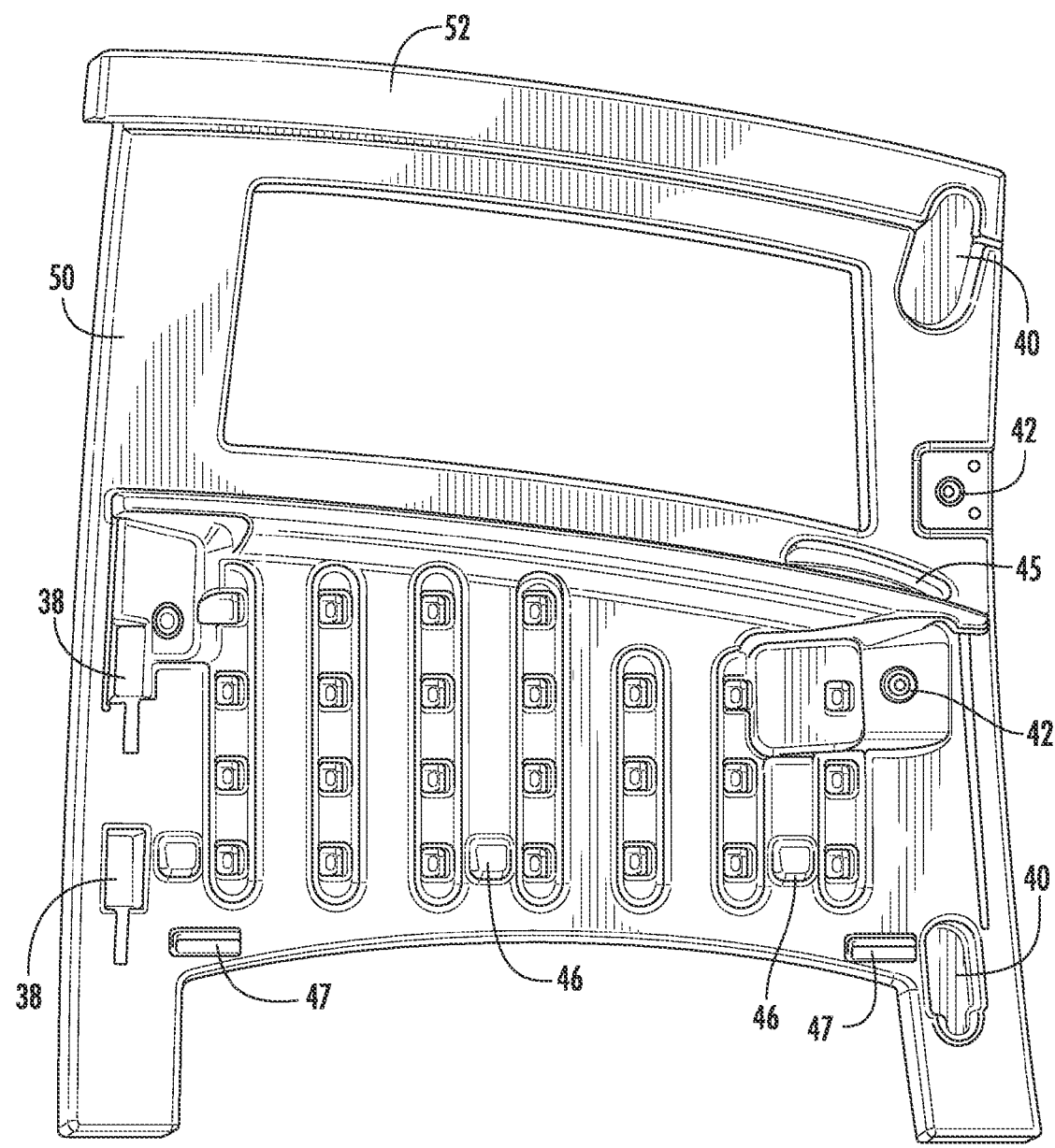
FIG. 6 is a side view of the end structure shown in FIG. 5 illustrating assembly connection points.
Figure 7:
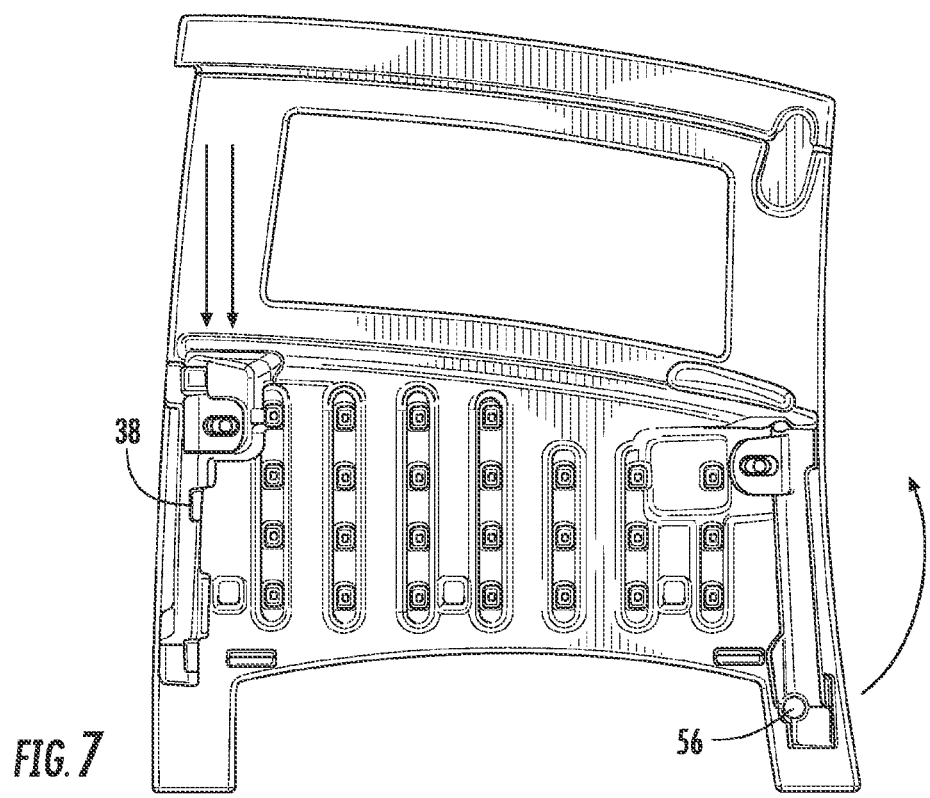
FIG. 7 is a side view illustrating assembly of the front and rear panels of the box structure to the end structure.
Figure 8:
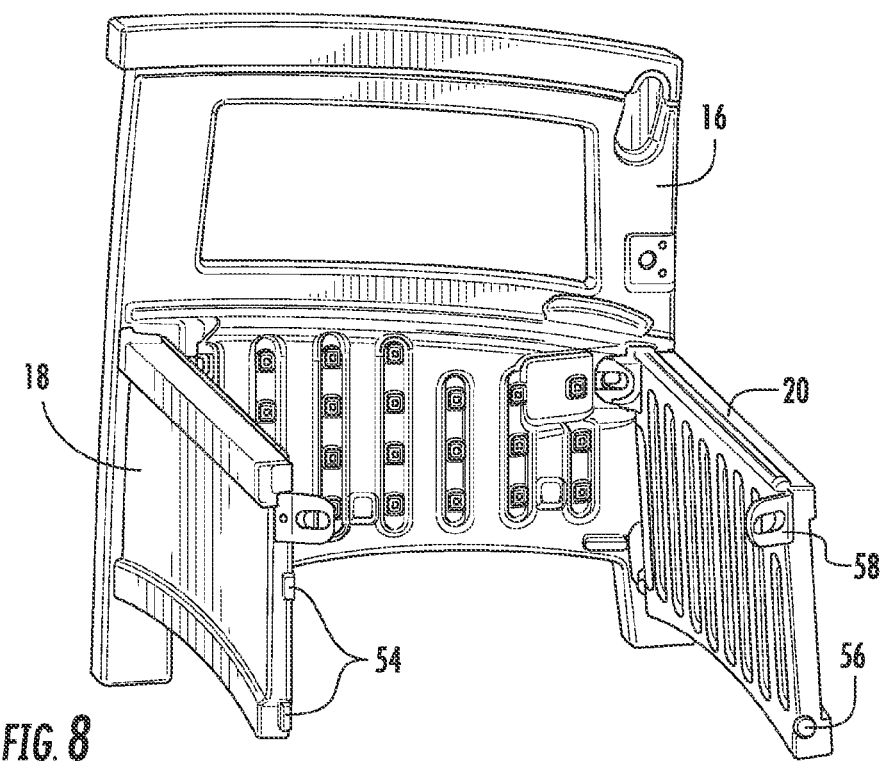
FIG. 8 is a perspective view of the assembly illustrated in FIG. 7.
Figure 9:
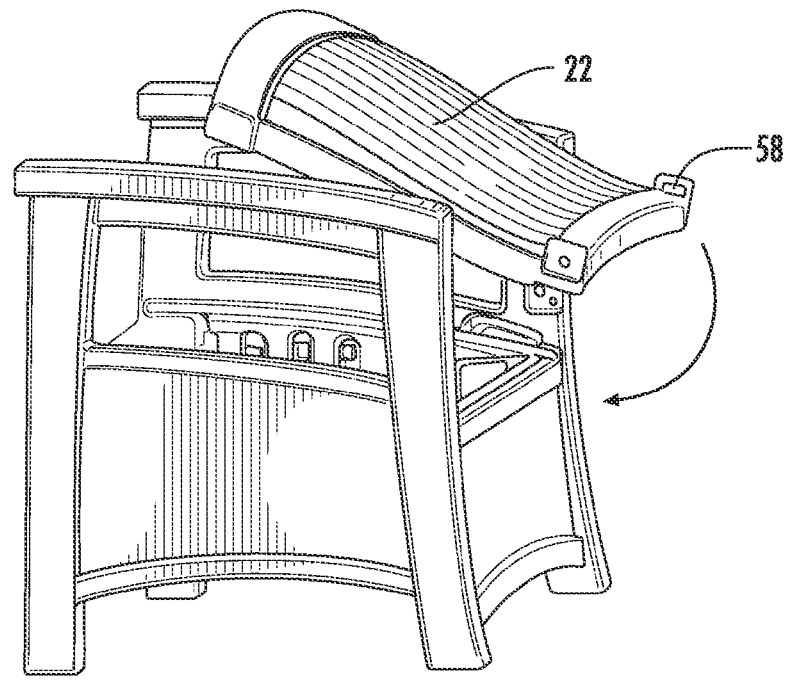
FIG. 9 is a perspective view illustrating assembly of the back panel to the end structures.
Figure 10:
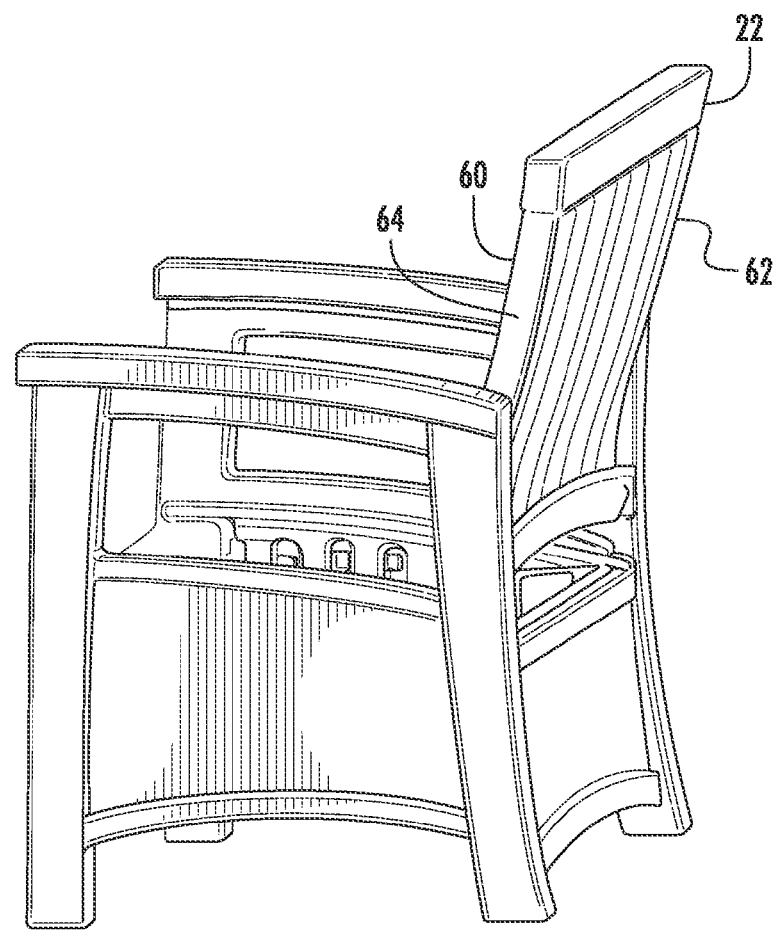
FIG. 10 is a perspective view illustrating further assembly of the back panel to the end structures.

Referring to FIGS. 5 and 6, an end structure 14, 16 is illustrated. The end structures 14, 16 are substantially alike constructed mirror images of one another; and thus, the present disclosure will focus on the structural elements and positioning of the second end structure 16 with those skilled in the art being capable of understanding the principles necessary to construct the mirror image thereof for end structure 14.

The end structure 16 includes a first side panel 30. The first side panel includes an inner wall 32, an outer wall 34 (FIG. 11), and a plurality of edge walls 36 to create an enclosed hollow panel. Tack offs 28 are positioned in rows to connect the inner and outer walls 32, 34 for increased structural integrity. Also included on the inner wall 32 are keyhole slots 38, round dovetail receivers 40, threaded apertures 42, rain gutter 44, hinge slot 45 and base panel wedge locks 46, 47. Legs 48 extend outwardly from the lower edge wall 36 while armrest stands 50 extend outwardly from an upper edge wall 36 to support the armrest 52. The outer wall 34 (FIG. 11) is generally smooth and may include aesthetically enhancing features such as faux wicker, faux wood grain, wood slats or the like integrally molded into the resin.

Referring to FIGS. 7-12, assembly of the resin furniture is illustrated with one end structure omitted for clarity. In general, the first and second end structures 14, 16 are supported in a vertical orientation so that front panel 18, which includes keys 54 sized and shaped to cooperate with keyhole slots 38, is secured to both end structures 14, 16. In operation, the keys 54 are inserted into the keyhole slots 38 and slid in a downward direction to secure the front panel 18 into position. The wedge shape of the keys 54 insures a tight inter-fitting relationship without slack between the panels. The rear panel 20 includes a round dovetail 56 and a fastener tab 58. In operation, the round dovetail 56 is inserted into the round dovetail receivers 40, allowing the panel to be rotated until the apertures in the tabs 58 align with the threaded apertures 42. A threaded fastener (not shown) is then utilized to secure the tab to the respective end structure 14, 16.

FIGS. 7-10 illustrate assembly of the back panel 22 to the end structures 14, 16. The back panel is formed as an enclosed hollow panel member including a front wall 60, a rear wall 62 and edge walls 64. The side edge walls 64 include a round dovetail 56 and a fastener tab 58 integrally formed thereto. In operation, the round dovetail 56 is slid into the round dovetail receivers 40 positioned on the inner wall 32 of the arm stands 50 and pulled upwardly to engage the dovetail to the round dovetail receivers 40, allowing rotation between the two panels. The fastener tabs 58 align with threaded apertures 42. Plastic fasteners are then utilized to secure the back panel into position.

Figure 11:
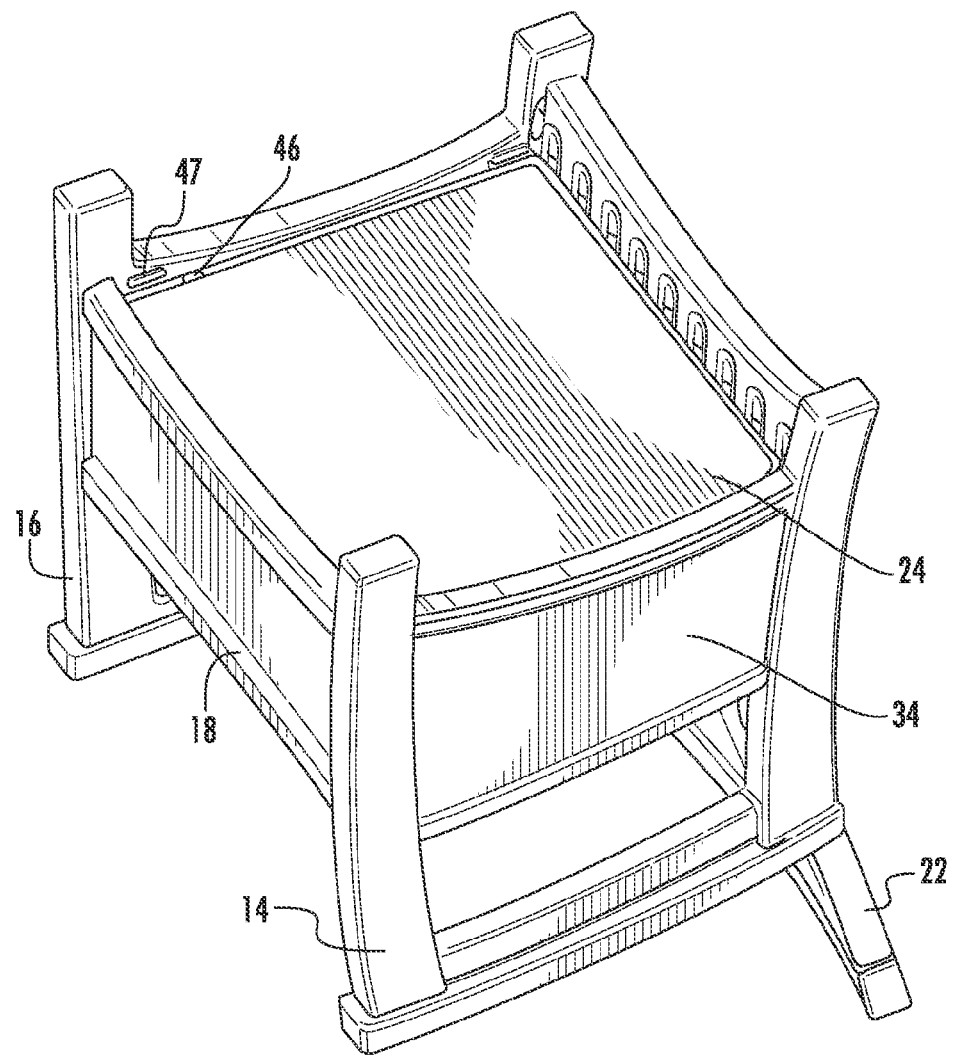
FIG. 11 is a bottom perspective view illustrating assembly of a base panel to the box structure.
Figure 12:
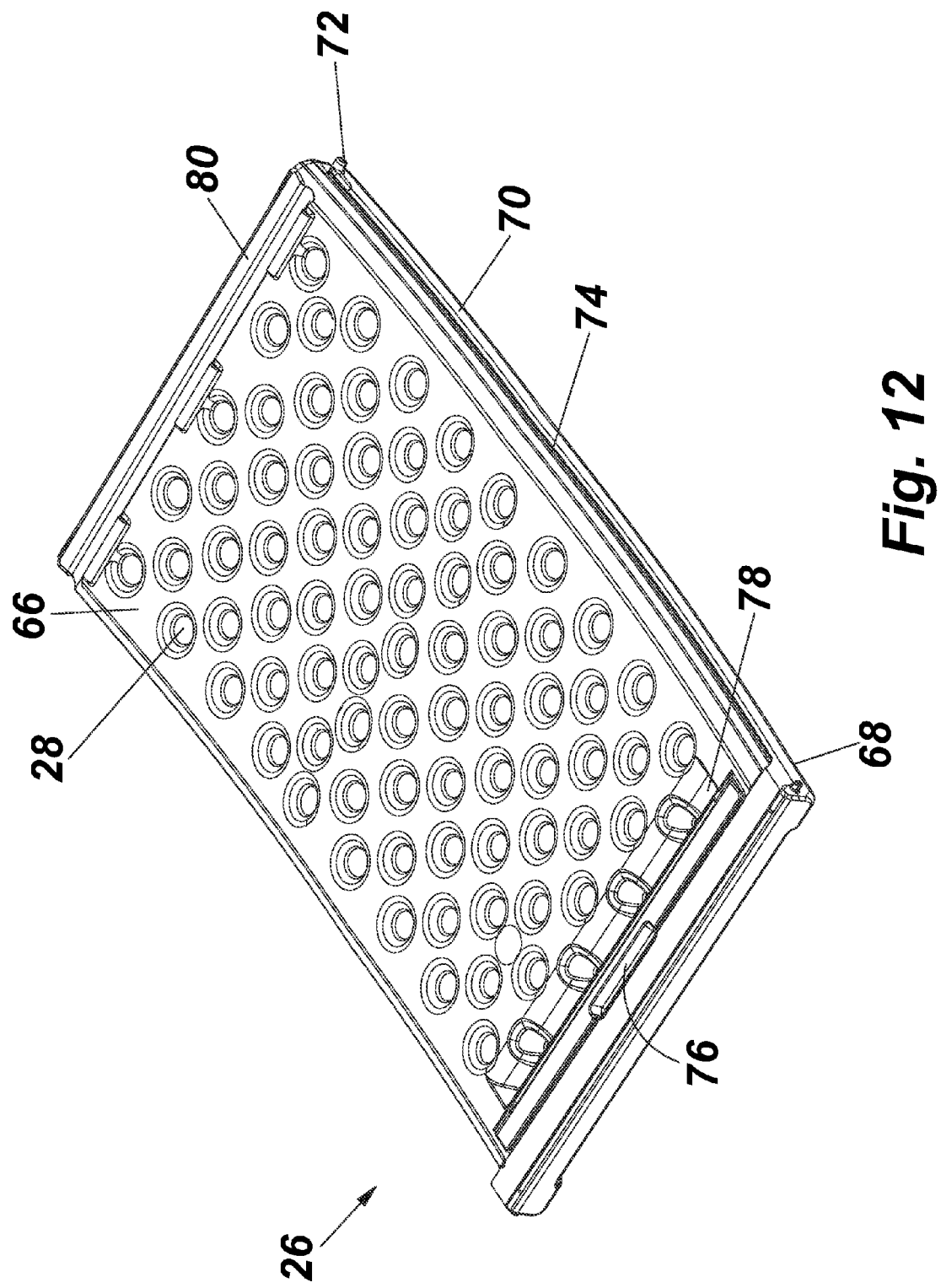
FIG. 12 is a perspective view illustrating the bottom side of the seat panel of the present invention.

Referring to FIG. 11, assembly of the bottom panel 24 is illustrated. In general, the bottom panel is constructed as a hollow enclosed member by the process of blow molding, and may include outwardly extending posts (not shown) which cooperate with the end structures 14, 16 or front and rear panels 18, 20. In the preferred embodiment, the bottom panel 24 is secured to furniture structure by inverting the furniture structure for access to the bottom thereof. The bottom panel 24 is placed against the wedge locks 46, 47 and pressed until the bottom panel passes the lower wedge locks 47 and contacts the upper wedge locks 46. Fasteners or the like may be utilized to secure the bottom panel if desired.

Figure 13:
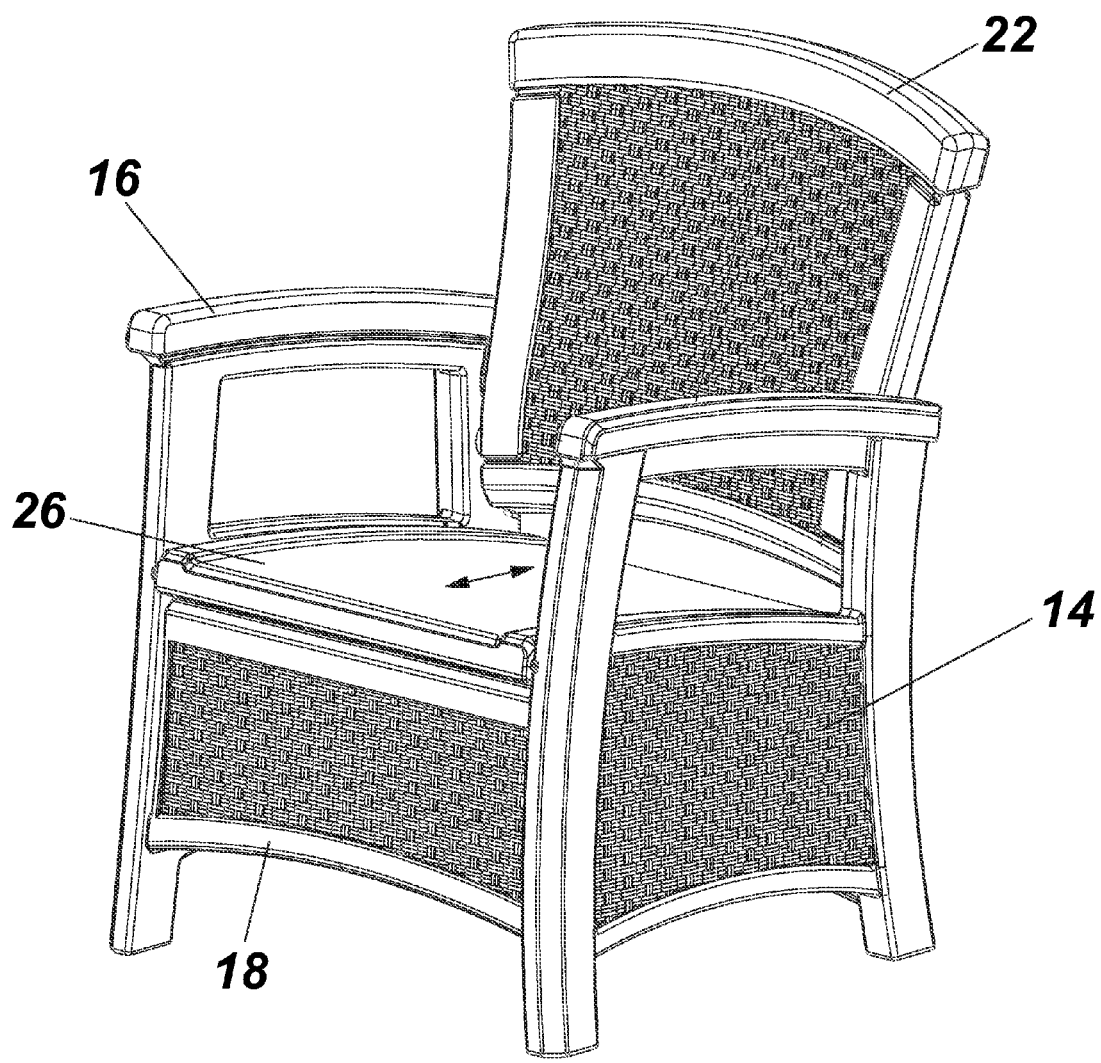
FIG. 13 is a perspective view of the embodiment shown in FIG. 1, illustrating access to the storage area.
Figure 14:
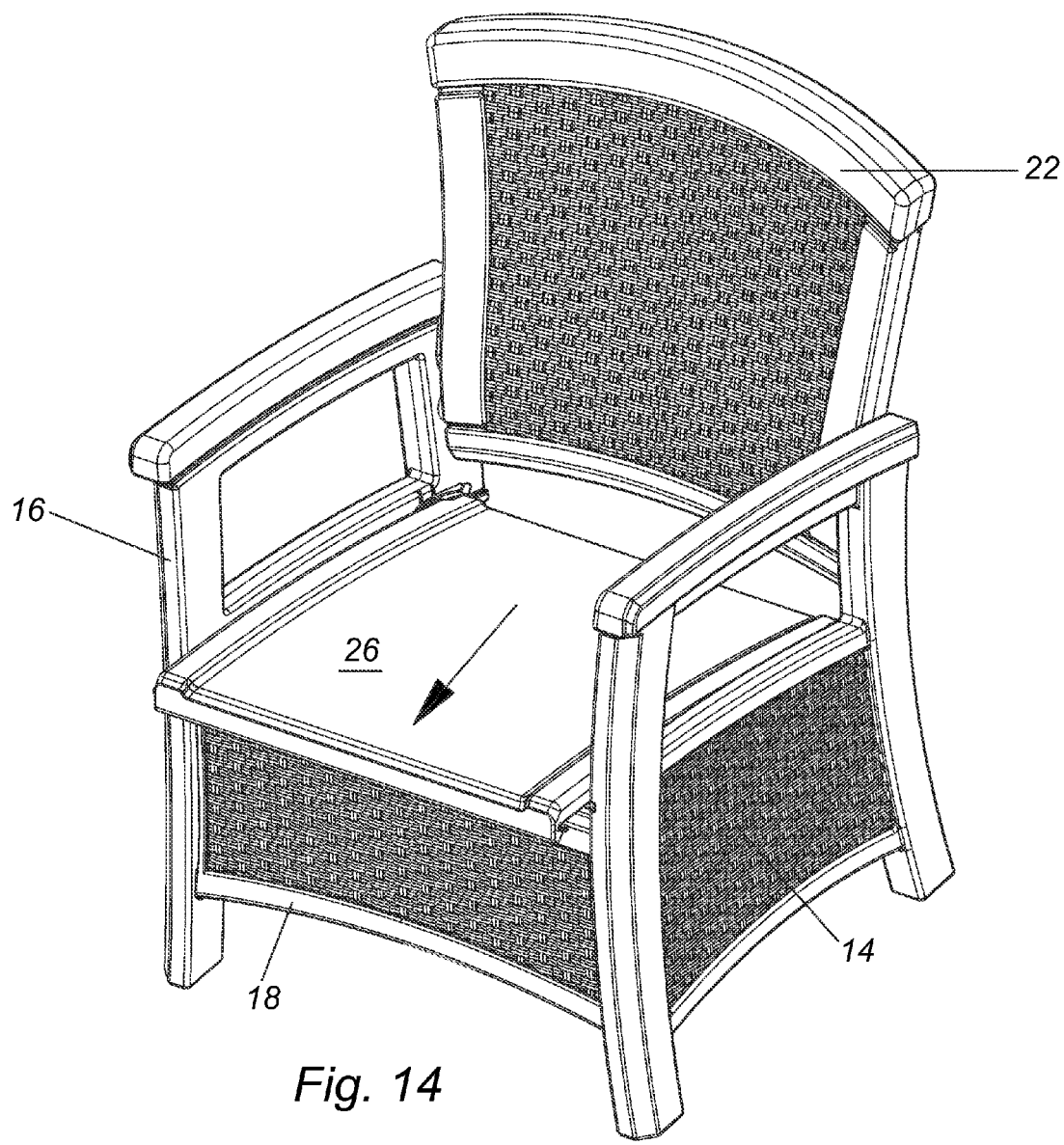
FIG. 14 is a perspective view of the embodiment shown in FIG. 1, illustrating access to the storage area.
Figure 15:
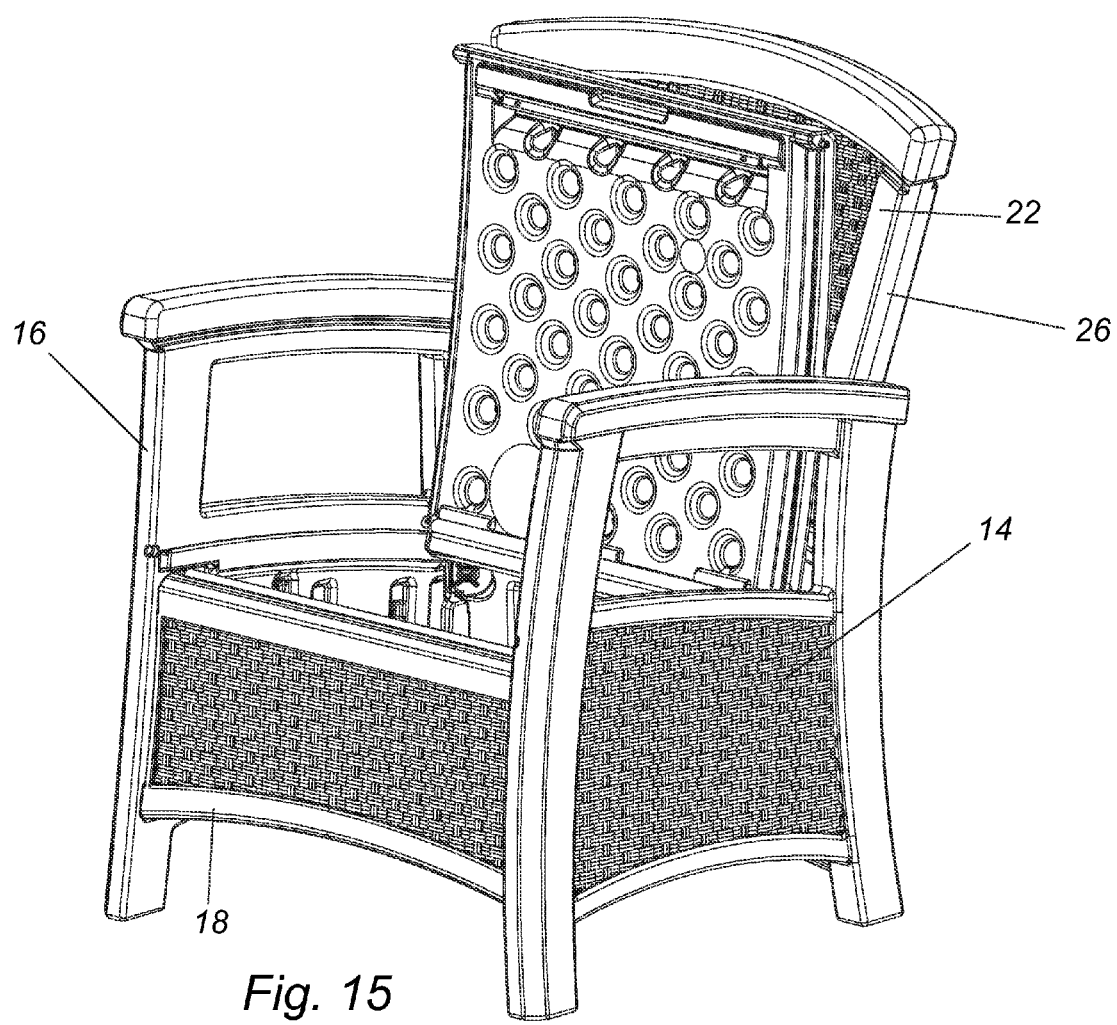
FIG. 15 is a perspective view of the embodiment shown in FIG. 1, illustrating access to the storage area.
Figure 16:
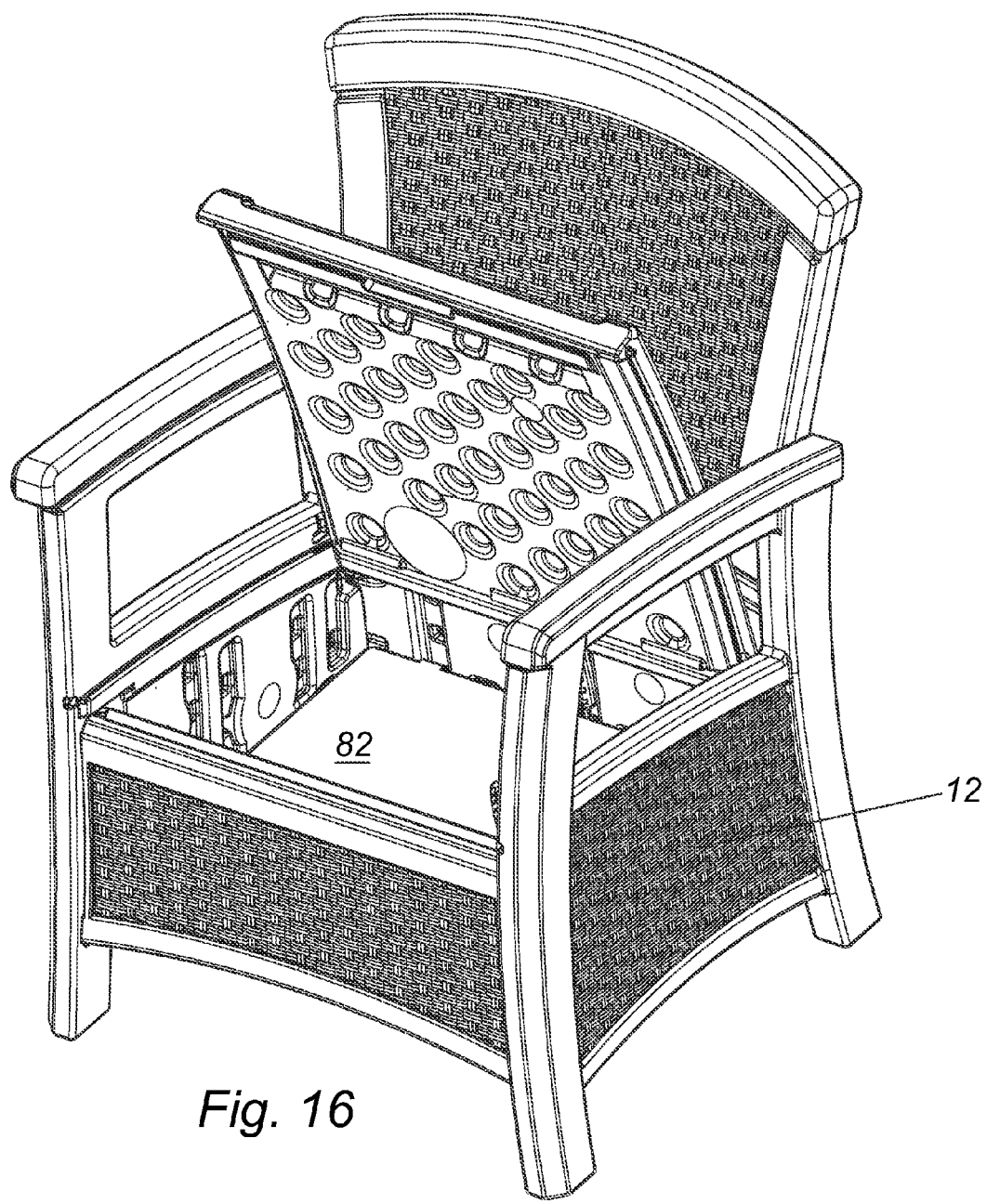
FIG. 16 is a partial perspective view of the embodiment shown in FIG. 1, illustrating access to the storage area.
Figure 17:
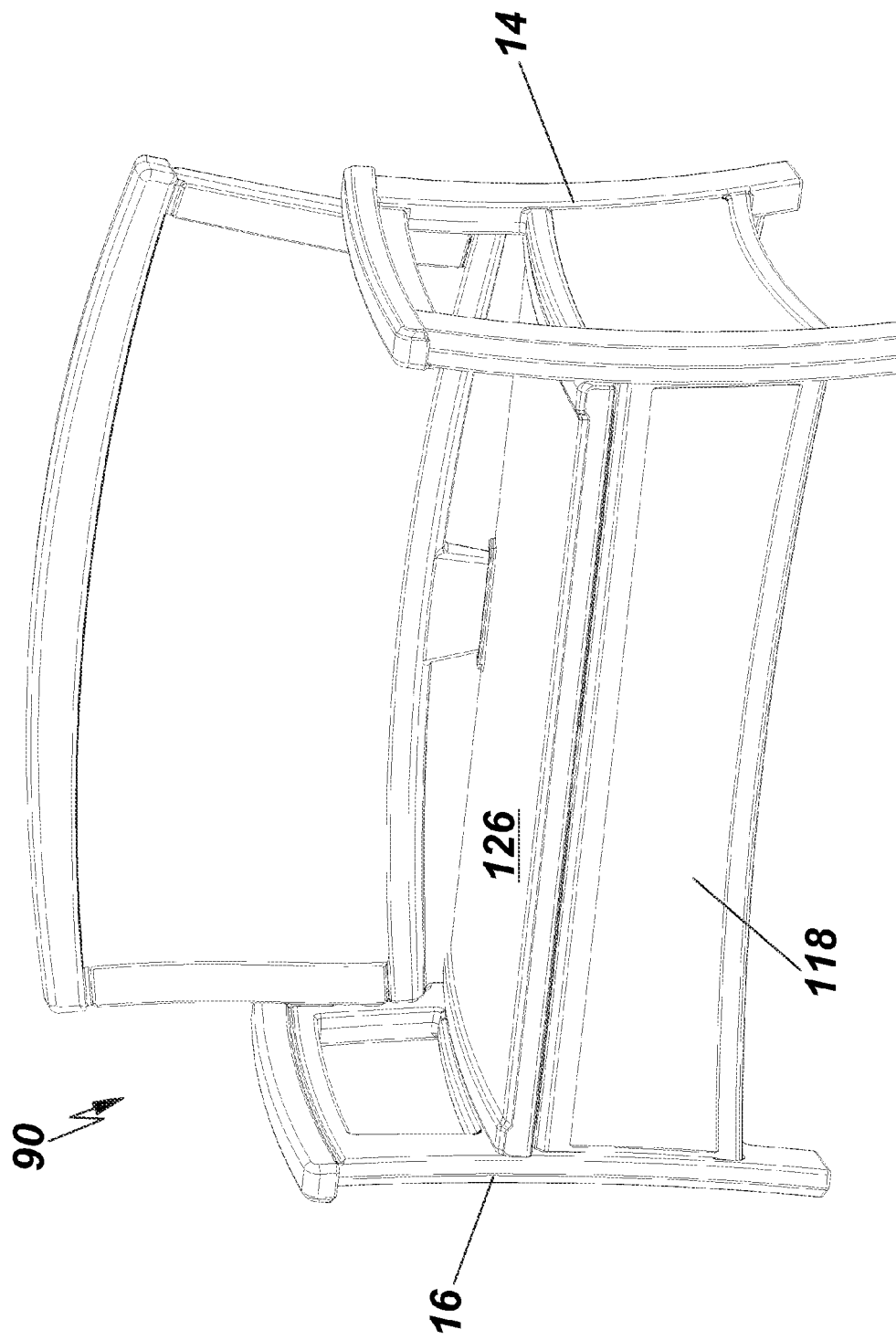
FIG. 17 is a top right perspective view of one embodiment of the present invention in the form of a couch or loveseat.
Figure 18:
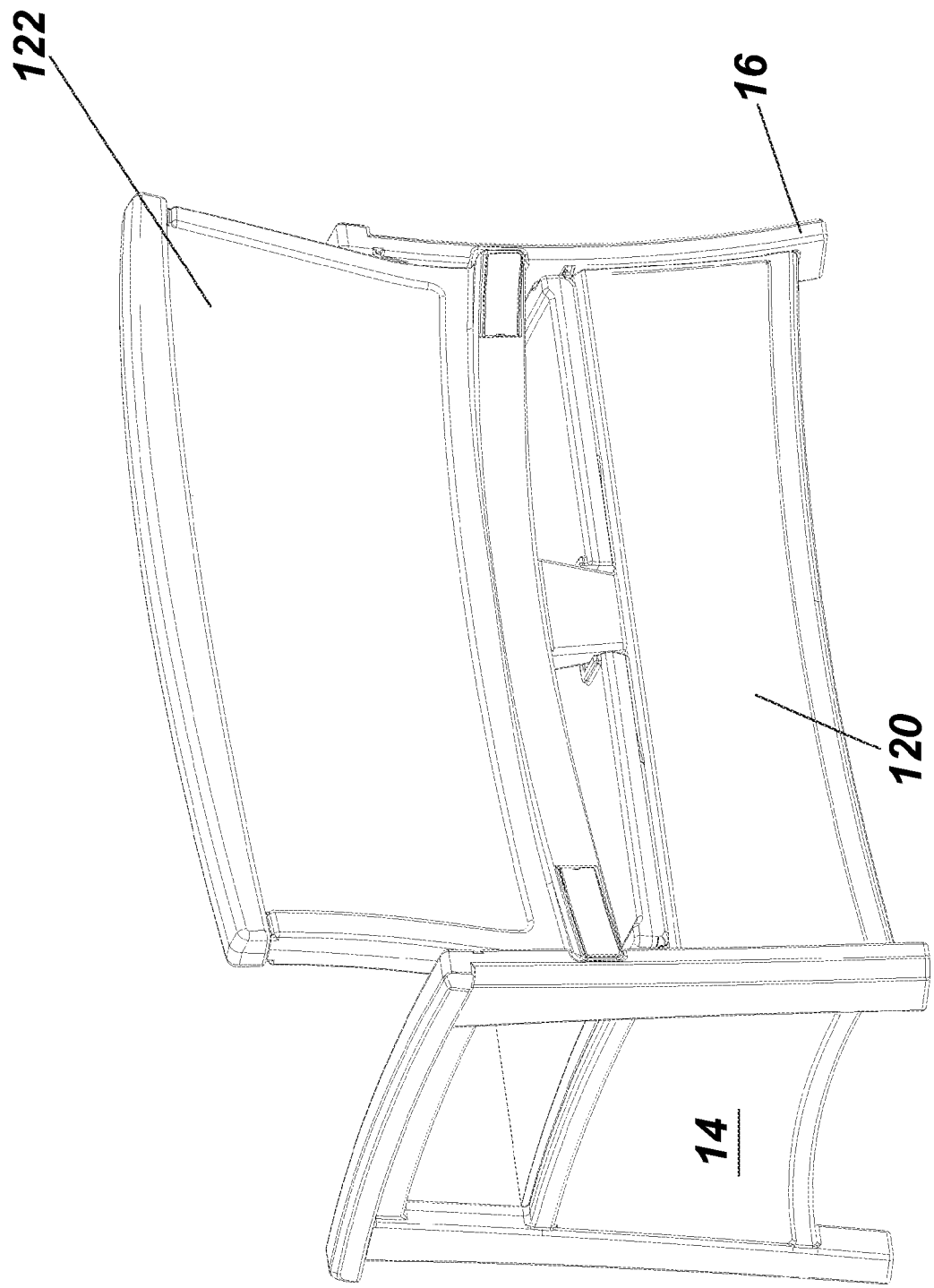
FIG. 18 is a rear perspective view of the embodiment illustrated in FIG. 17.
Figure 19:
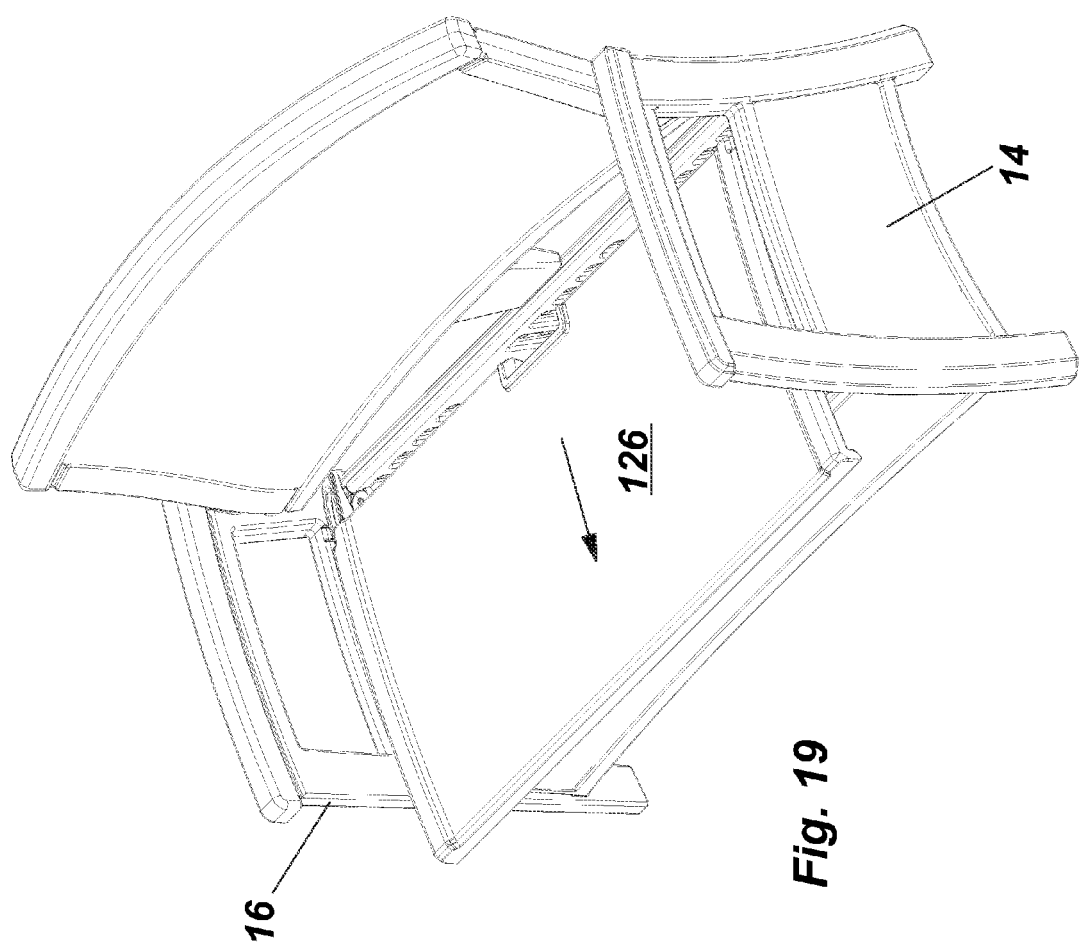
FIG. 19 is a top right perspective view illustrating one of the steps to access the internal storage compartment of this embodiment.
Figure 20:
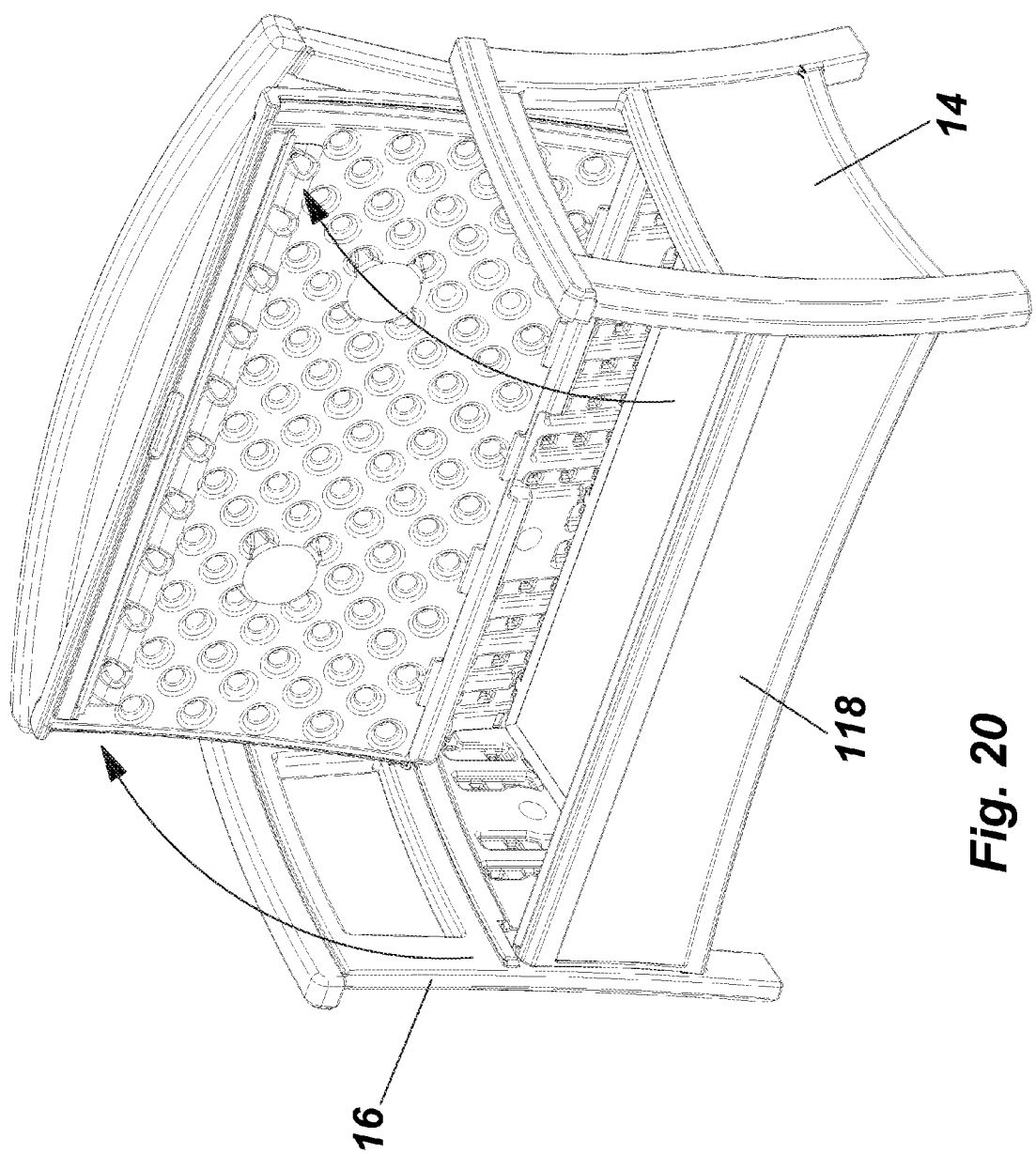
FIG. 20 is a top right perspective view illustrating a pivotal seat member for access to the internal storage compartment.

Referring to FIGS. 12-16, construction, installation and operation of the seat panel 26 is illustrated. In general, the seat panel 26 is formed as a hollow structure to include an inner wall 66, an outer wall 68, and edge walls 70. The inner wall 66 includes tack offs 28 as well as a metal pocket 78 to provide structural integrity to the seat panel 26. The tack offs 28 connect the inner and outer walls 66, 68 together, while the pocket 78 is sized to accept a steel bar (not shown). In a preferred embodiment, the pocket 78 is constructed and arranged to allow for a snap fit of the steel bar into the pocket. However, it should be noted that fasteners may be used in addition to or in place of the snap fit arrangement without departing from the scope of the invention. Snap detents 80 are formed as protuberances on the inner wall 66 for cooperation with the rear panel 20 in operation to hold the seat panel 26 in a closed position. A hand grip 76 is formed into the inner wall 66 for use in manipulating the seat panel between open and closed positions. Hinge pins 72 are provided along the edge wall 70 for sliding and pivoting connection to the elongated hinge slot 45 (FIG. 6) positioned on the inner wall 32 of the end structures 14, 16. In operation, the seat panel 26 is tilted to insert one hinge pin 72 into a hinge slot 45. The seat panel is pressed downwardly until the opposite hinge pin engages the hinge slot, allowing the seat panel to slide back and forth for the length of the slot, as illustrated in FIGS. 13 and 14, while being pivotable to allow access to the inner portion/storage area 82 of the box structure 12. The inner portion 82 of the box structure 12 can be utilized for weather resistant storage of any object that will fit within the inner portion. One example would be storage of cushions for the chair (not shown). The inner portion, thereby, provides a dry and insect resistant area for storage. In this manner, cushions and other items prone to mold growth, when not enclosed, can be stored within the chair for extended periods of time and taken out as needed for use. The detents 80 cooperate with the rear panel 20 to hold the seat panel in the rearward position. Pulling the seat panel 26 forward allows the rotation of the seat panel for access to the inner portion/storage area 82 within the structural box 12. When in a closed position, the rain gutter 44 (FIG. 5) on the inner wall 32 of the end structure 14, 16 provides support to the side portions of the seat panel 26 while also cooperating with the rain gutter 74 positioned on the inner wall 66 of the seat panel 26 to channel water away from the inner portion 82 of the box structure 12 to keep contents stored therein dry. In addition, a tortuous path 84 (FIG. 43) may be provided between the end structures and the front and rear panels to reduce the ability of insects finding their way into the inner portion.

Referring to FIGS. 17-20 and 39-56, an alternative embodiment of the present invention is illustrated. This embodiment provides a couch or loveseat 90 including an elongated seat whereby more than one person may sit upon the resin structure while storage is provided within the box structure 12. The box structure provides increased rigidity, weight capacity and storage. The system includes a box structure 12 about which the remaining components of the couch 90 are secured or formed to create a structurally integrated piece of furniture. As illustrated in FIGS. 17-20 and 39-56, the box structure 12 is formed by a first end structure 14, a second end structure 16, a front panel 118, rear panel 120, back panel 122, base panel 124 and seat panel 126. The first and second end structures 14, 16, as well as the panel members 118, 120, 122, 124 and 126, are preferably formed from a resin plastic material by the process of blow molding or injection molding to be fully enclosed hollow structural pieces. Tack offs 28 of various sizes and shapes may be utilized to connect the walls that form the enclosed end structures and panels as desired for additional rigidity and structural integrity. In this manner, the same end structures and assembly techniques can be utilized to construct a family of furniture that includes different lengths; and thus, can accommodate a different number of persons.

Figure 21:
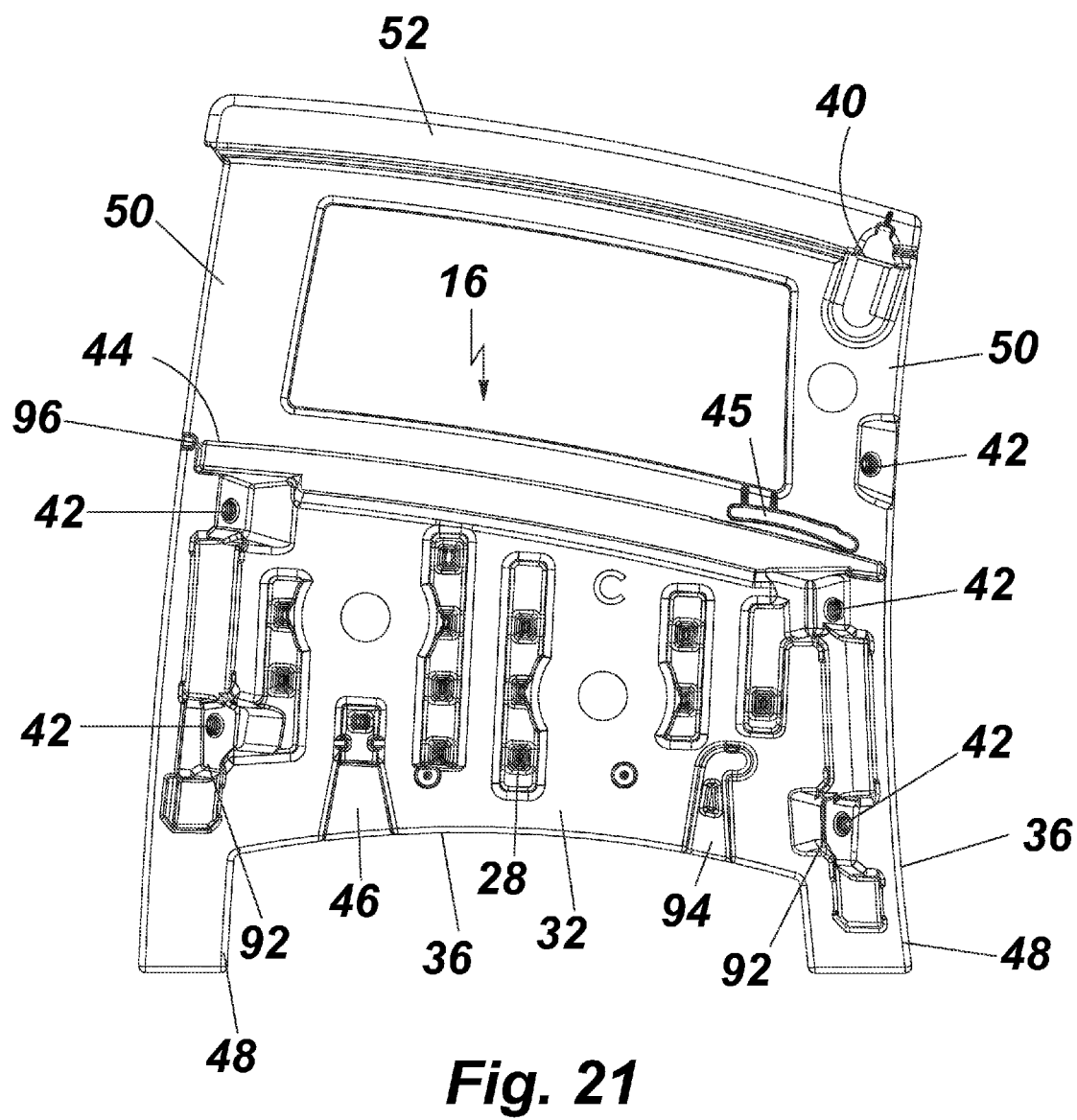
FIG. 21 illustrates an alternative embodiment of the first end structure.
Figure 22:
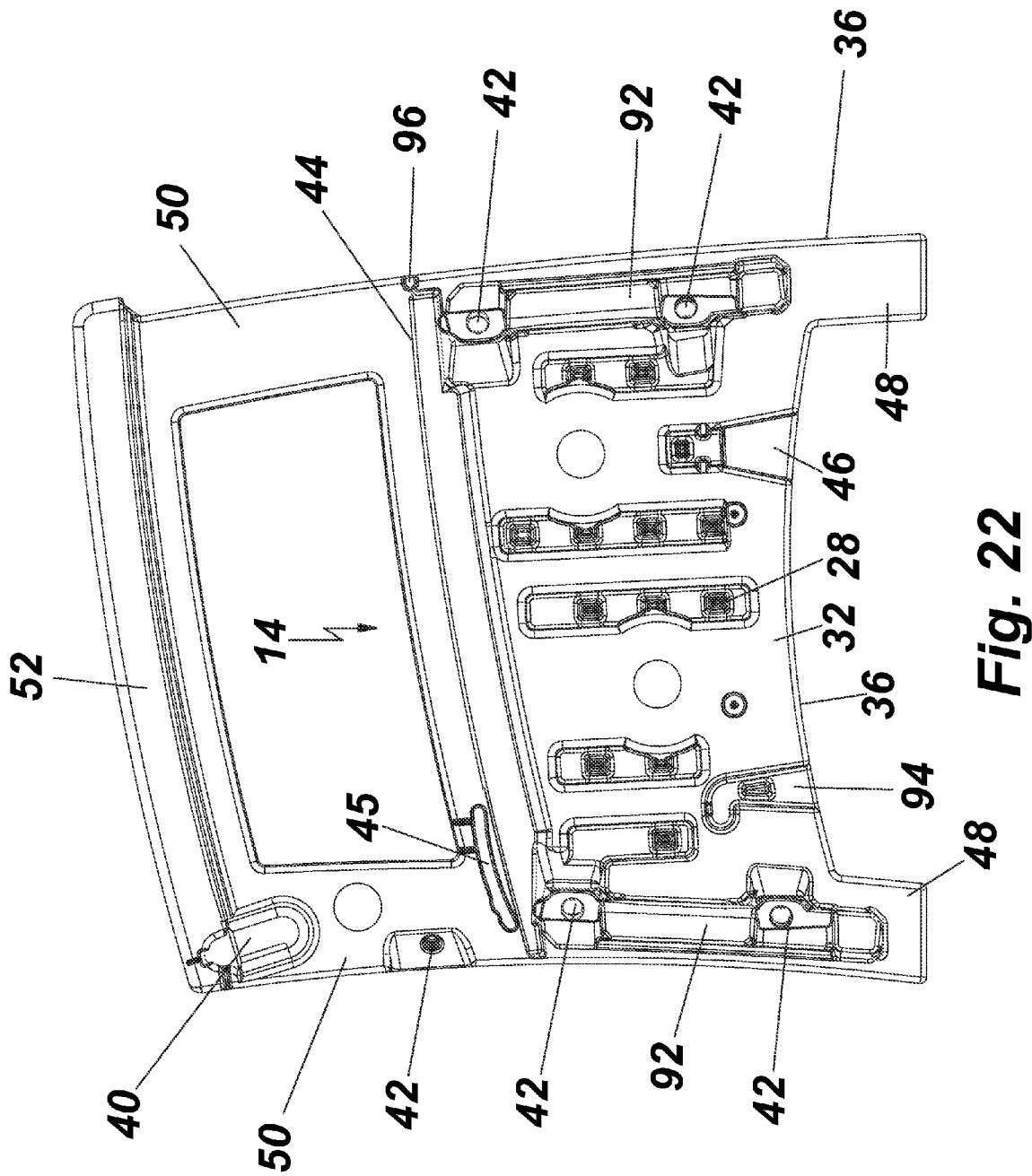
FIG. 22 illustrates an alternative embodiment of the second end structure.
Figure 23:
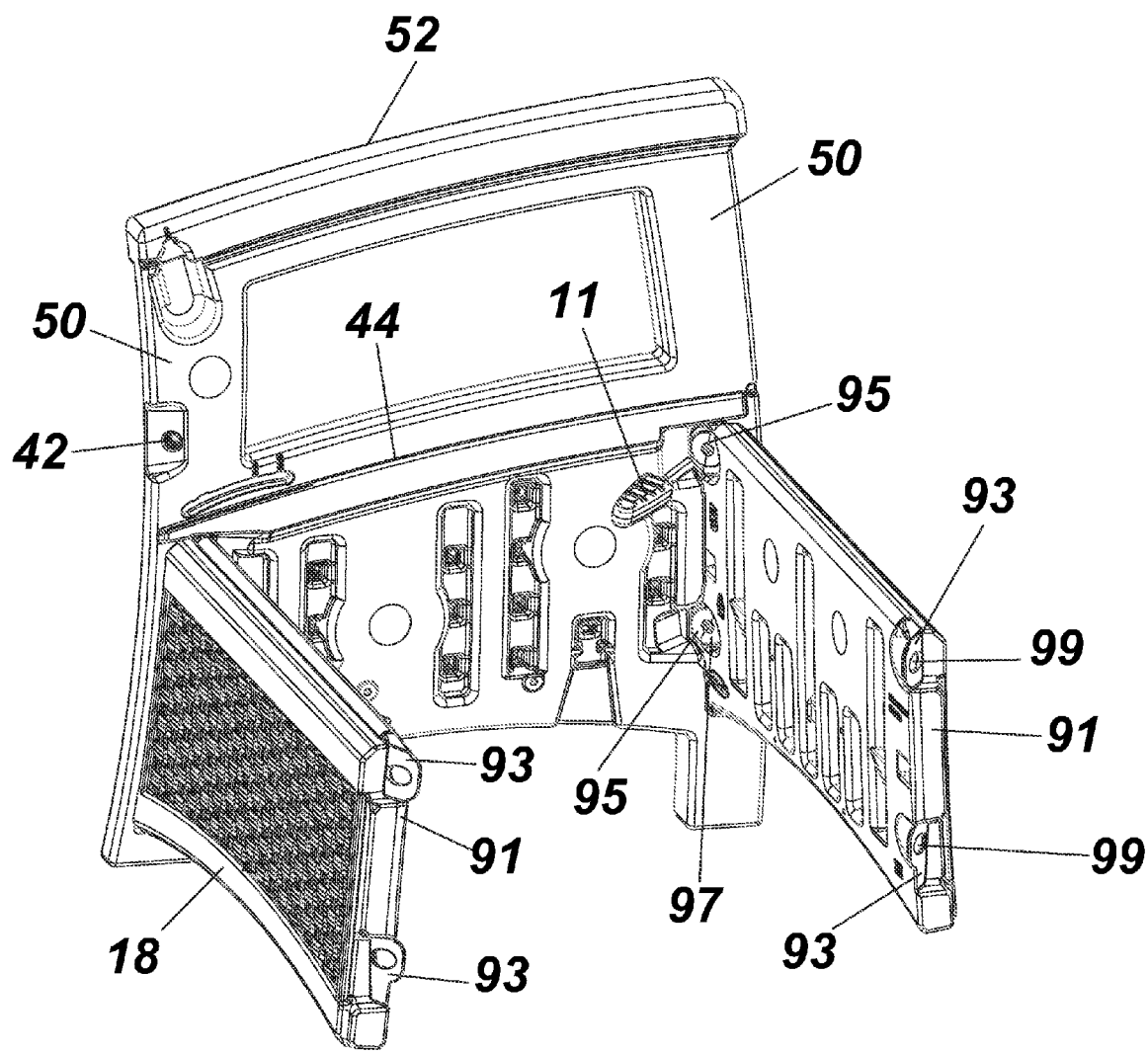
FIG. 23 is a side view illustrating assembly of the front and rear panels of the box structure to the end structure.
Figure 24:
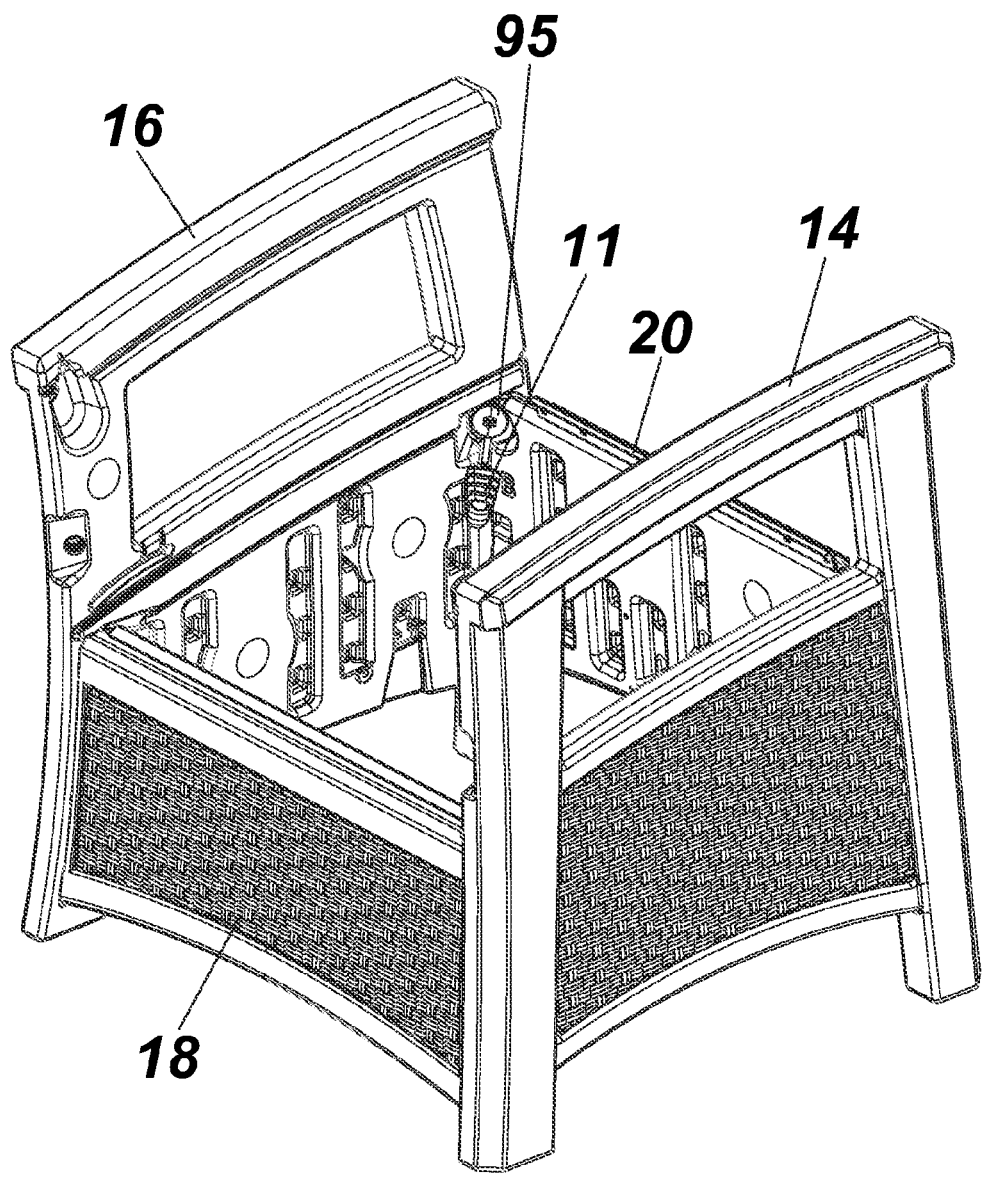
FIG. 24 is a perspective view illustrating assembly of the front and rear panels of the box structure to the end structure.

Referring to FIGS. 21 and 22, an end structure 14, 16 is illustrated. The end structures 14, 16 are substantially alike constructed mirror images of one another; and thus, the present disclosure will focus on the structural elements and positioning of the second end structure 16, with those skilled in the art being capable of understanding the principles necessary to construct the mirror image thereof for end structure 14.

The end structure 16 includes a first side panel 30. (FIG. 41) The first side panel includes an inner wall 32, an outer wall 34 (FIG. 11), and a plurality of edge walls 36 to create an enclosed hollow panel. Tack offs 28 are positioned in rows to connect the inner and outer walls 32, 34 for increased structural integrity. Also included on the inner wall 32 are docking slots 92, round dovetail receivers 40, threaded apertures 42, rain gutter 44, hinge slot 45, offset slot 94, seat panel catch 96 and base panel wedge lock 46. Legs 48 extend outwardly from the lower edge wall 36 while armrest stands 50 extend outwardly from an upper edge wall 36 to support the armrest 52. The outer wall 34 (FIG. 11) is generally smooth and may include aesthetically enhancing features such as faux wicker, faux wood grain, wood slats or the like integrally molded into the resin. In general, the end structures secure and support all of the remaining panels utilized to construct the furniture. The inner and outer walls enclose the structure for rigidity, strength and weather resistance while the legs support the panels, and thus, the box structure above the ground surface for stability, while also providing weather and insect resistance. The armrest stands 50 and armrests 52 also provide an additional box structure suitable for supporting the panels and weight associated with people and objects which may occupy the furniture.

Referring to FIGS. 23-38 and 43-56, assembly of the resin furniture is illustrated with one end structure omitted for clarity. In general, the first and second end structures 14, 16 are supported in a vertical orientation so that front panel 18, 118, which includes bosses 91 and flanges 93 sized and shaped to cooperate with docking slots 92, is secured to both end structures 14, 16. In operation, the bosses 91 and flanges 93 are inserted into the docking slots 92 and threaded fasteners 95 are used to secure the front panel 118, into position. The threaded fasteners 95 are also preferably constructed from plastic to include an oversized head portion 97 and a threaded stem. The overlapping cooperation between the bosses and the docking slots create a tortuous path 84 (FIG. 43) for a tight inter-fitting relationship without slack between the panels that resists water and insect penetration. The flanges 93 are oriented an angle with respect to both panels to pull the panels into a tight inter-fitting relationship while providing resistance to be pulled apart from multiple directions. An aperture 99 is provided in each flange for cooperation with the threaded fastener 95. A hand tool 11 may be utilized to assemble the furniture on a desired site, permitting the furniture to be shipped in a disassembled state to reduce shipping costs.

FIGS. 31-36 and 47-54 illustrate assembly of the back panel 22, 122 to the end structures 14, 16. The back panel is formed as an enclosed hollow panel member including a front wall 60, a rear wall 62 and edge walls 64. The side edge walls 64 include a round dovetail 56 and a fastener tab 58 integrally formed thereto. In operation, the round dovetail 56 is slid into the round dovetail receivers 40 positioned on the inner wall 32 of the arm stands 50 and pulled upwardly to engage the dovetail 56 to the dovetail receiver 40, securing the panels together while allowing rotation between the two panels. The panel is rotated so that the fastener tabs 58 align with the threaded apertures 42. Plastic fasteners 95 are then utilized to secure the back panel 22, 122 into position. Covers 13 are then utilized to cover the fastener 95 and tab 58 for aesthetic purposes. In a preferred embodiment, the covers are constructed and arranged to be snapped into position, whereby spring tabs 15 hold the cover in position. The tabs 93 are oriented at an angle with respect to both panels to pull the panels into a tight inter-fitting relationship while providing resistance to be pulled apart from multiple directions. An aperture 99 is provided in each tab for cooperation with the threaded fastener 95. It should also be noted that some embodiments include a support post 17 (FIG. 48) integrally formed onto a bottom edge surface for supporting additional weight on wider back panels 122. The support post is generally an enclosed structure sized to extend downwardly to the upper surface of the rear panel 120. A hand tool 11 may be utilized to assemble the furniture on a desired site; permitting the furniture to be shipped in a disassembled state to reduce shipping costs.

Figure 25:
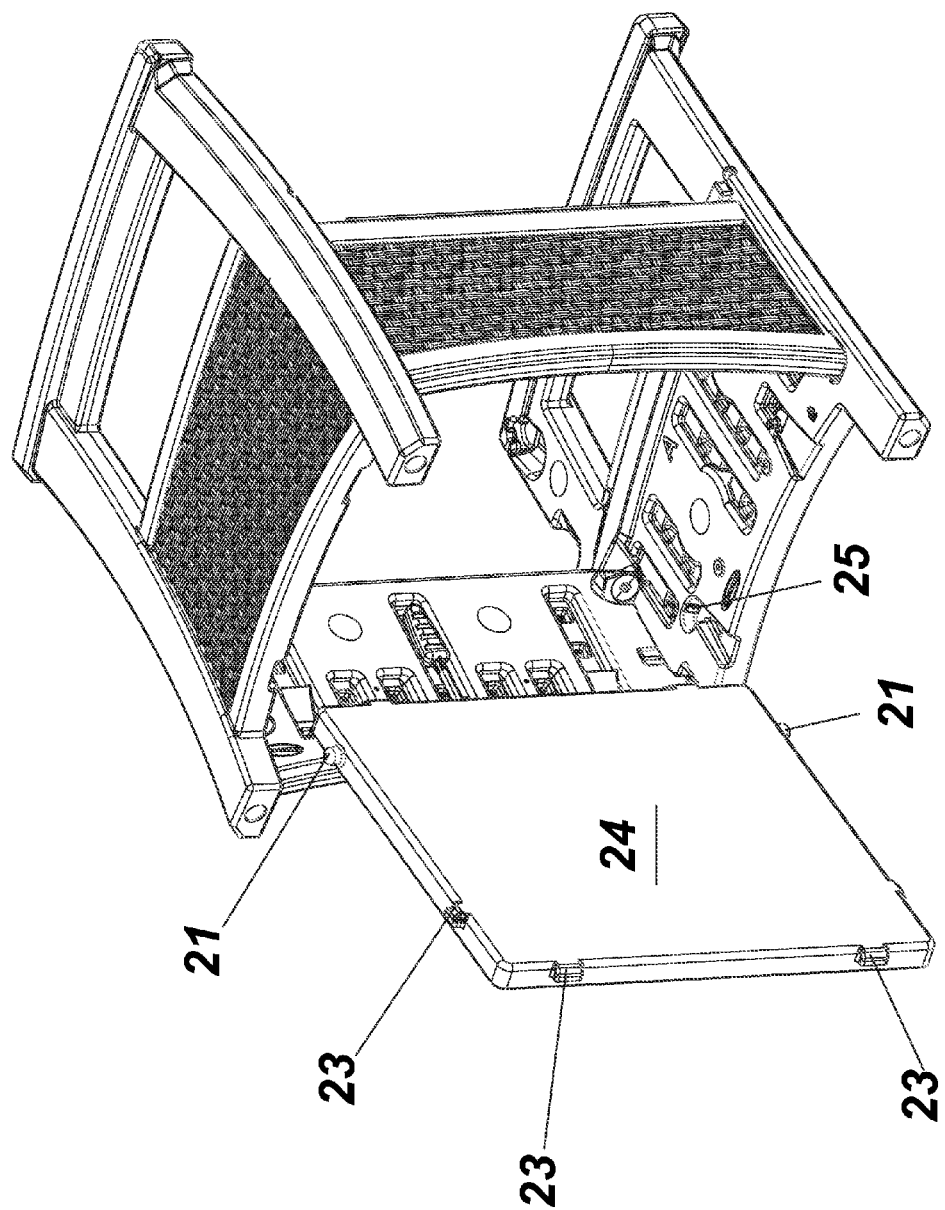
FIG. 25 is a bottom perspective view illustrating assembly of a base panel to the box structure.
Figure 26:
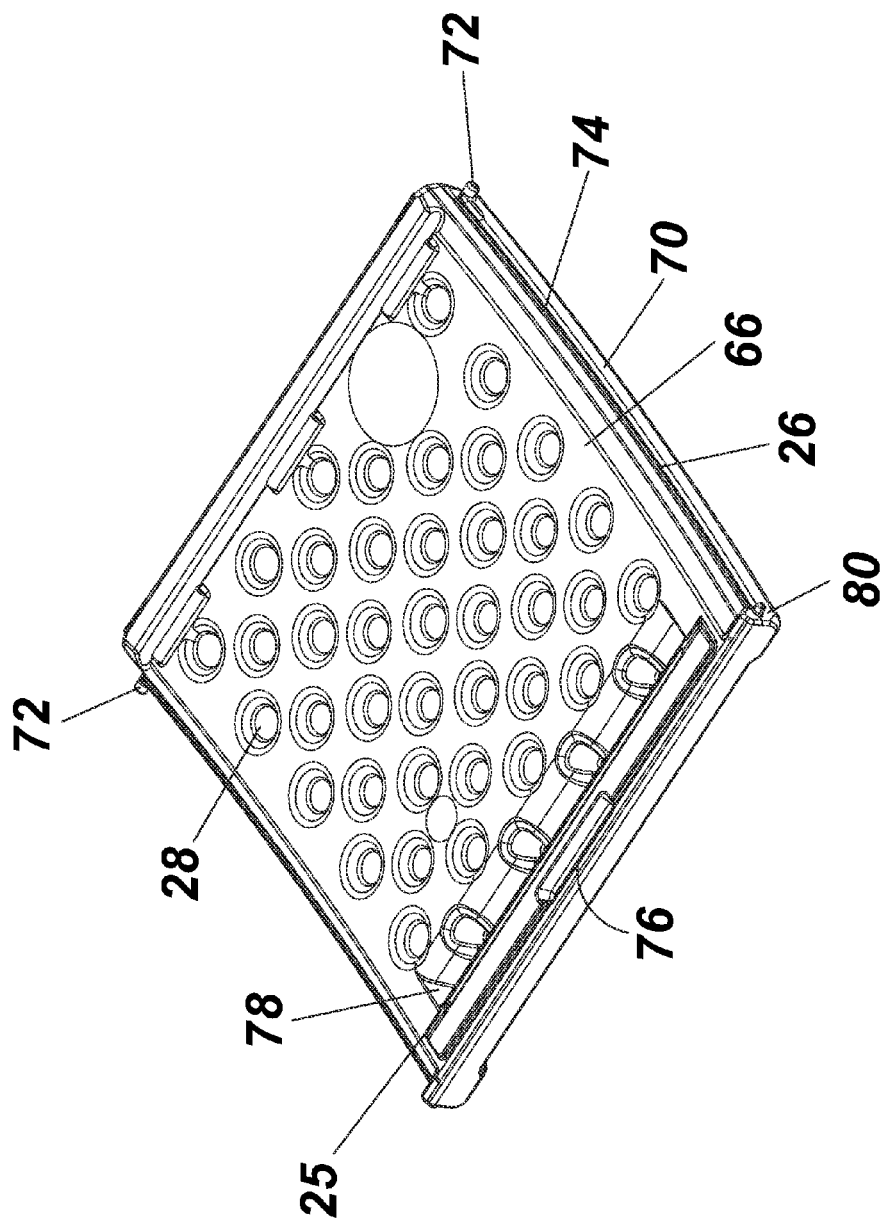
FIG. 26 is a perspective view illustrating the bottom side of one embodiment of the seat panel of the present invention.
Figure 27:
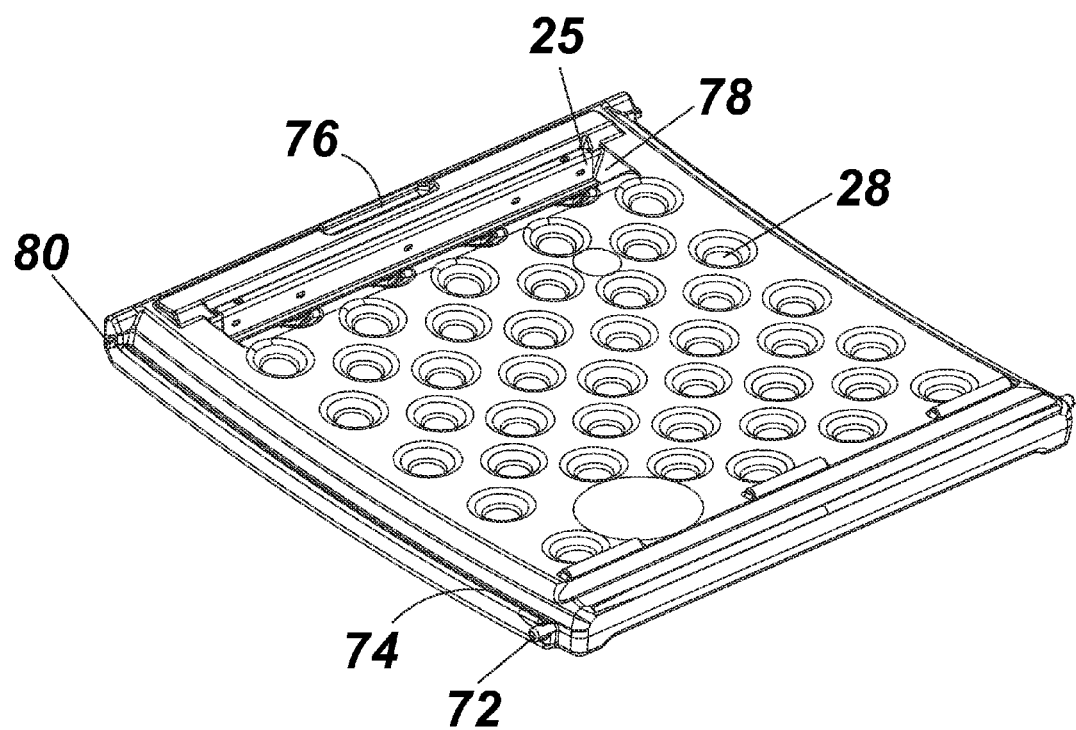
FIG. 27 is a perspective view illustrating the bottom side of one embodiment of the seat panel of the present invention.
Figure 45:
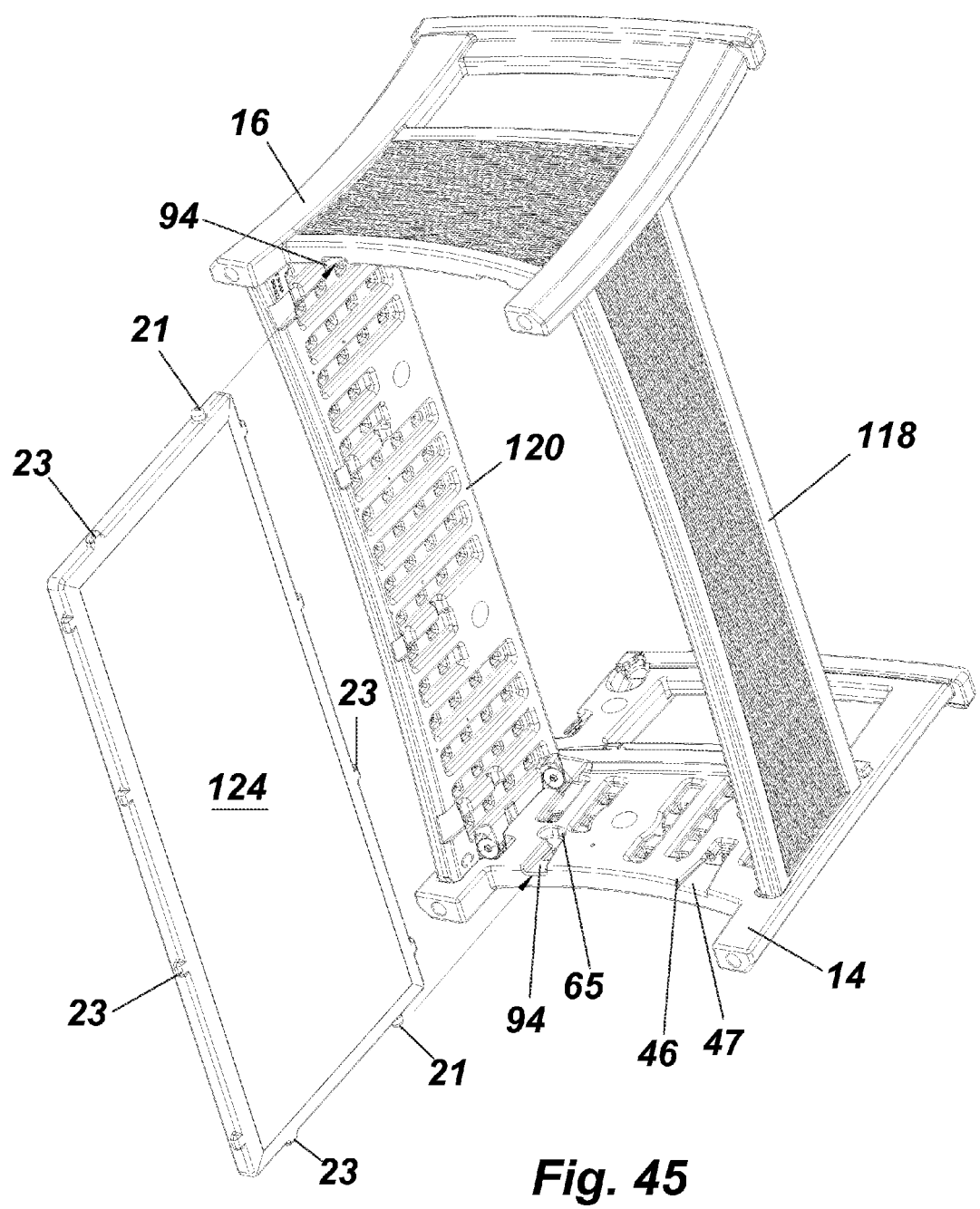
FIG. 45 is a partial exploded view illustrating assembly of the base panel.
Figure 46:
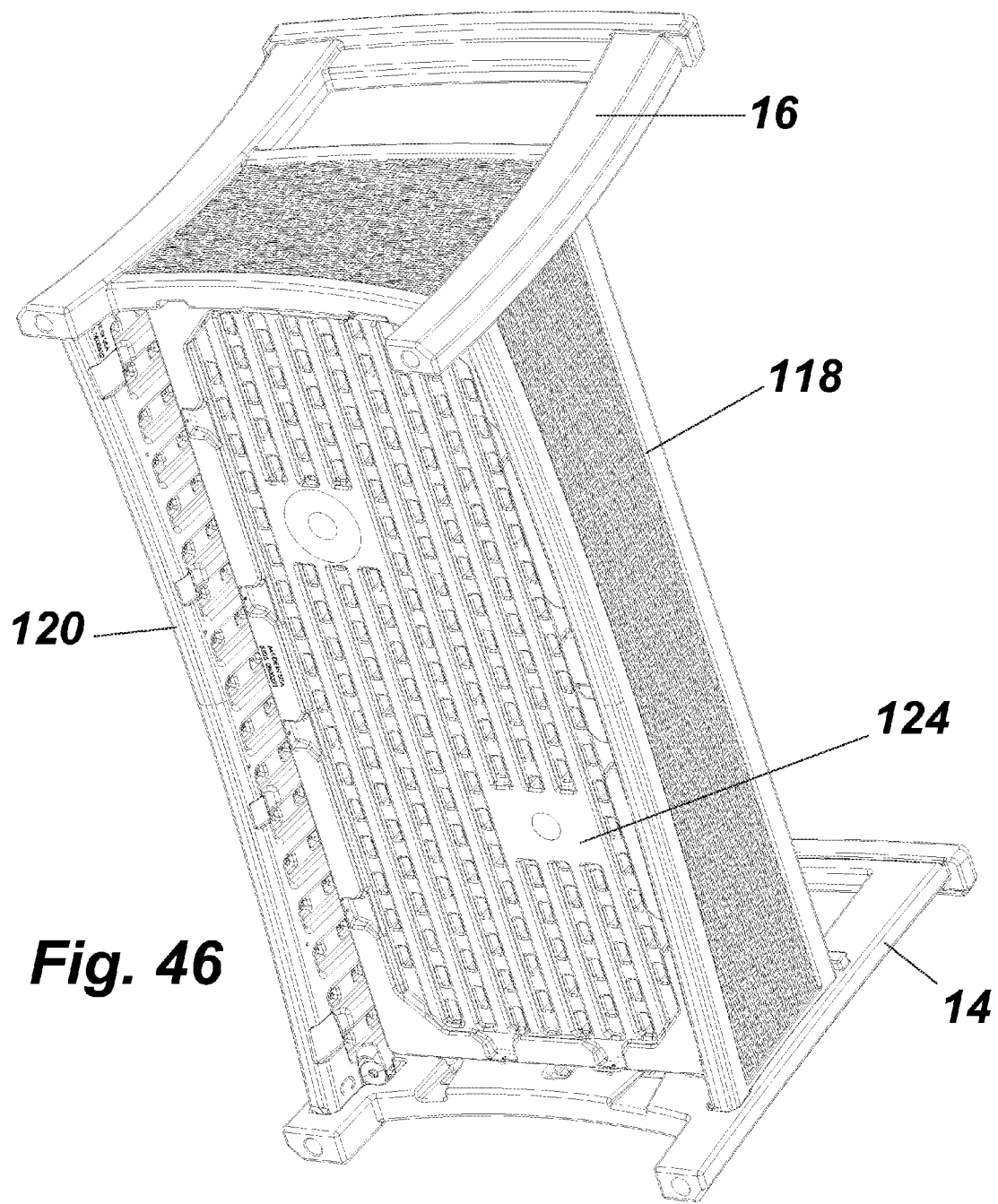
FIG. 46 is a bottom perspective view illustrating the base panel in the assembled position.
Figure 47:
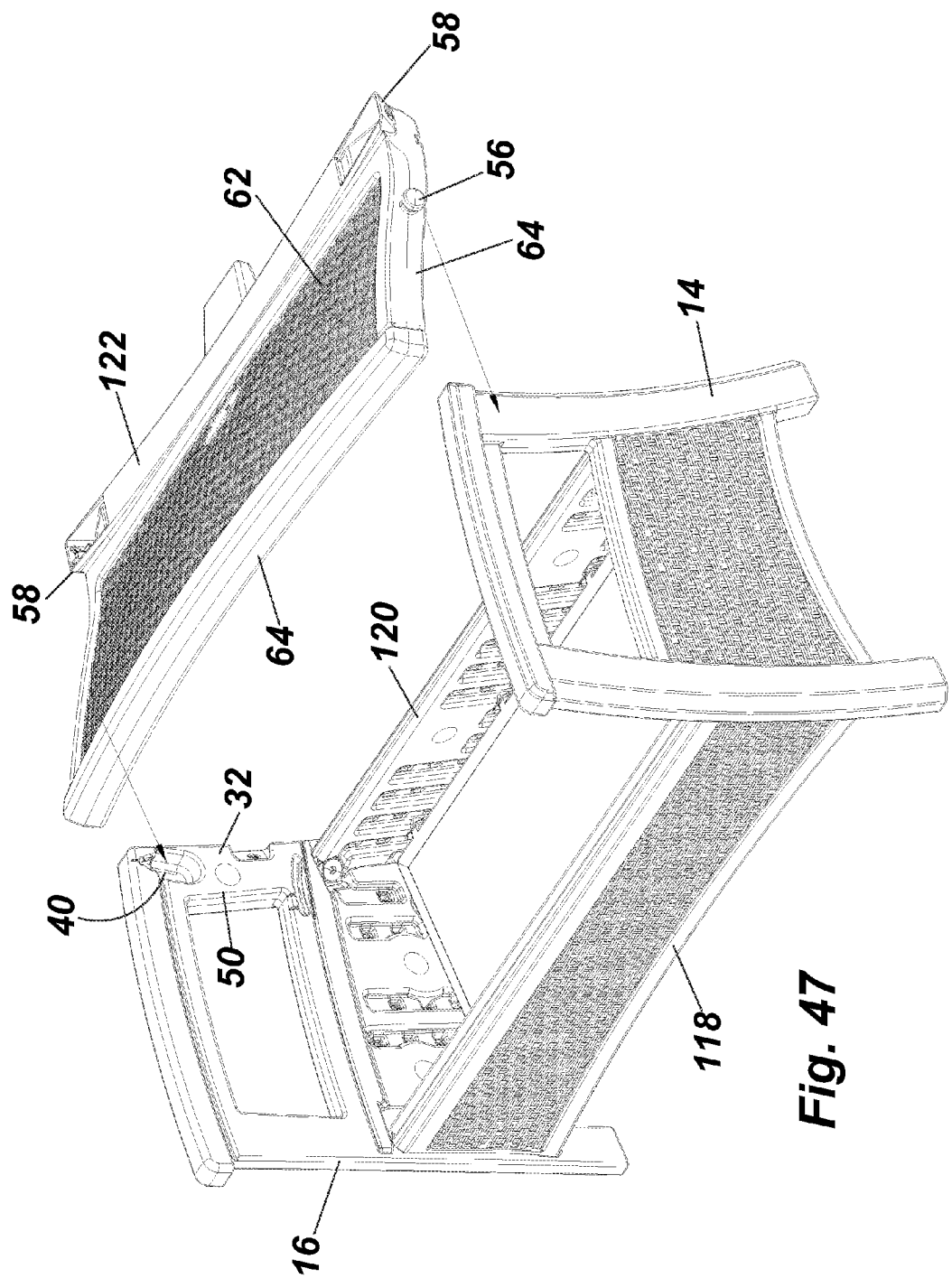
FIG. 47 is a partial perspective view illustrating assembly of the back panel.
Figure 48:
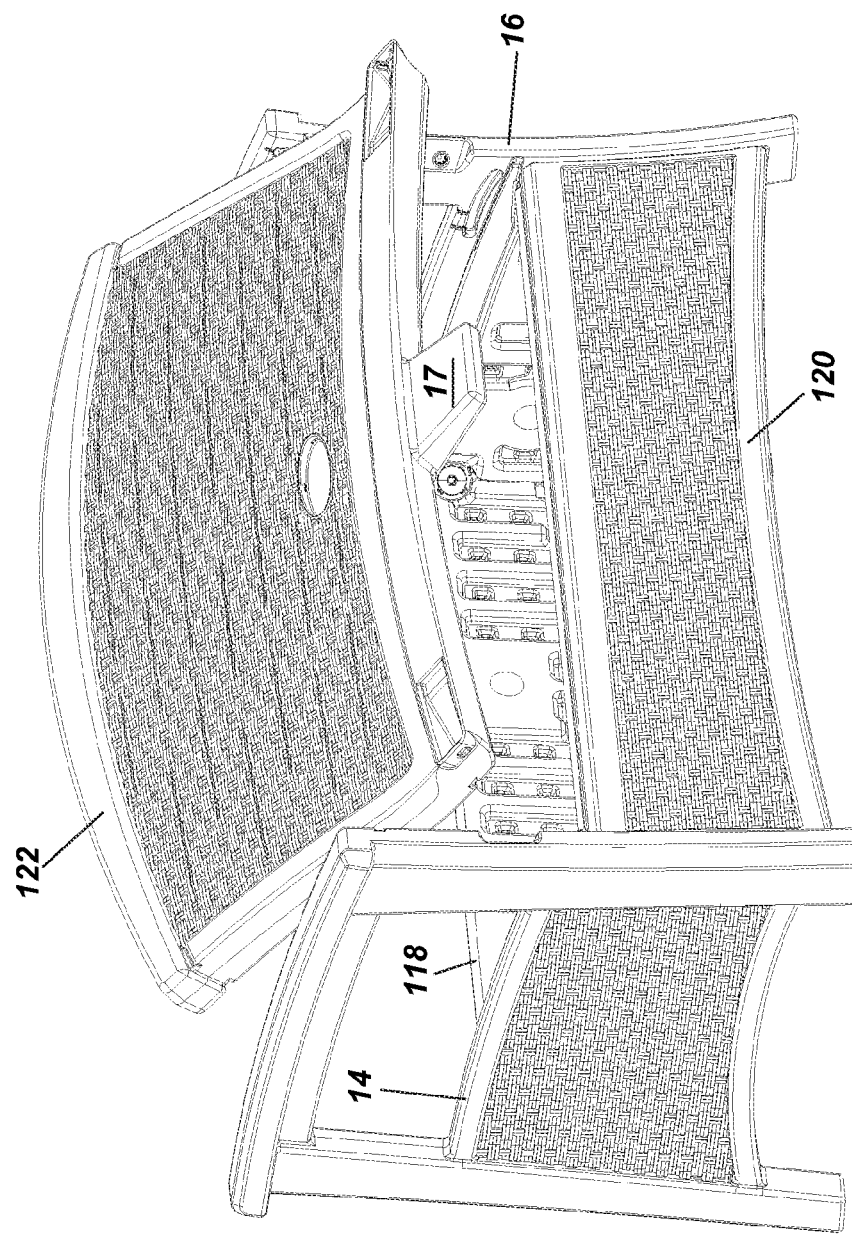
FIG. 48 is a rear perspective view illustrating assembly of the back panel.
Figure 49:
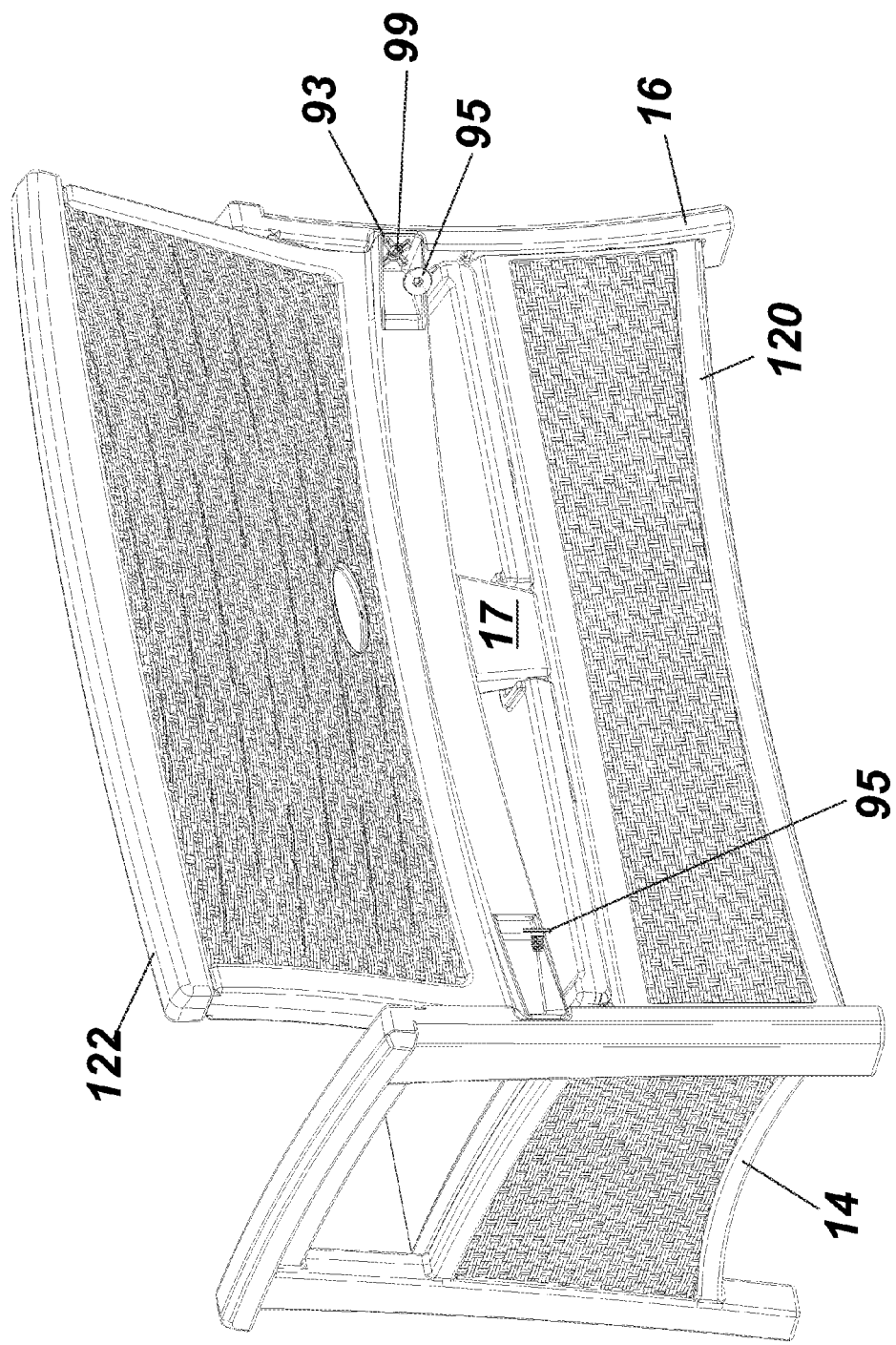
FIG. 49 is a rear perspective view illustrating assembly of the back panel.
Figure 50:
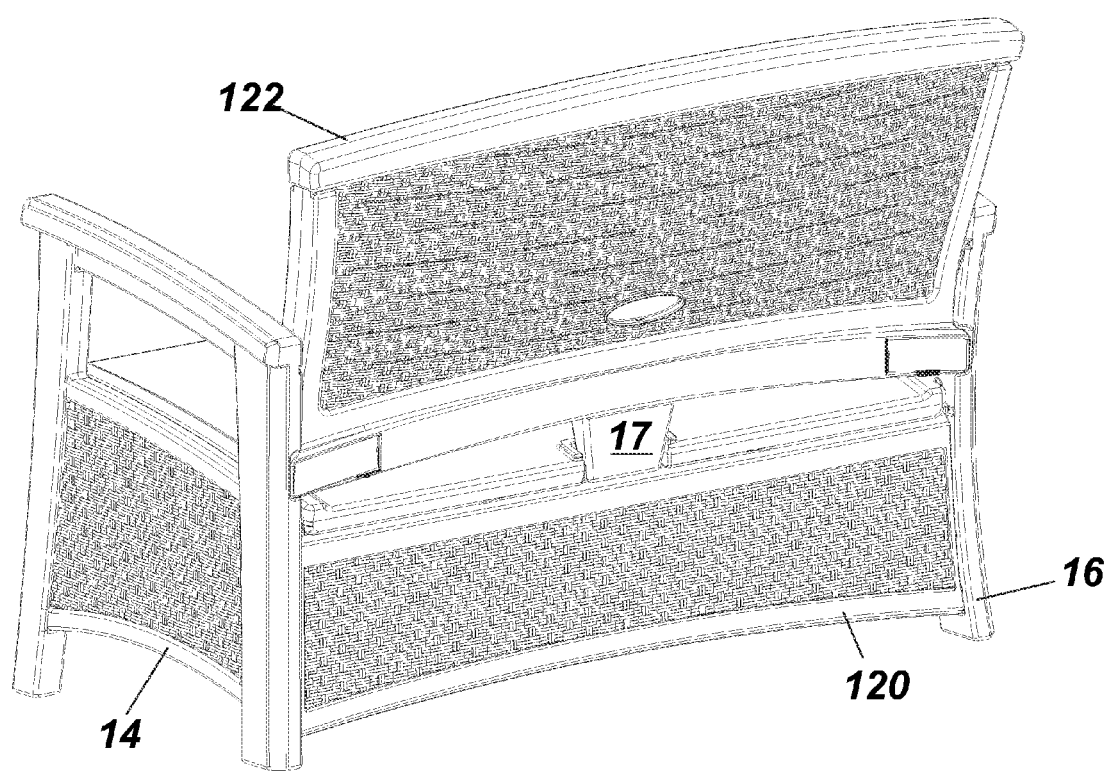
FIG. 50 is a rear perspective view illustrating assembly of the back panel.
Figure 51:
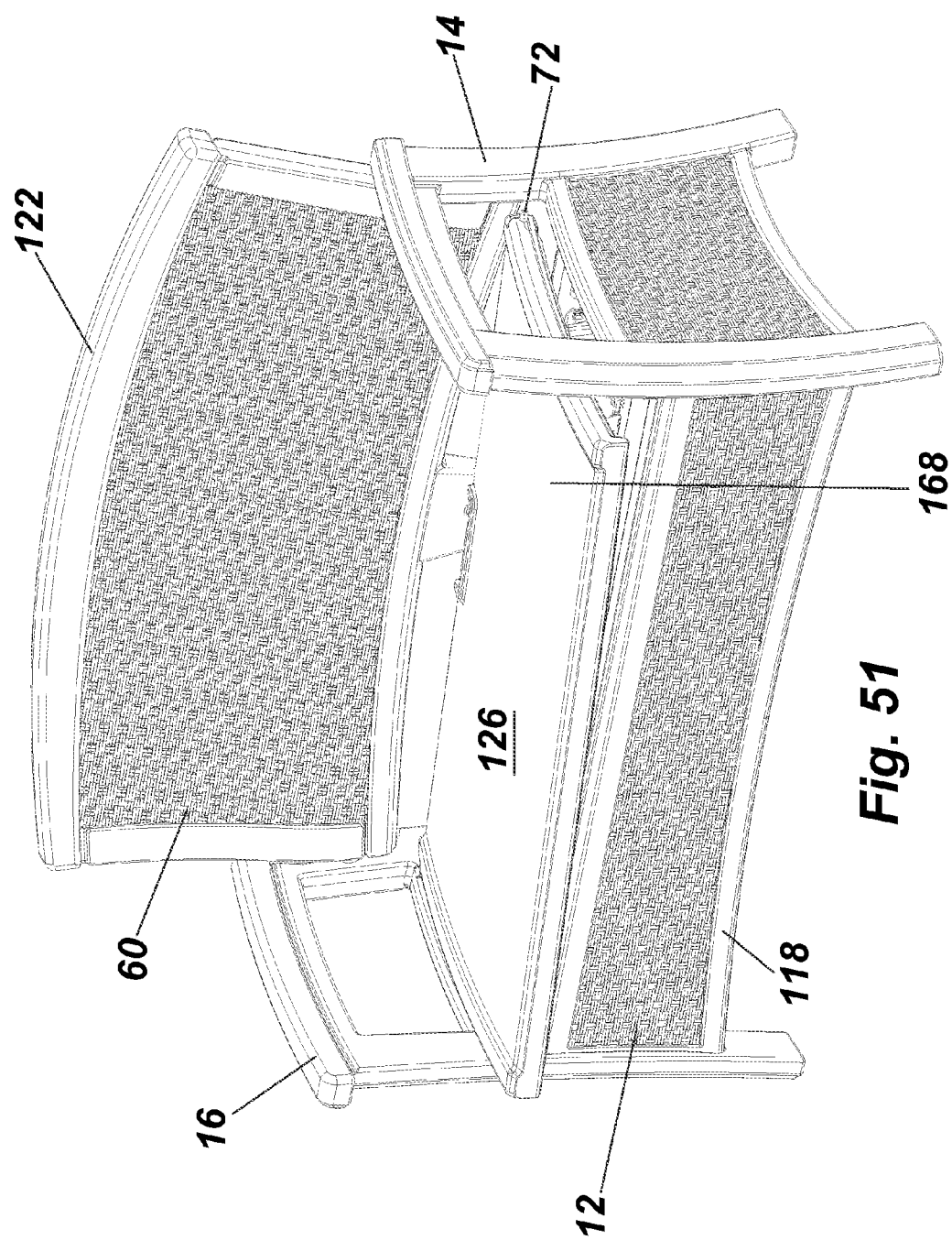
FIG. 51 is a front perspective view illustrating assembly of the seat panel.
Figure 52:
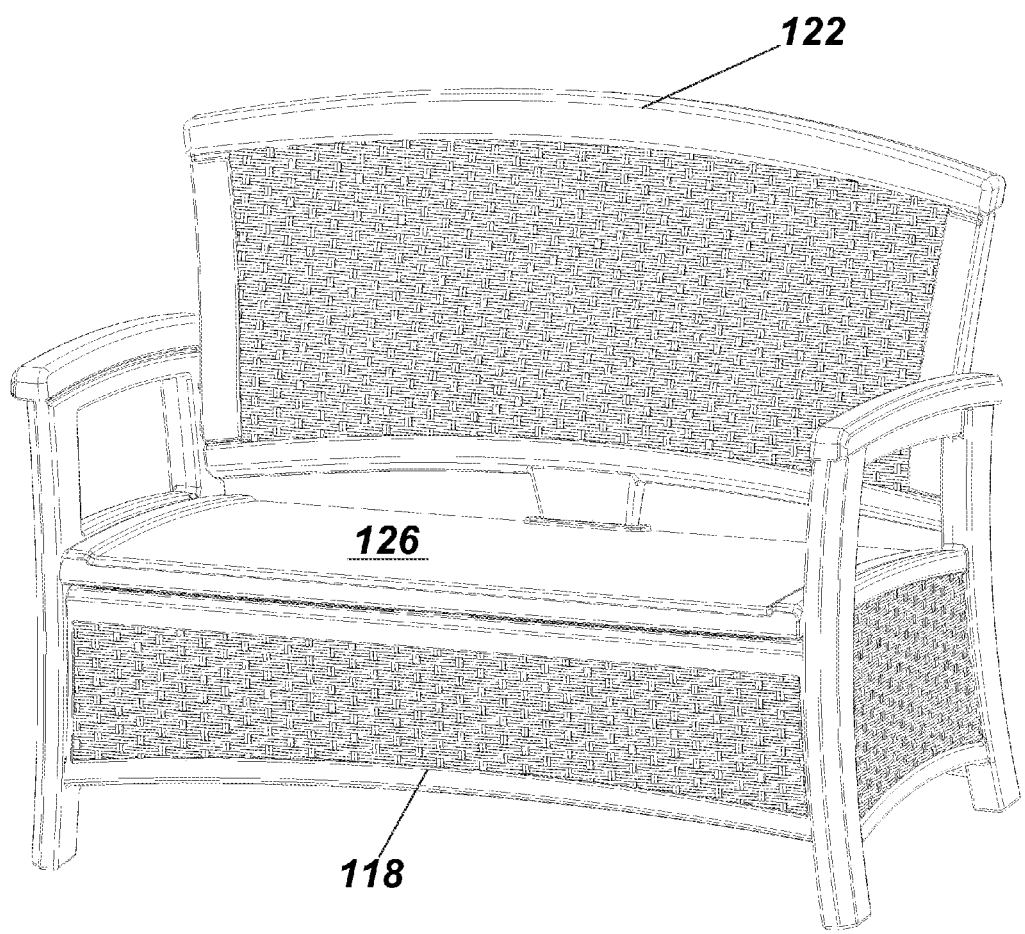
FIG. 52 is a front perspective view illustrating assembly of the seat panel.
Figure 54:
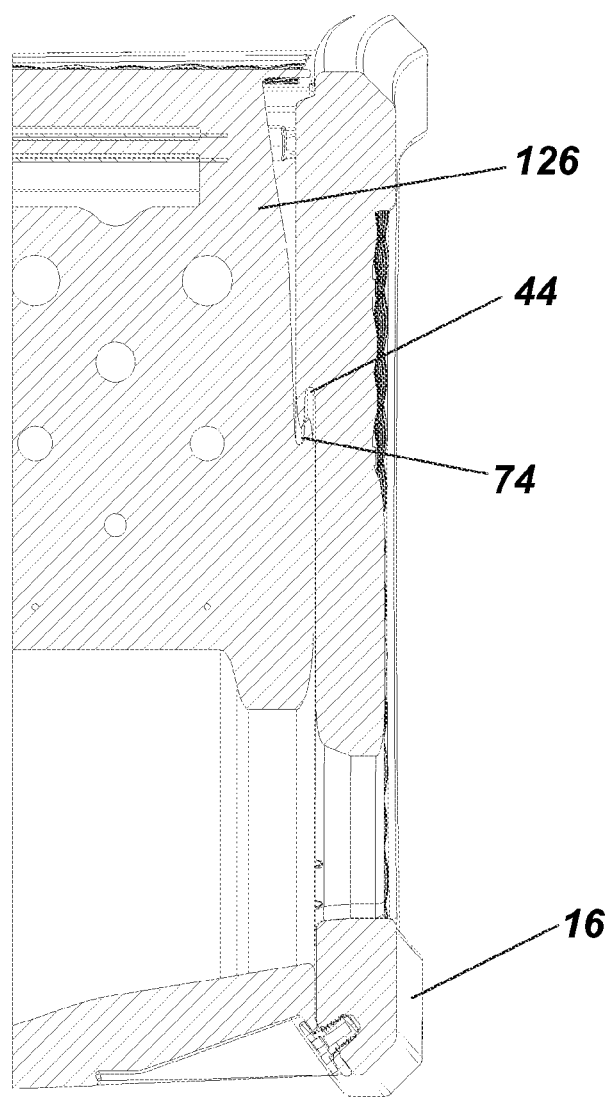
FIG. 54 is a partial section view taken along lines 54-54 of FIG. 53, illustrating the interlocking cooperation between the side panels.
Figure 53:
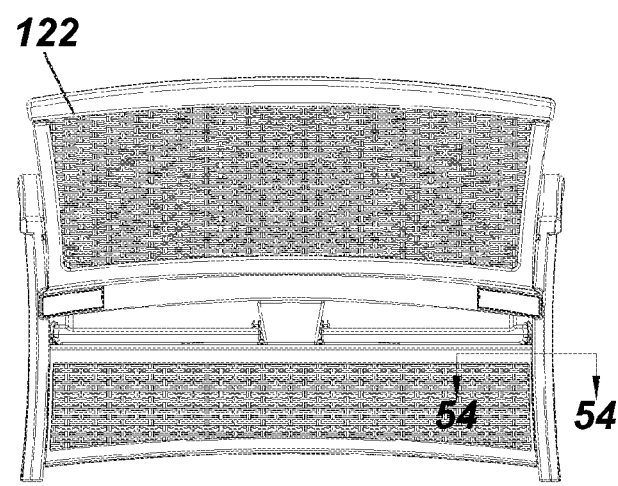
FIG. 53 is a rear view illustrating the assembled back panel.
Figure 55:
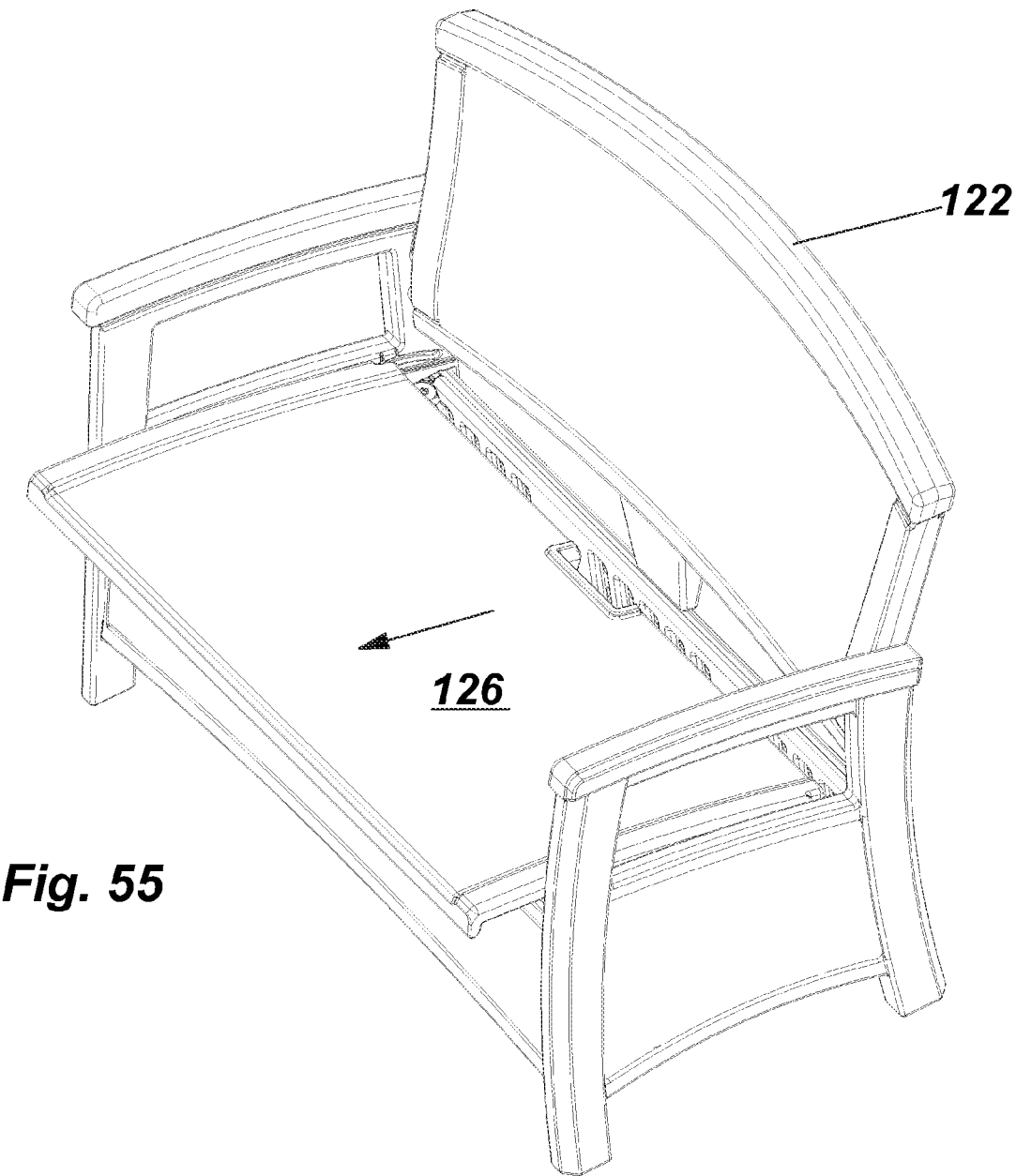
FIG. 55 is a front perspective view illustrating operation of the seat panel to provide access to the internal storage area.
Figure 56:
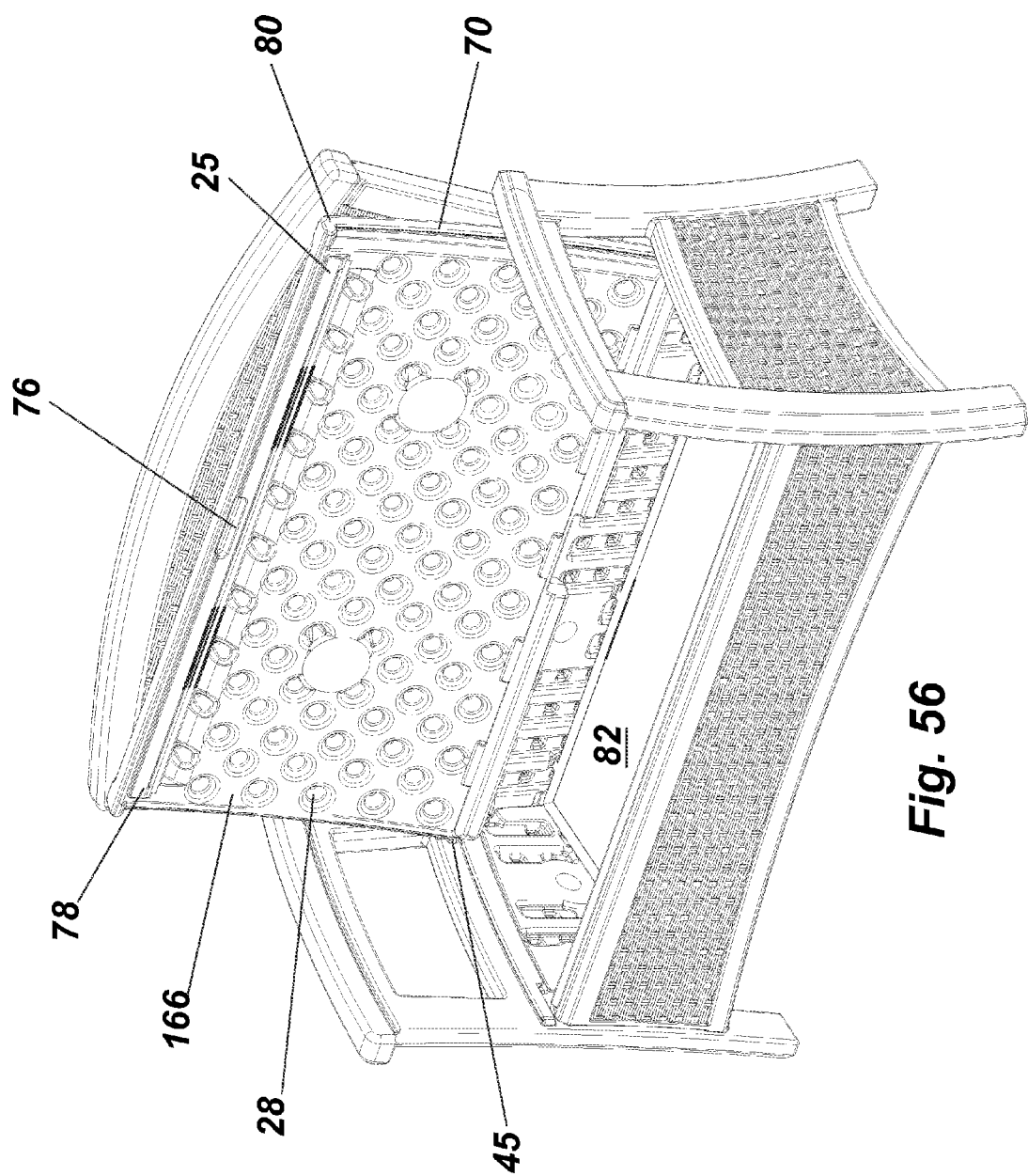
FIG. 56 is a front perspective view illustrating operation of the seat panel to provide access to the internal storage area.
Figure 59:
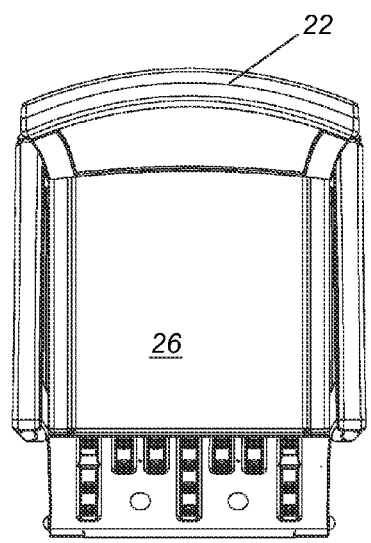
FIG. 59 is a top view of the embodiment illustrated in FIG. 57.
Figure 57:
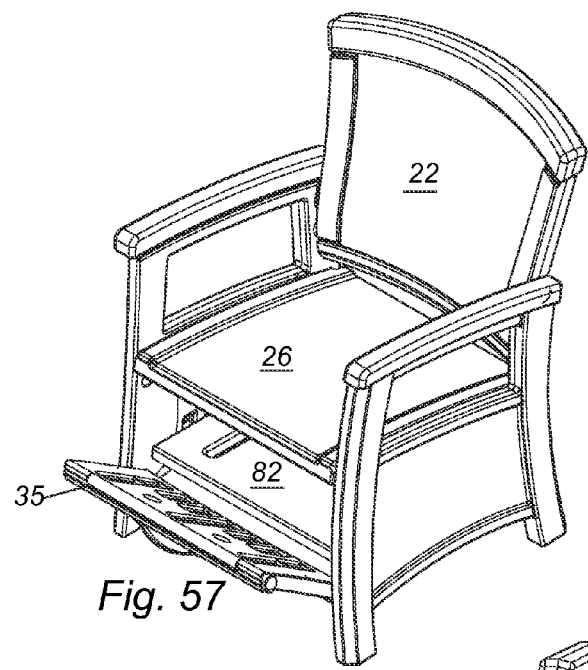
FIG. 57 is a top perspective view of an alternative embodiment of the present invention, illustrated with a pivoting front panel.
Figure 58:
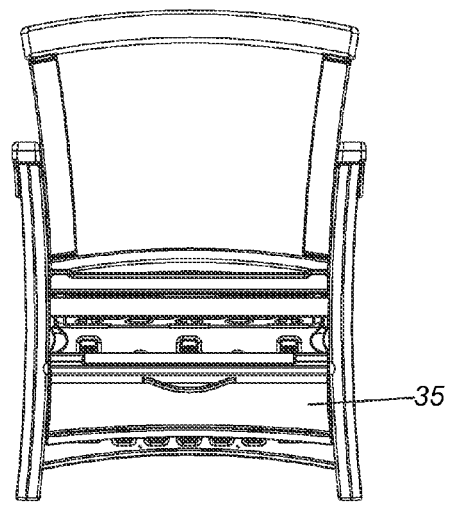
FIG. 58 is a front view of the embodiment illustrated in FIG. 57.
Figure 60:
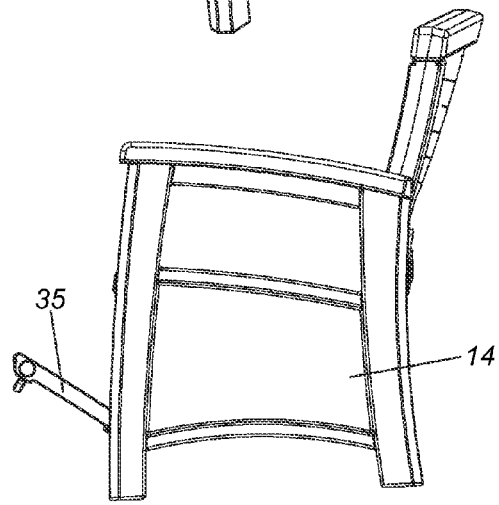
FIG. 60 is a right side view of the embodiment illustrated in FIG. 57.
Figure 63:
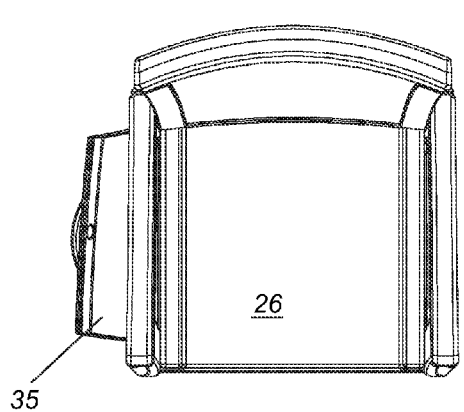
FIG. 63 is a top view of the embodiment illustrated in FIG. 61.
Figure 61:
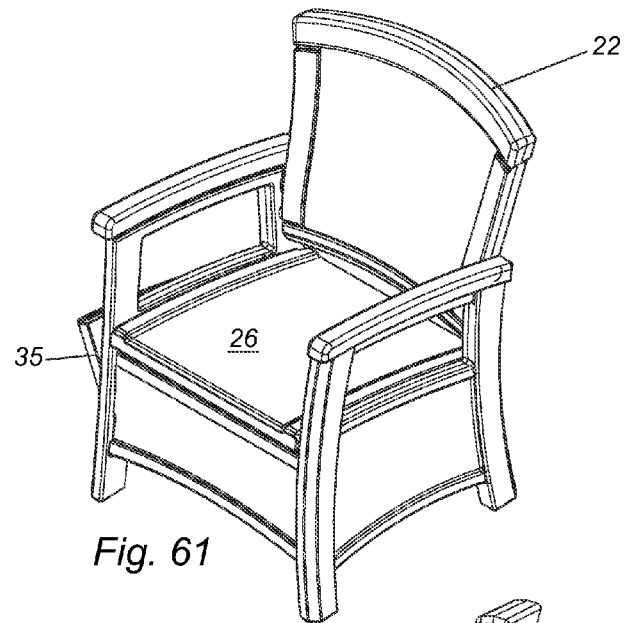
FIG. 61 is a top perspective view of an alternative embodiment of the present invention, illustrated with a pivoting side panel.
Figure 62:
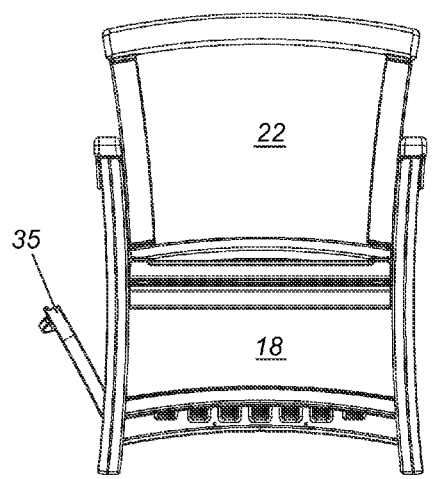
FIG. 62 is a front view of the embodiment illustrated in FIG. 61.
Figure 64:
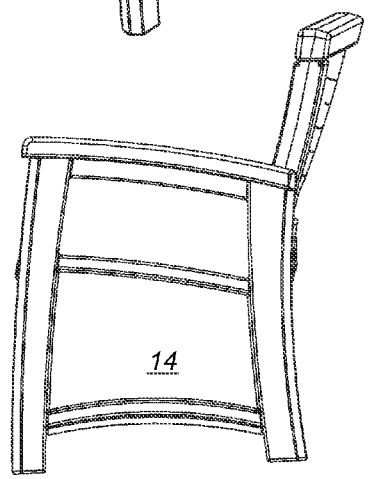
FIG. 64 is a right side view of the embodiment illustrated in FIG. 61.
Figure 65:
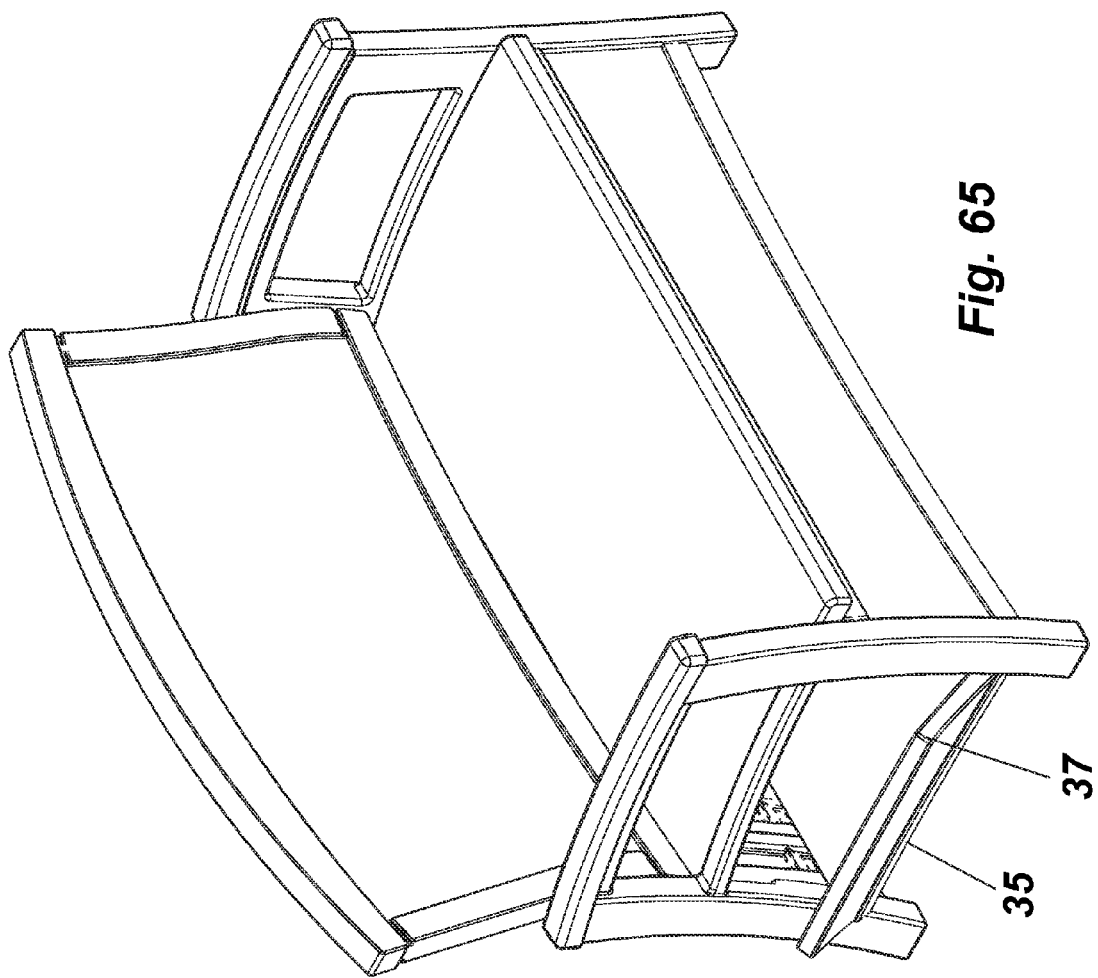
FIG. 65 is a top perspective view of an alternative embodiment of the present invention, illustrated with two pivoting side panels.
Figure 66:
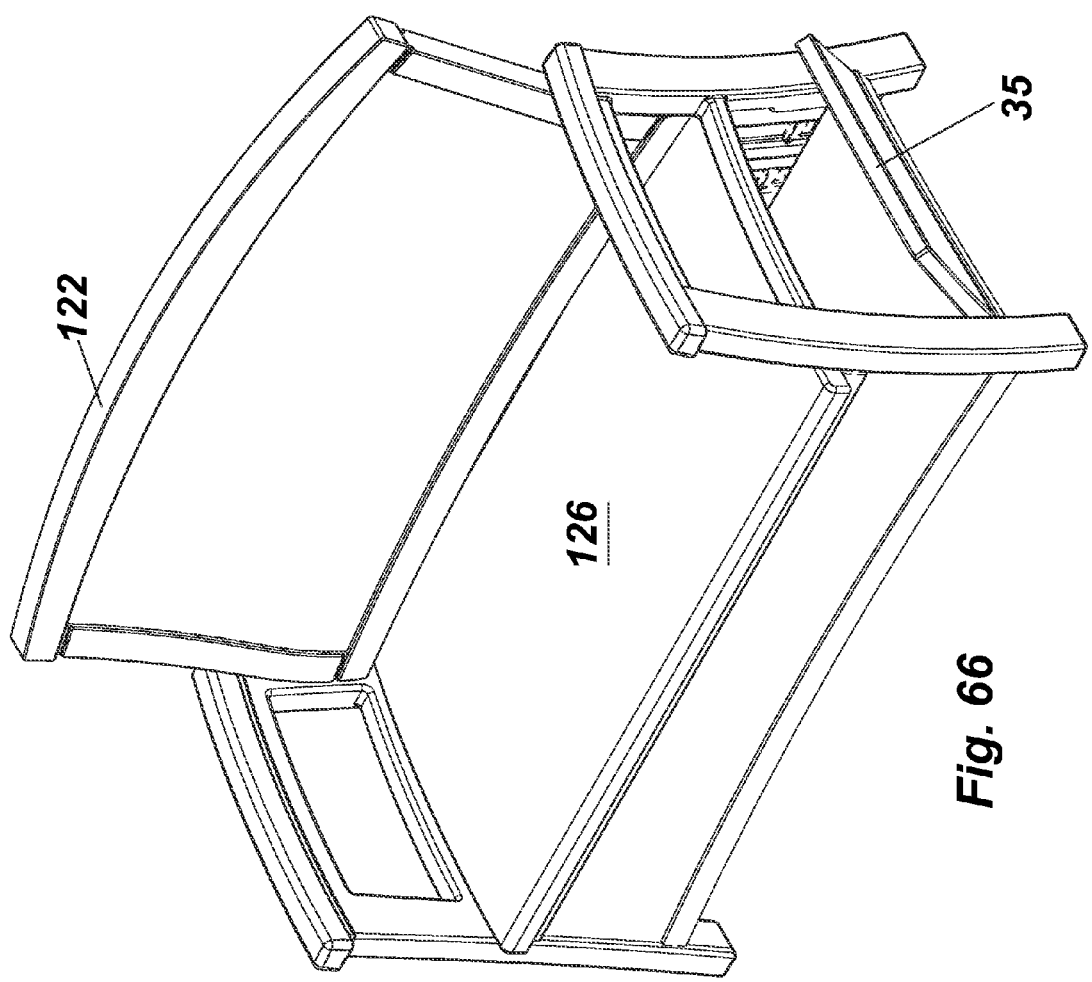
FIG. 66 is a top right perspective view of the embodiment illustrated in FIG. 65.
Figure 67:
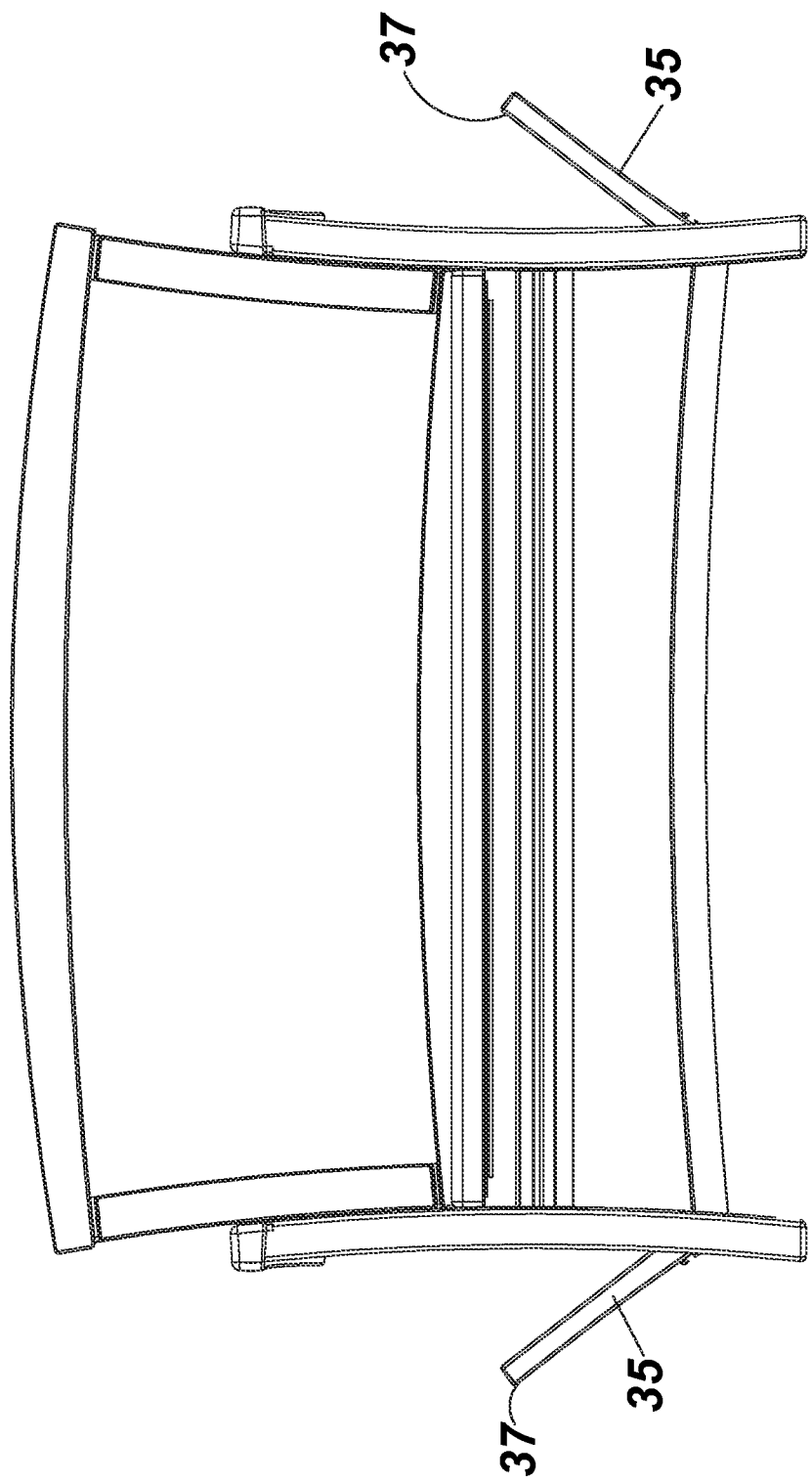
FIG. 67 is a front view of the embodiment illustrated in FIG. 65.
Figure 68:
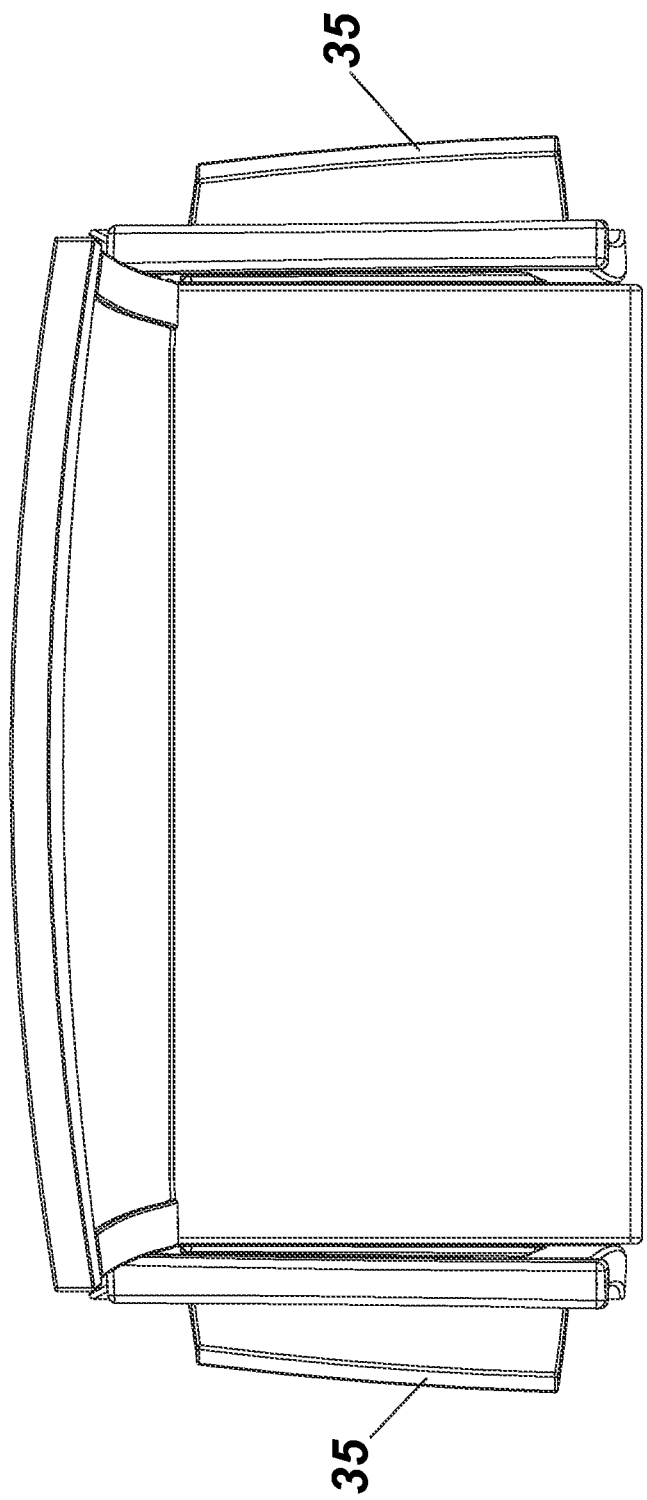
FIG. 68 is a top view of the embodiment illustrated in FIG. 65.
Figure 69:
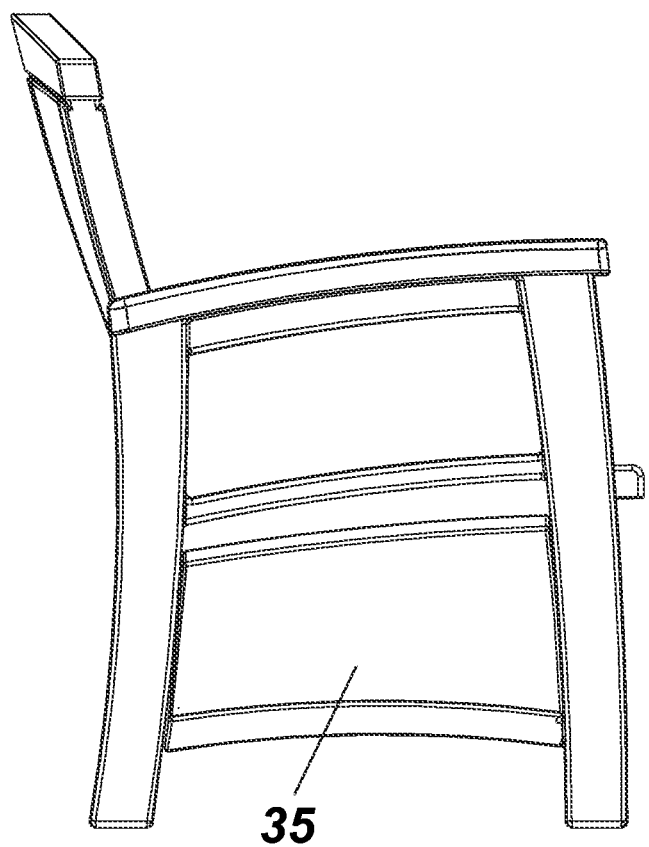
FIG. 69 is a left side view of the embodiment illustrated in FIG. 65.
Figure 70:
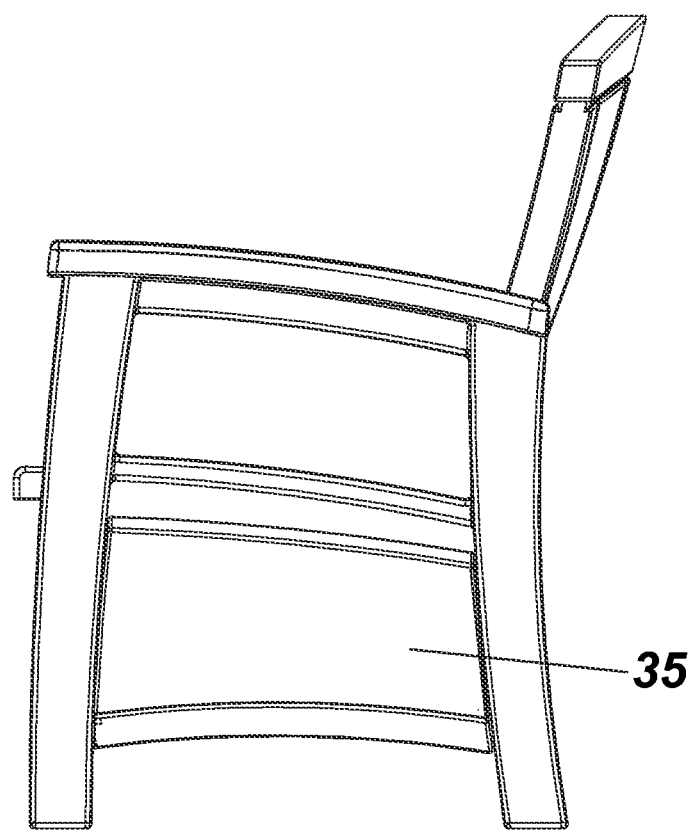
FIG. 70 is a right side view of the embodiment illustrated in FIG. 65.
Figure 75:
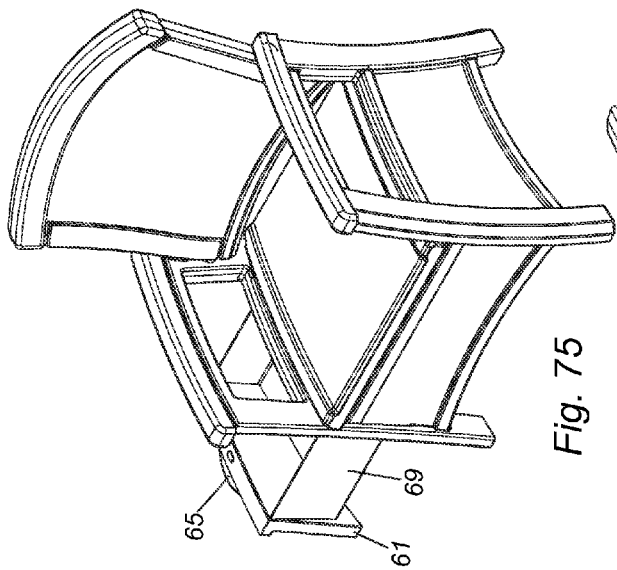
FIG. 75 is a top perspective view of an alternative embodiment of the present invention, illustrated with a sliding drawer within the storage space.
Figure 78:
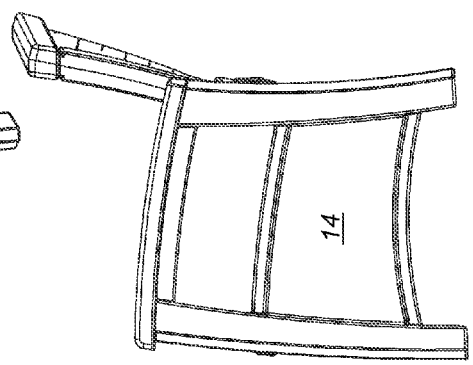
FIG. 78 is a right side view of the embodiment illustrated in FIG. 75.
Figure 77:
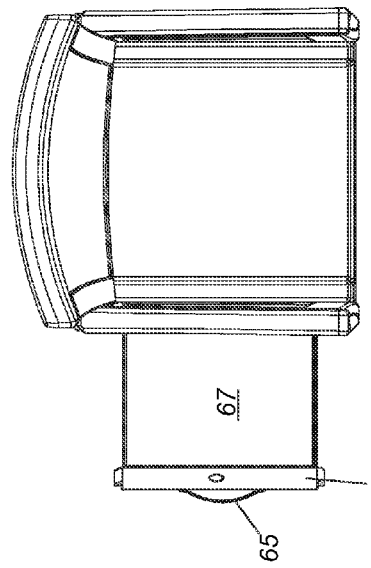
FIG. 77 is a top view of the embodiment illustrated in FIG. 75.
Figure 76:
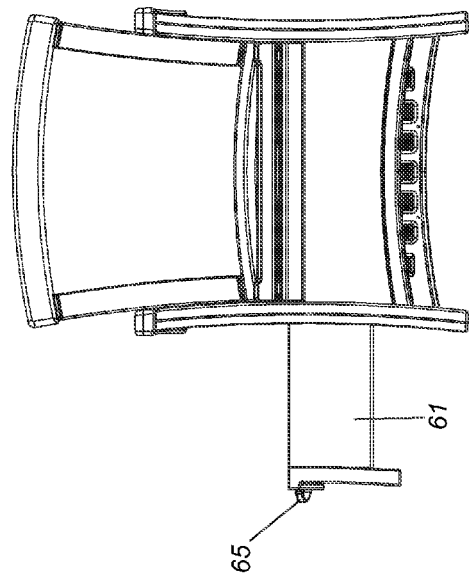
FIG. 76 is a front view of the embodiment illustrated in FIG. 75.

Referring to FIGS. 25, 45 and 46, assembly of the bottom panel 24, 124 is illustrated. In general, the bottom panel is constructed as a hollow enclosed member by the process of blow molding, and may include outwardly extending pins 21 and posts 23 which cooperate with the end structures 14, 16 as well as the front and rear panels 18, 118, 20, 120. In the preferred embodiment, the bottom panel 24, 124 is secured to the furniture structure by inverting the furniture structure for access to the bottom area thereof. The pins 21 of the bottom panel 24, 124 are guided into the offset slots 94 until reaching the end of the offset slot where a side shift of the bottom panel causes the pins to snap past a detent 65 which holds the pins in position, allowing the bottom panel to be rotated until the posts 23 contact the wedge locks 46, 47. Continued pressure causes the inner wall of the end panels to flex sufficiently to allow the bottom panel to pass the lower wedge locks 47 and come into contact with the upper wedge locks 46, securing the bottom panel in position. In an alternative embodiment, fasteners or the like may be utilized to secure the bottom panel into position.

Figure 28:
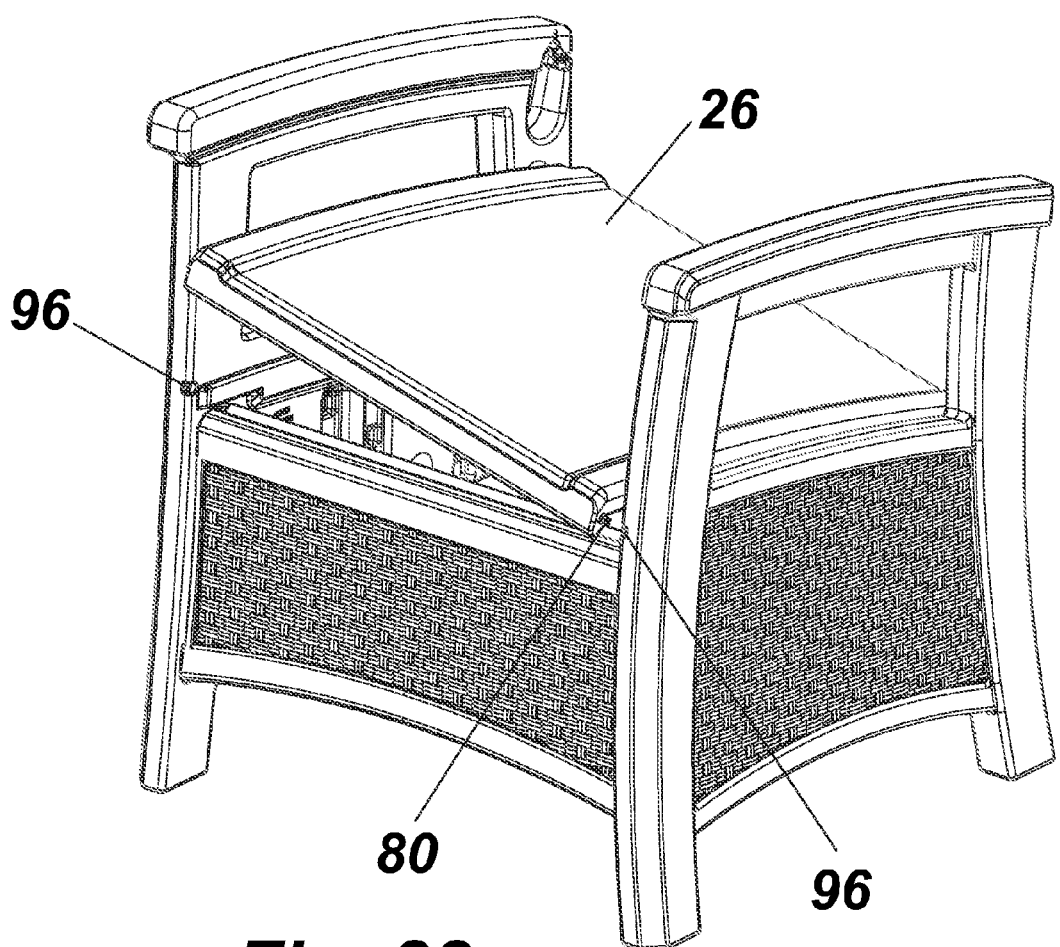
FIG. 28 is a partial perspective view, illustrating installation of the seat member.
Figure 29:
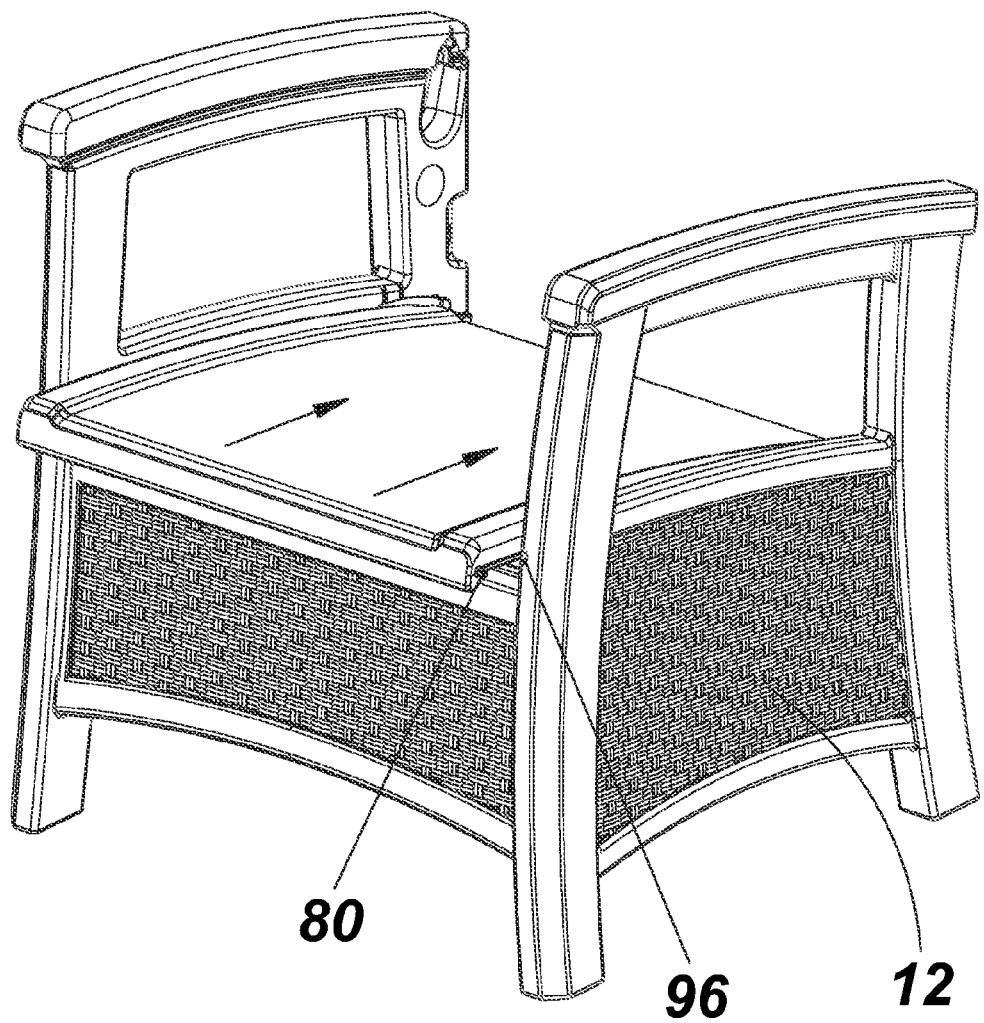
FIG. 29 is a partial perspective view of the embodiment shown in FIG. 28, illustrating the seat member in an unlatched position for accessing the storage area.
Figure 30:
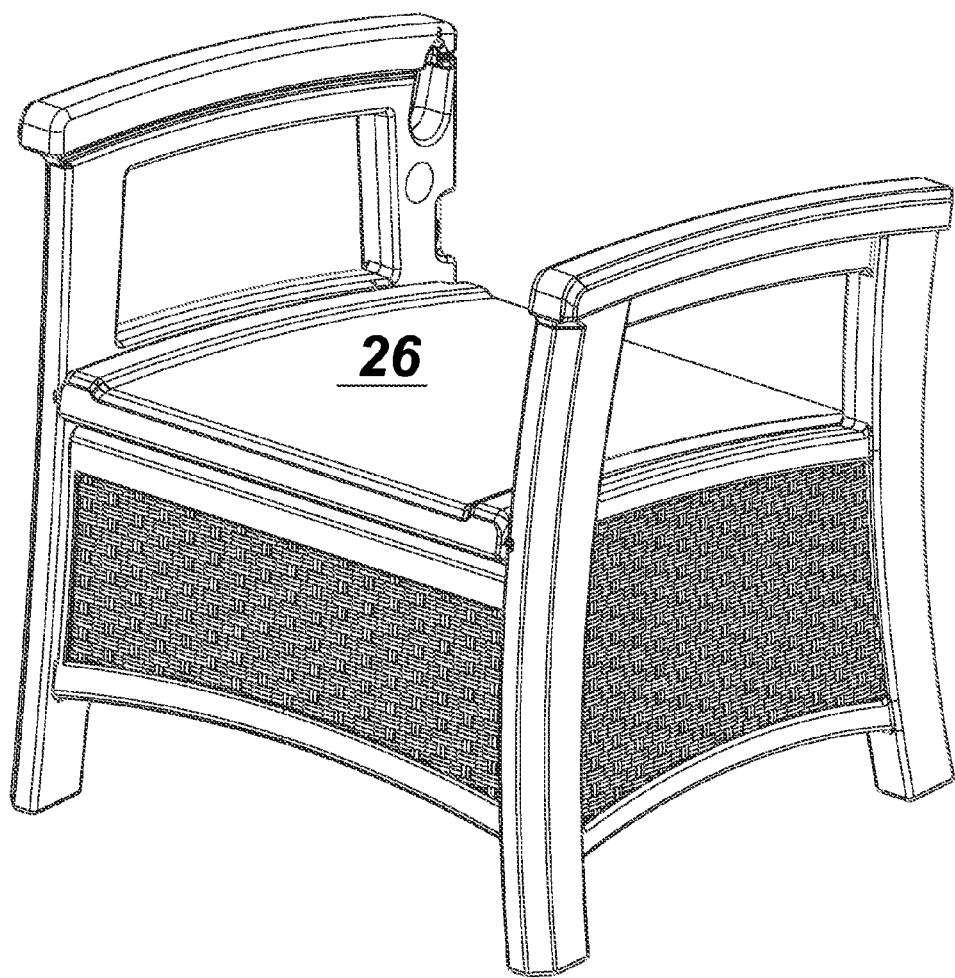
FIG. 30 is a partial perspective view of the embodiment shown in FIG. 1, illustrating the seat panel in a latched position.
Figure 31:
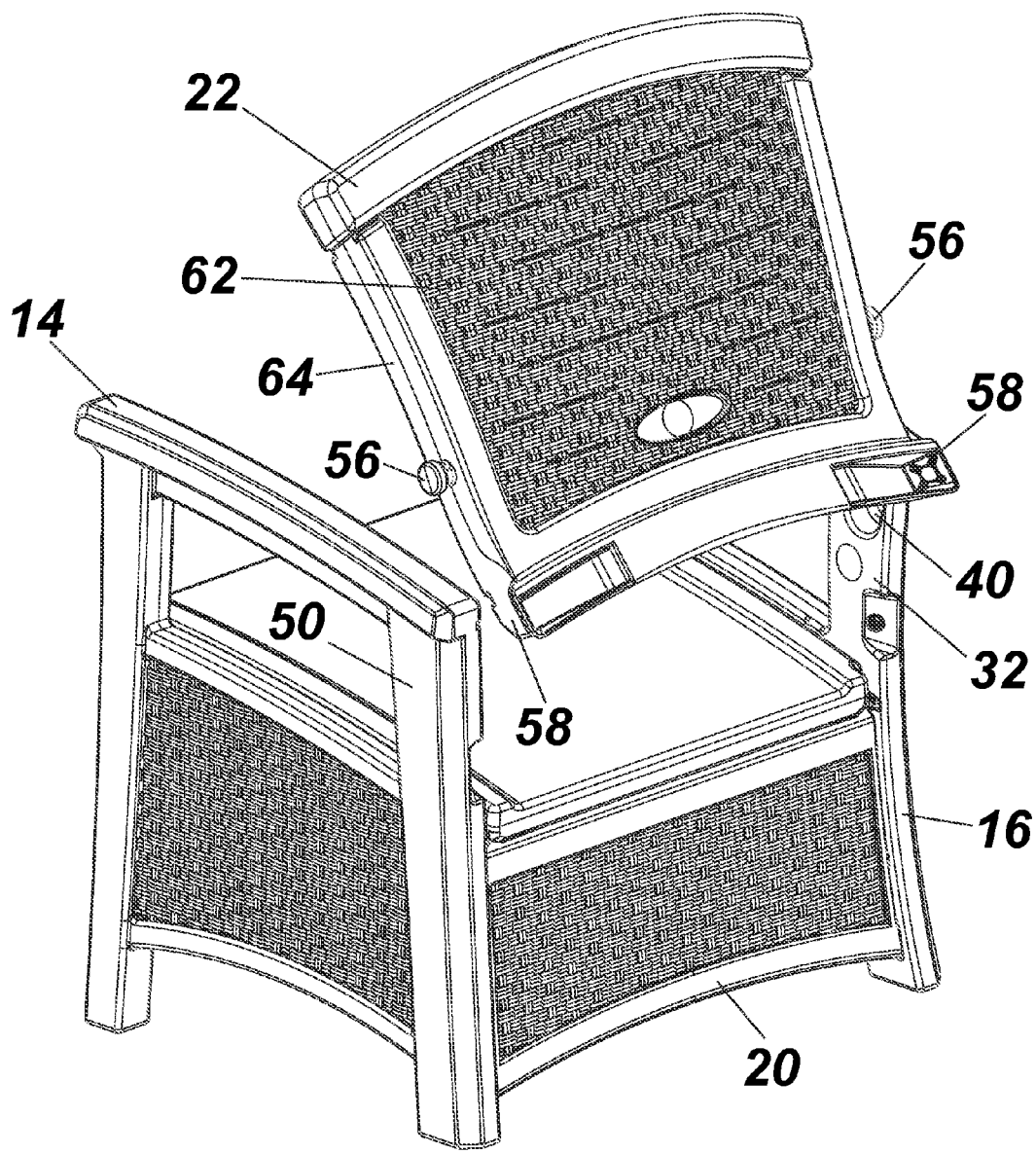
FIG. 31 is a rear perspective view illustrating assembly of the back panel.
Figure 32:
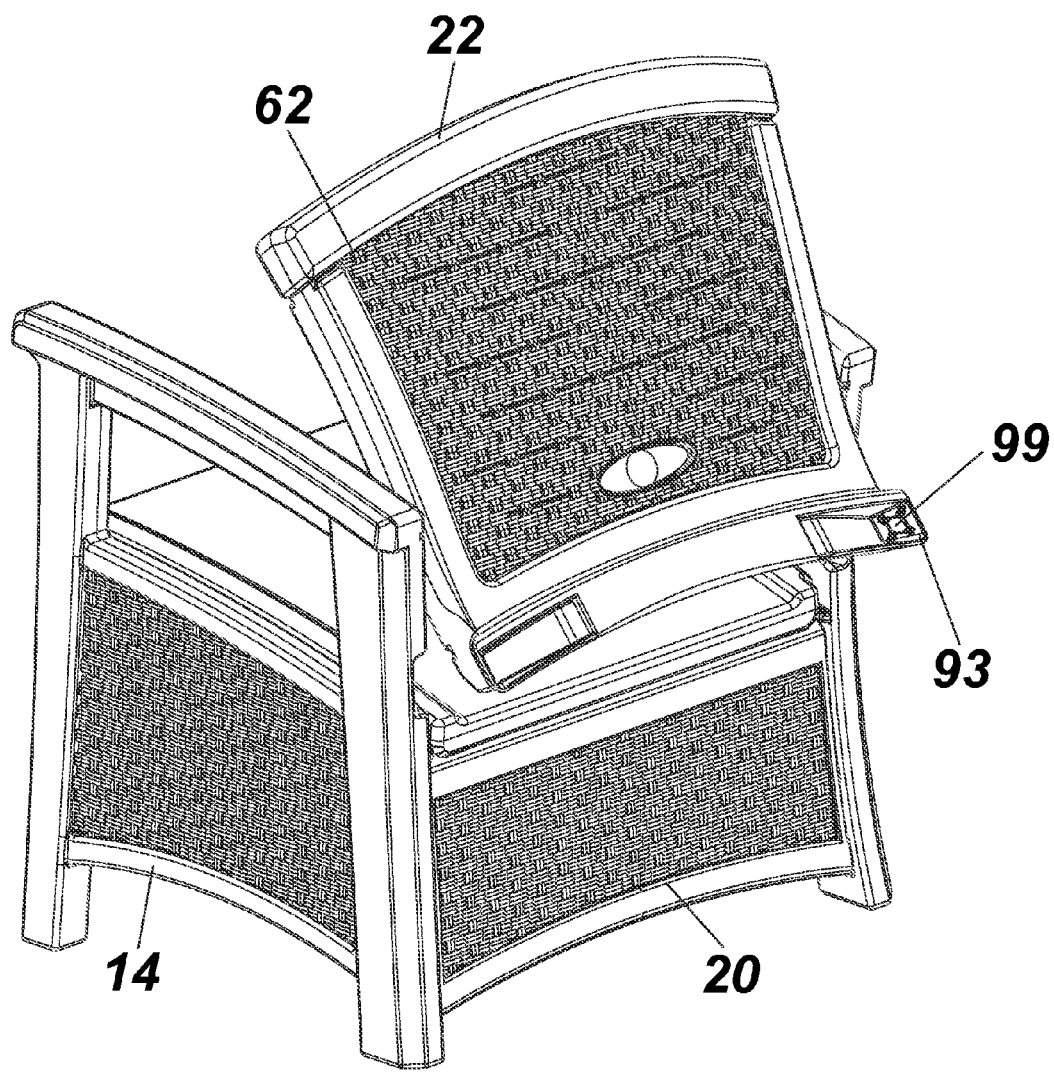
FIG. 32 is a rear perspective view illustrating assembly of the back panel.
Figure 33:
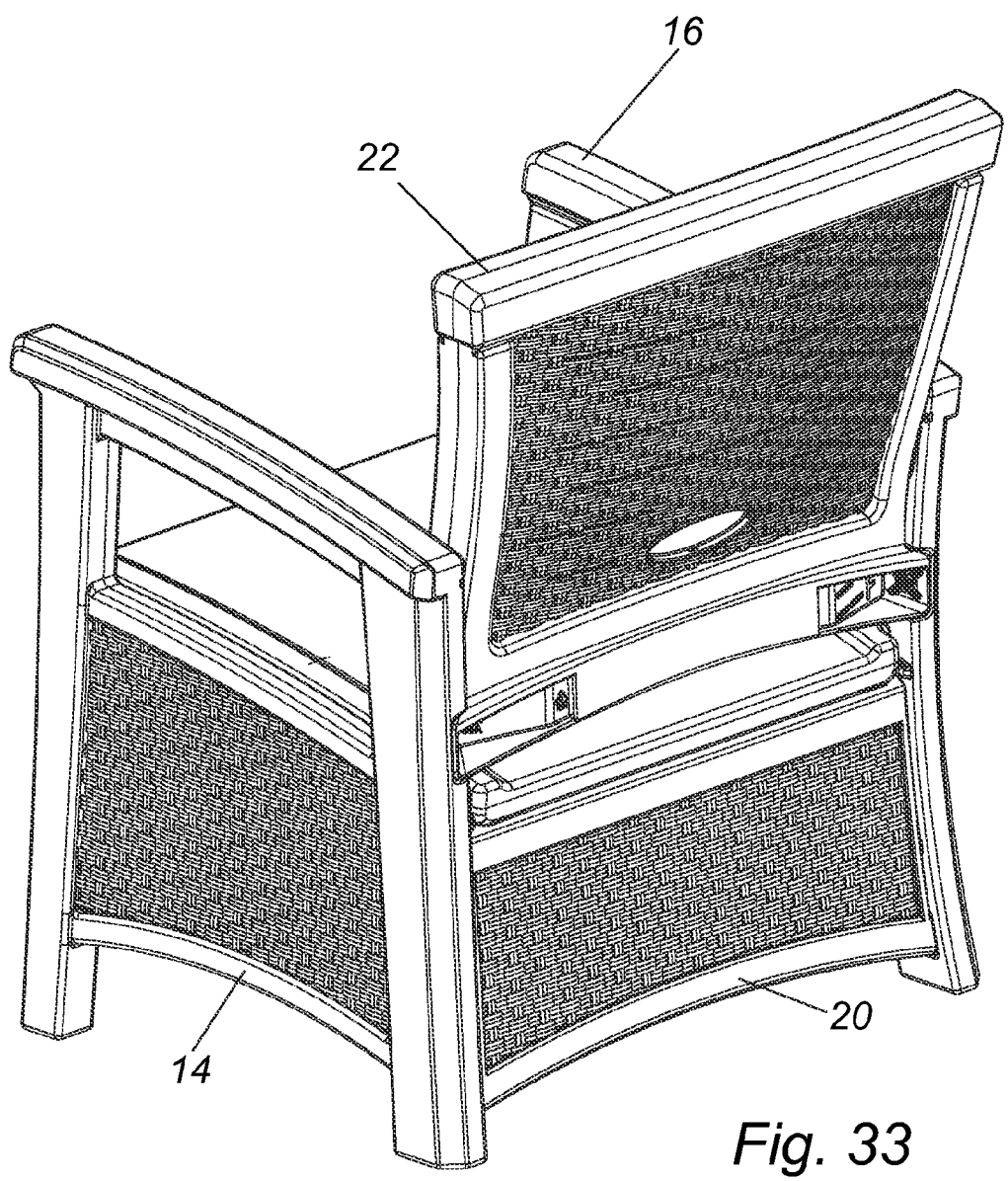
FIG. 33 is a rear perspective view illustrating assembly of the back panel.
Figure 34:
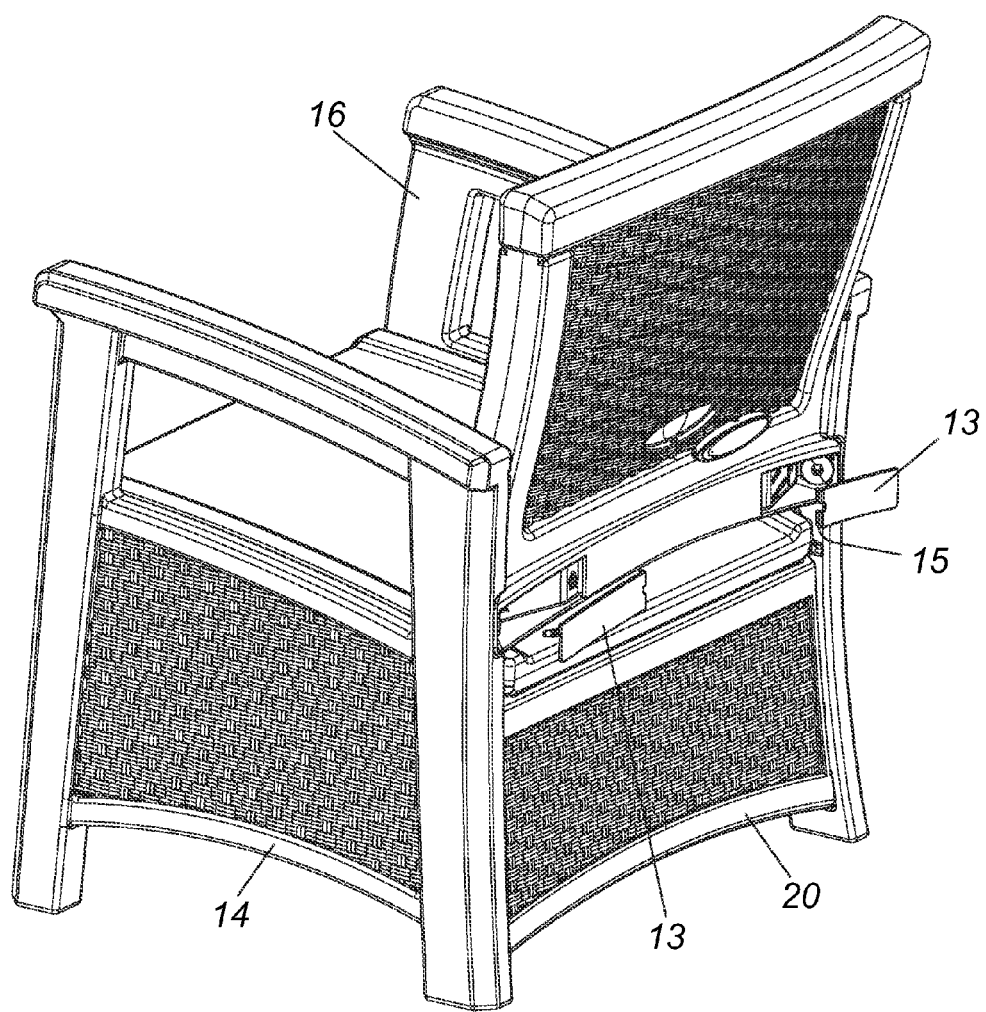
FIG. 34 is a rear perspective view illustrating assembly of the back panel.
Figure 36:
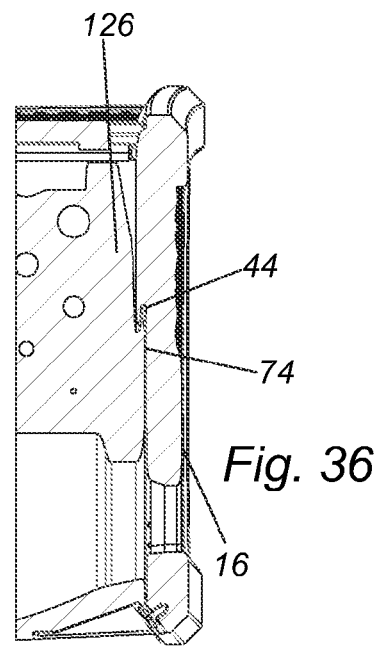
FIG. 36 is a partial section view taken along lines 36-36 of FIG. 35, illustrating one embodiment of the connection between the back panel and the side panels.
Figure 35:
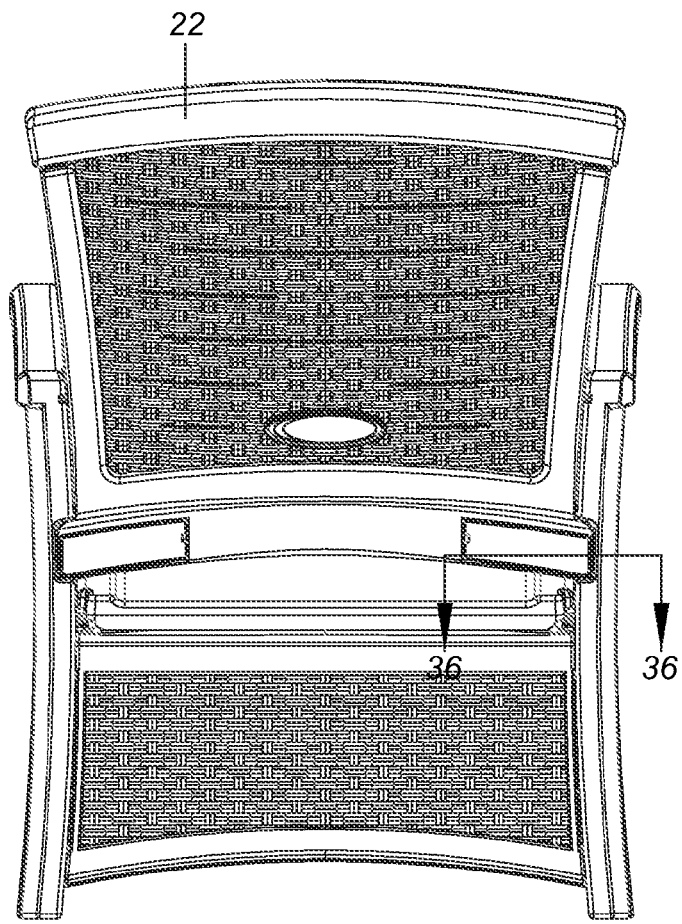
FIG. 35 is a rear view illustrating an assembled back panel.
Figure 37:
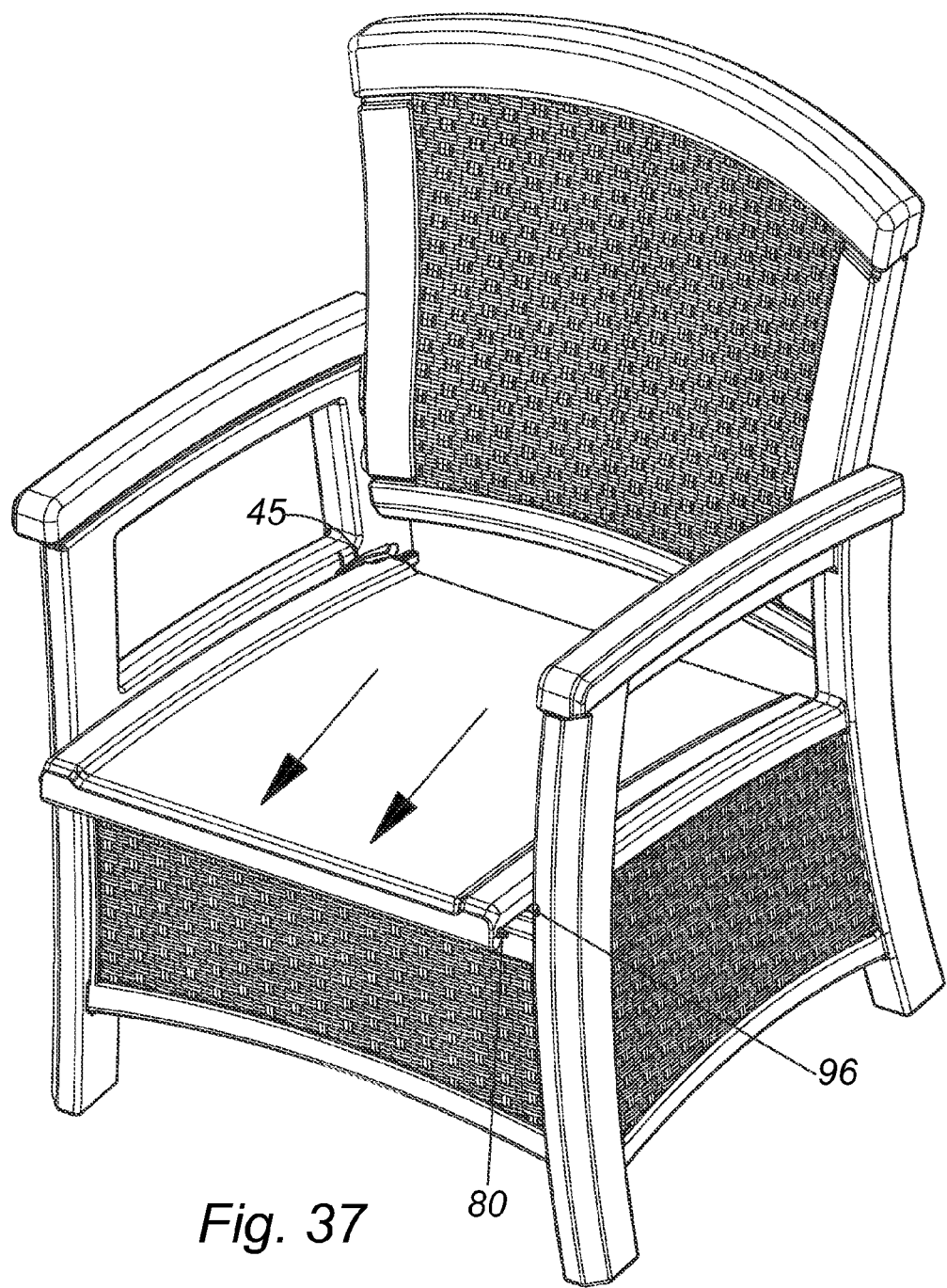
FIG. 37 is a front perspective view illustrating access to the interior storage compartment.
Figure 38:
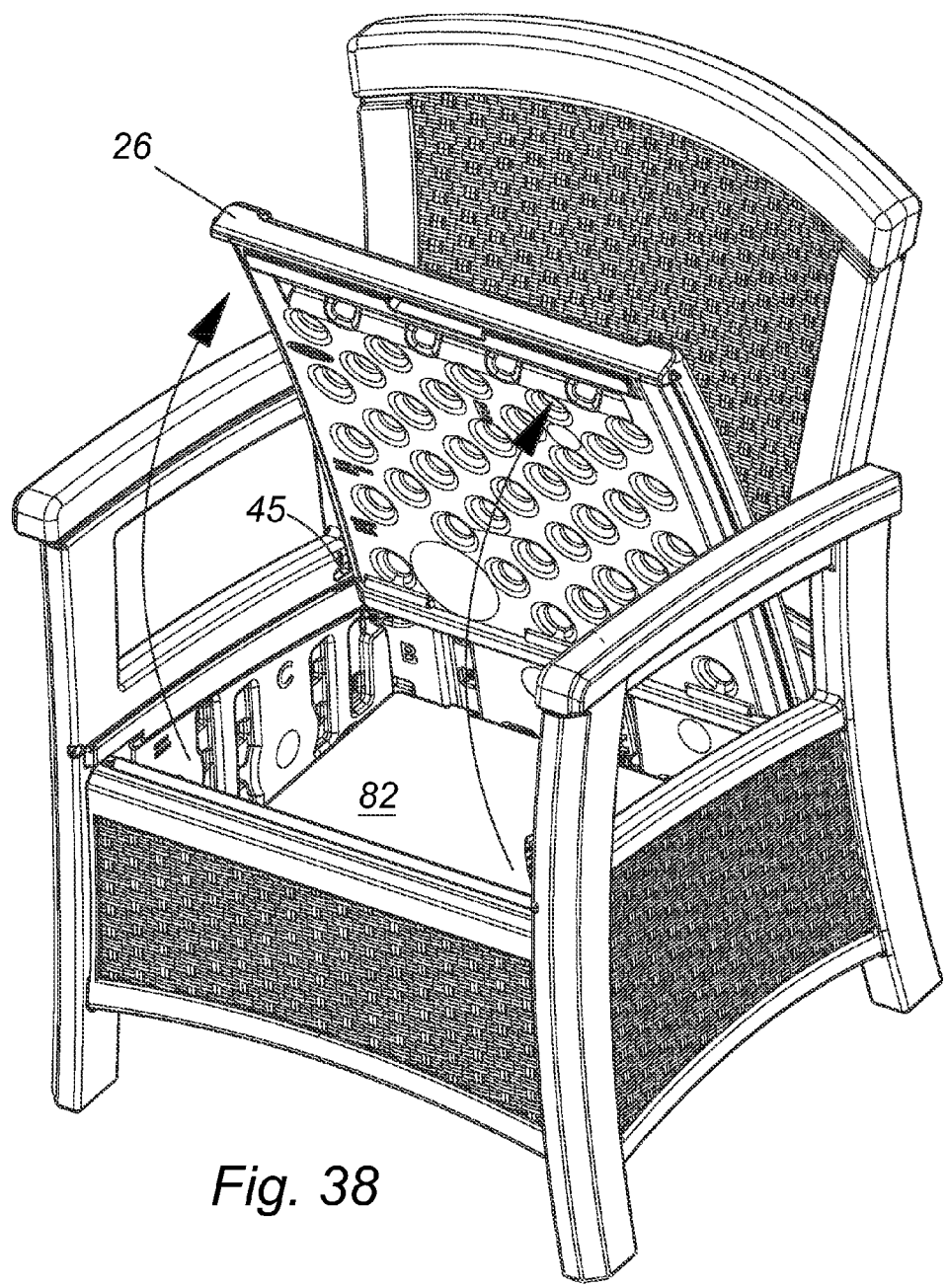
FIG. 38 is a front perspective view illustrating access to the interior storage compartment.
Figure 40:
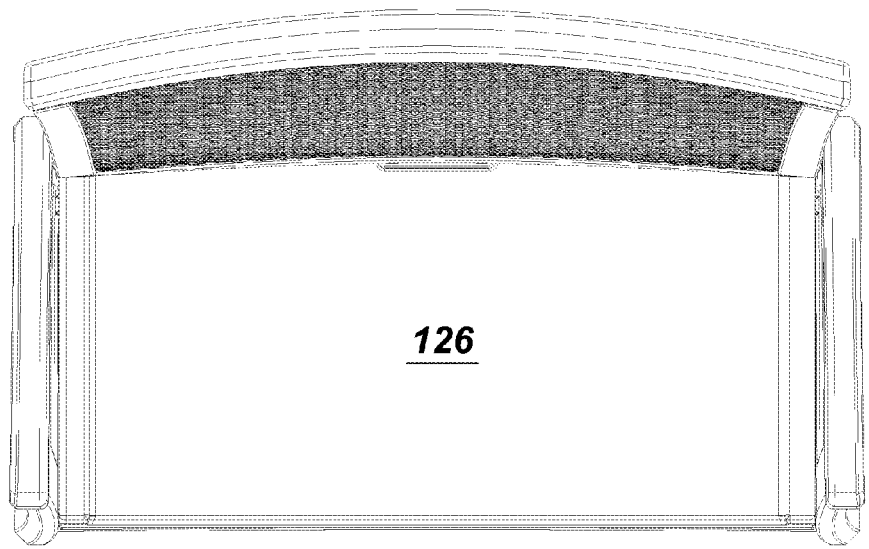
FIG. 40 is a top view of the embodiment illustrated in FIG. 39.
Figure 39:
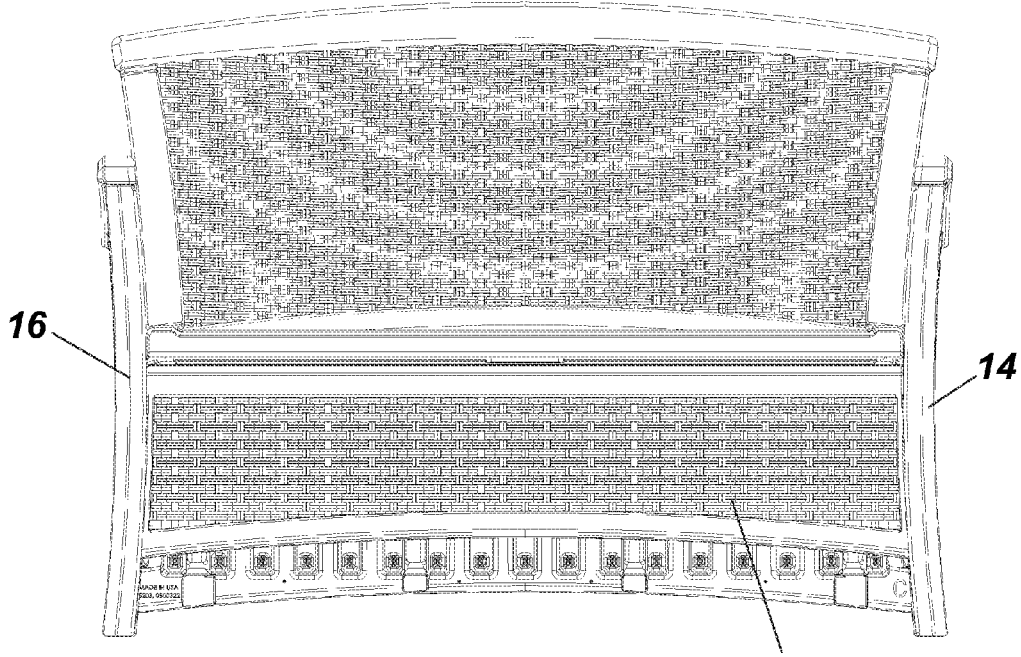
FIG. 39 is a front view of an alternative embodiment of the present device in the form of a couch or love seat.
Figure 41:
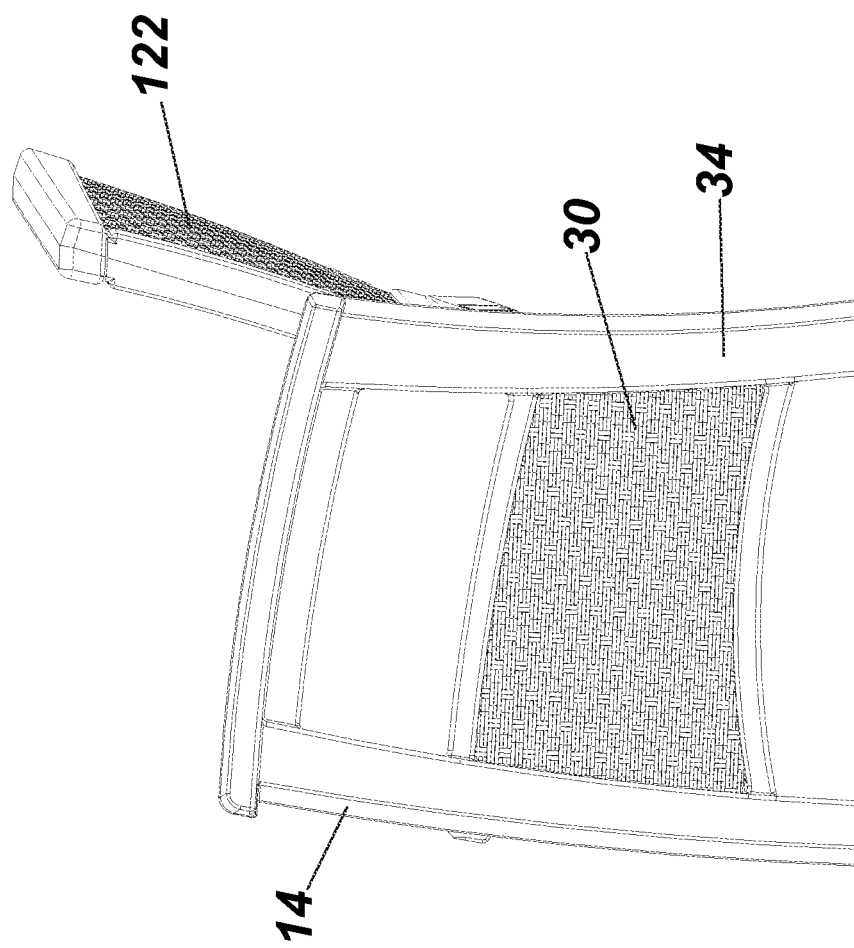
FIG. 41 is an end view of the embodiment illustrated in FIG. 39.

Referring to FIGS. 12-20, 26-38 and 51-56, construction, installation and operation of the seat panel 26, 126 is illustrated. In general, the seat panel 26, 126 is formed as a hollow structure to include an inner wall 66, 166, an outer wall 68, 168, and edge walls 70. The inner wall 66, 166 includes tack offs 28 as well as a metal pocket 78 to provide structural integrity to the seat panel 26, 126. The tack offs 28 connect the inner and outer walls 66, 68 together, or place them in close proximity, while the pocket is sized to accept a steel bar 25. In a preferred embodiment, the pocket 78 is constructed and arranged to allow for a snap fit of the steel bar 25 into the pocket 78. However, it should be noted that fasteners may be used in addition to or in place of the snap fit arrangement without departing from the scope of the invention. Snap detents 80 are formed as protuberances on the edge walls 70 for cooperation with the seat panel catch 96 positioned on the inner surface of the end panels 14, 16 to hold the seat panel 26, 126 in a releasably closed position. A hand grip 76 is formed into the inner wall 66 for use in manipulating the seat panel between open and closed positions. Hinge pins 72 are provided along the edge wall 70 for sliding and pivoting connection to the elongated hinge slot 45 positioned on the inner wall 32 of the end structures 14, 16. In operation, the seat panel 26, 126 is tilted to insert one hinge pin 72 into a hinge slot 45 (FIG. 28, 44, 51). The seat panel is pressed downwardly until the opposite hinge pin 72 engages the hinge slot 45, allowing the seat panel to slide back and forth for the length of the hinge slot, as illustrated in FIGS. 29-30 and 52-55, while being pivotable to allow access to the inner portion 82 of the box structure 12. The inner portion 82 of the box structure 12 can be utilized for weather resistant storage of any object that will fit within the inner portion. One example would be storage of cushions for the chair (not shown). The inner portion, thereby, provides a dry and insect resistant area for storage. In this manner, cushions and other items prone to mold growth, when not enclosed, can be stored within the chair for extended periods of time and taken out as needed for use. The detents 80 cooperate with the panel catches 96 to hold the seat panel in the rearward position. Pulling the seat panel 26, 126 forward (FIGS. 37-55) allows the rotation of the seat panel for access to the inner portion/storage area 82 within the structural box 12. When in a closed position, the rain gutter 44 (FIG. 54) on the inner wall 32 of the end structure 14, 16 provides support to the side portions of the seat panel 26 while also cooperating with the rain gutter bead 74 positioned on the inner wall 66 of the seat panel 26, 126 to channel water away from the inner portion of the box structure 12 to keep contents stored therein dry. In addition, a tortuous path 84 (FIG. 43) may be provided between the end structures and the front and rear panels to reduce the ability of insects finding their way into the inner portion.

Referring to FIGS. 61-70, alternative embodiments of the present device are illustrated. These embodiments are constructed to be the same as the previous embodiment, with the addition of at least one pivoting side door 35 which provides access to the internal storage area 82. Each pivoting side door 35 includes a hinge assembly, which may be the same or similar to the hinge assembly utilized for seat member 26, 126. Catch member 37 is preferably formed to an edge of each pivoting assembly for cooperation with an end member for holding the pivoting door in a releasably closed position.

Figure 79:
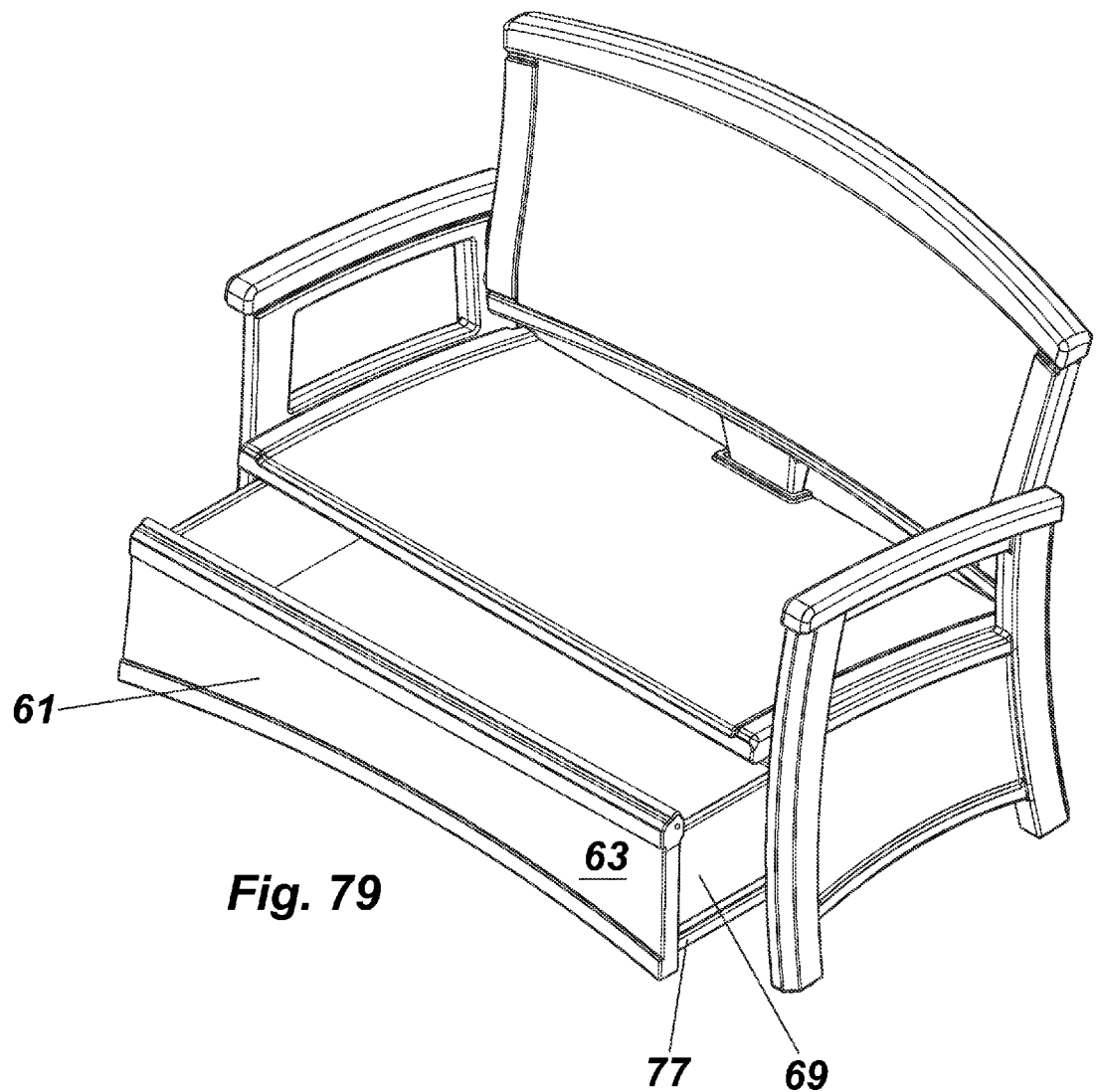
FIG. 79 is a top perspective view of an alternative embodiment of the present invention, illustrated with a sliding drawer within the storage space.
Figure 80:
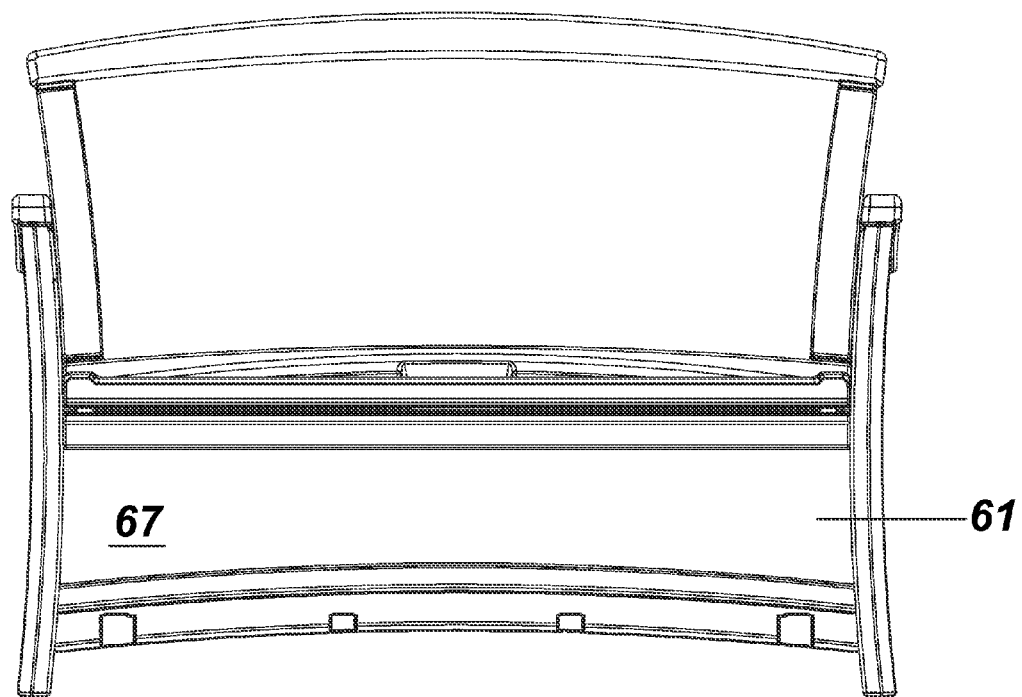
FIG. 80 is a front view of the embodiment illustrated in FIG. 79.
Figure 81:
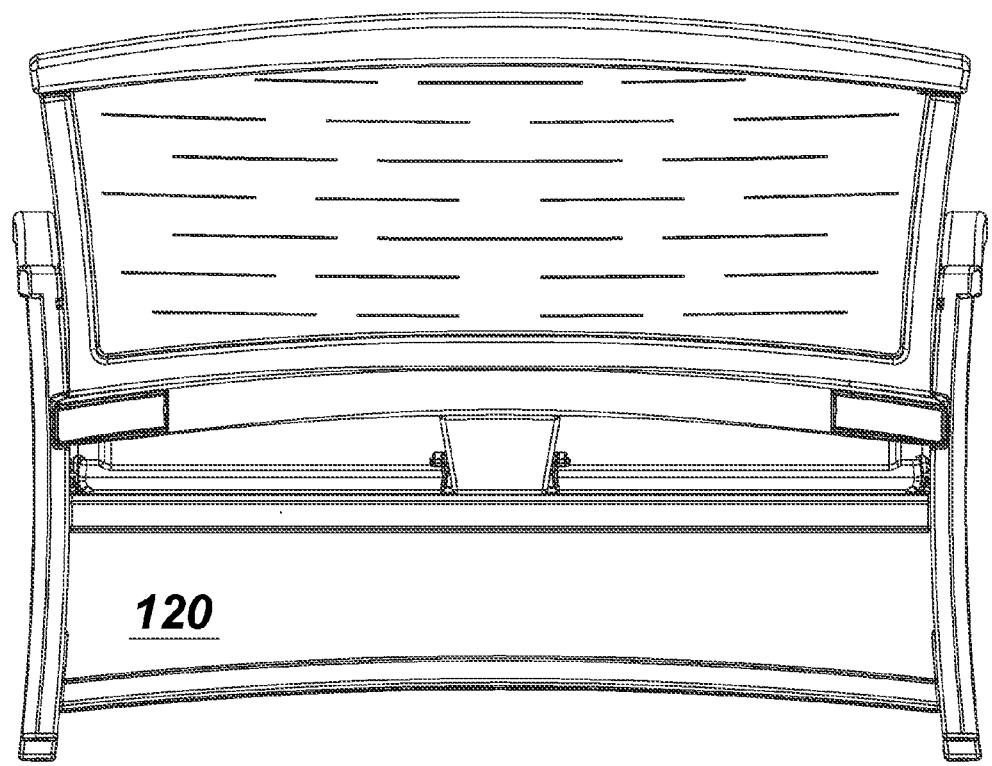
FIG. 81 is a rear view of the embodiment illustrated in FIG. 79.
Figure 82:
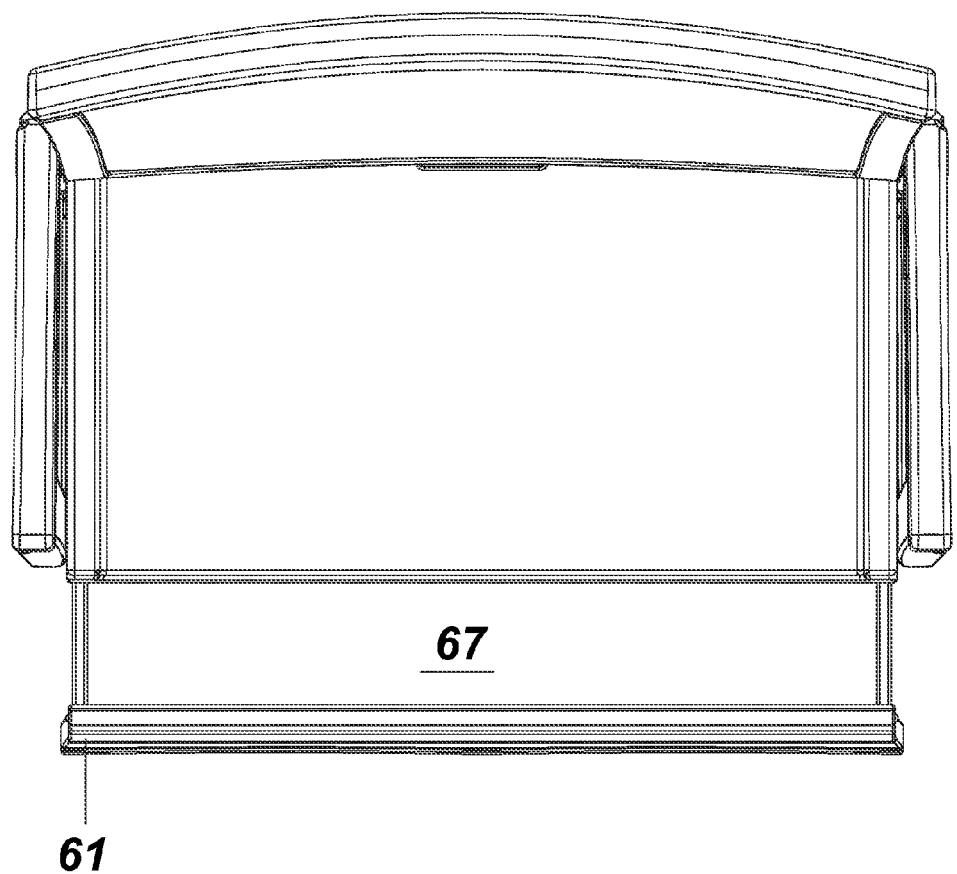
FIG. 82 is a top view of the embodiment illustrated in FIG. 79.
Figure 83:
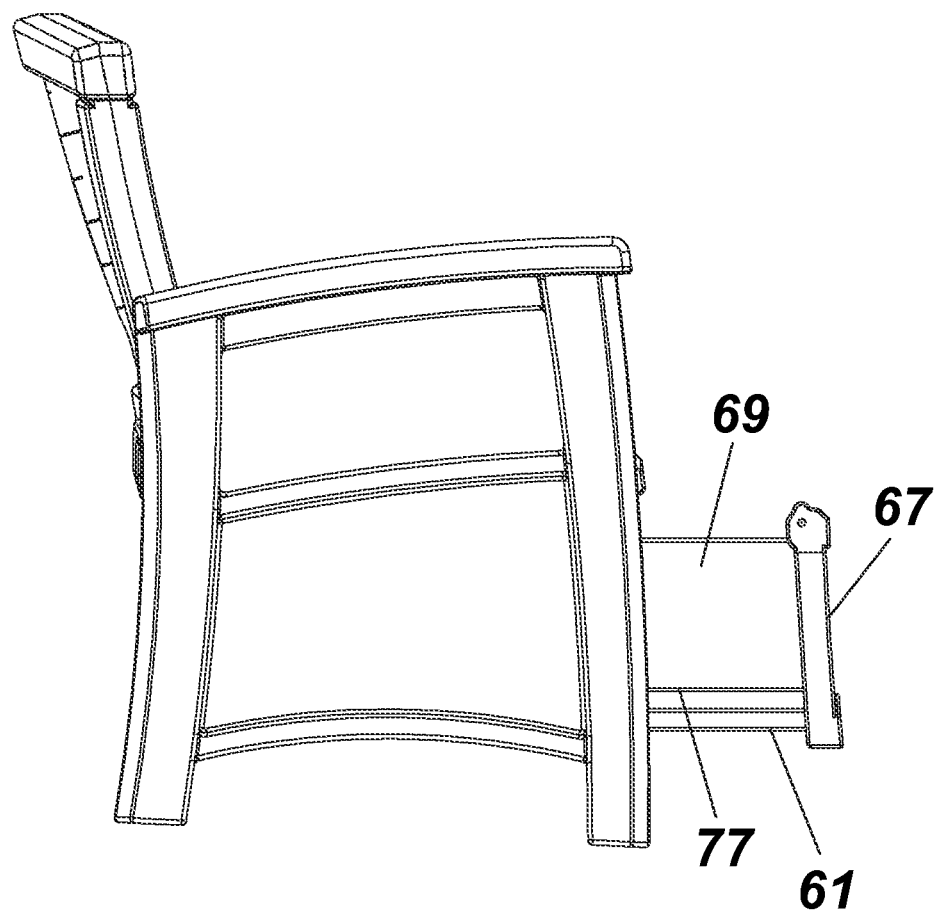
FIG. 83 is a left side view of the embodiment illustrated in FIG. 79.
Figure 84:
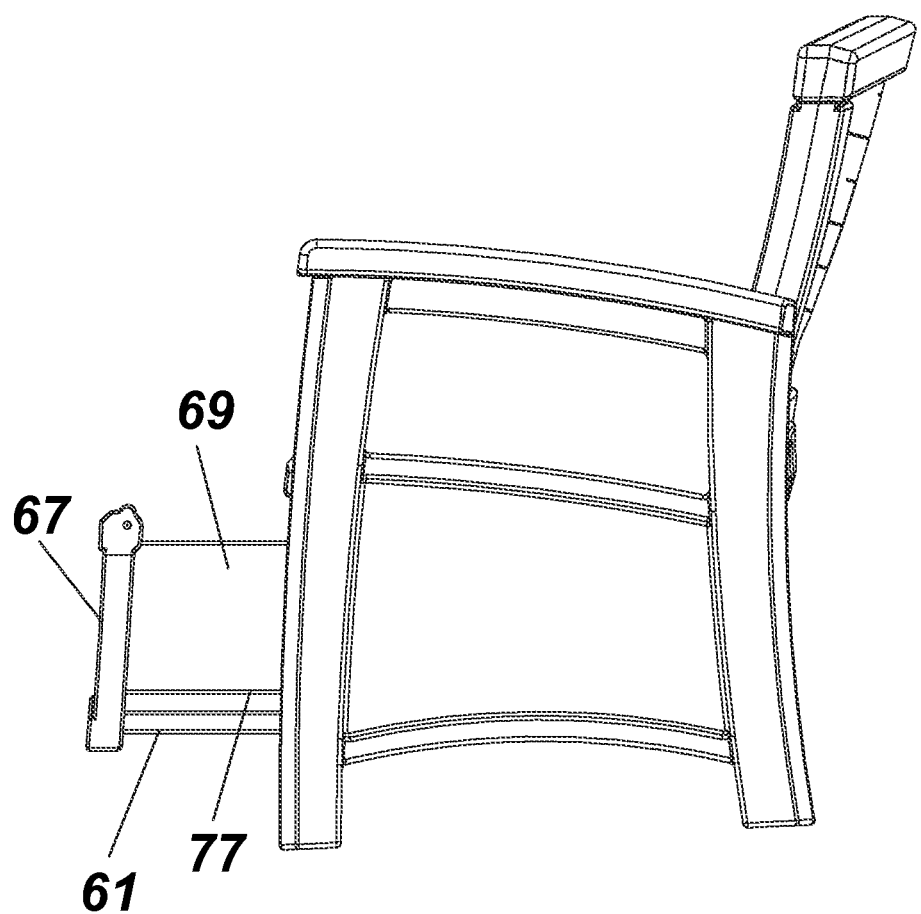
FIG. 84 is a right side view of the embodiment illustrated in FIG. 79.
Figure 85:
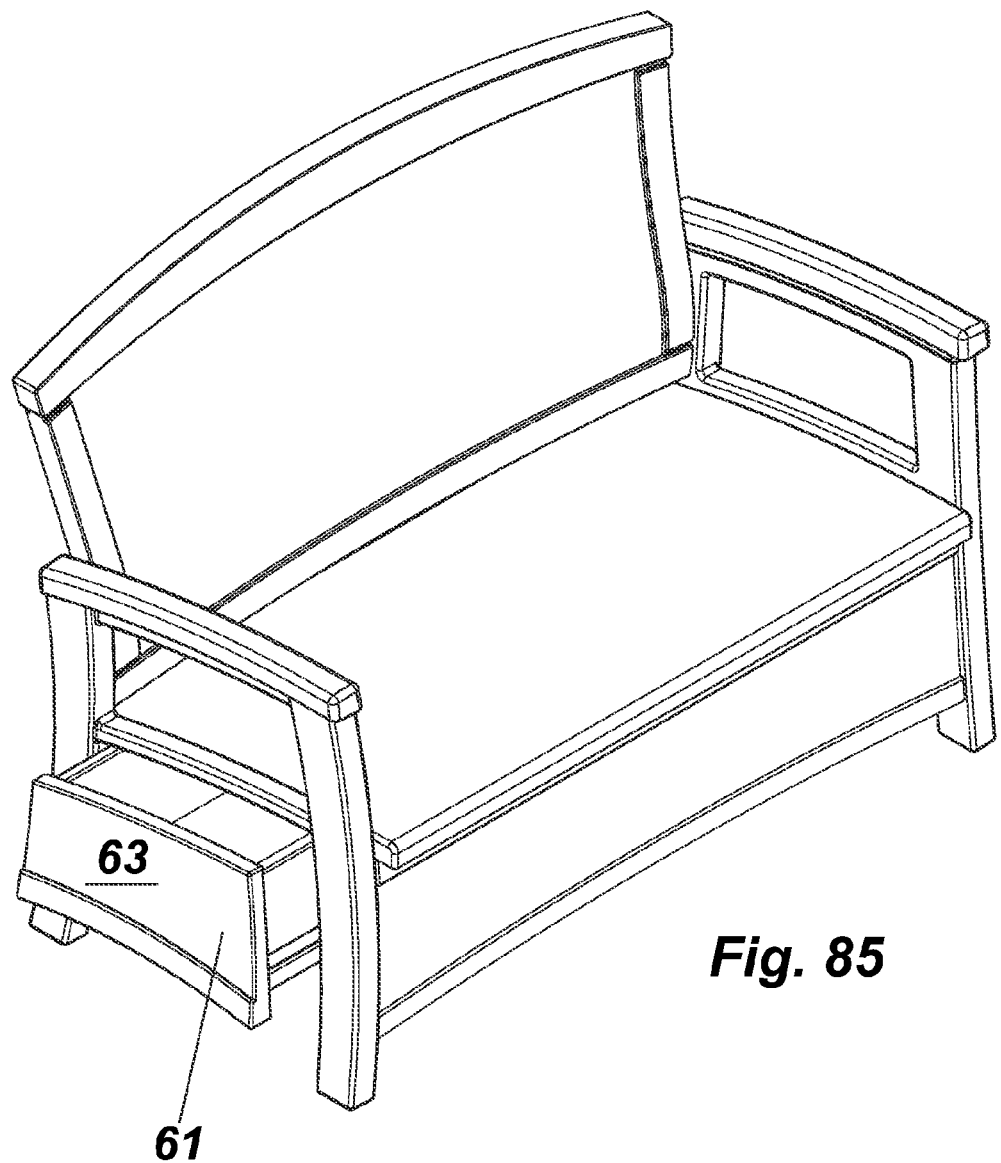
FIG. 85 is a top perspective view of an alternative embodiment of the present invention, illustrated with a sliding drawer within the storage space.
Figure 86:
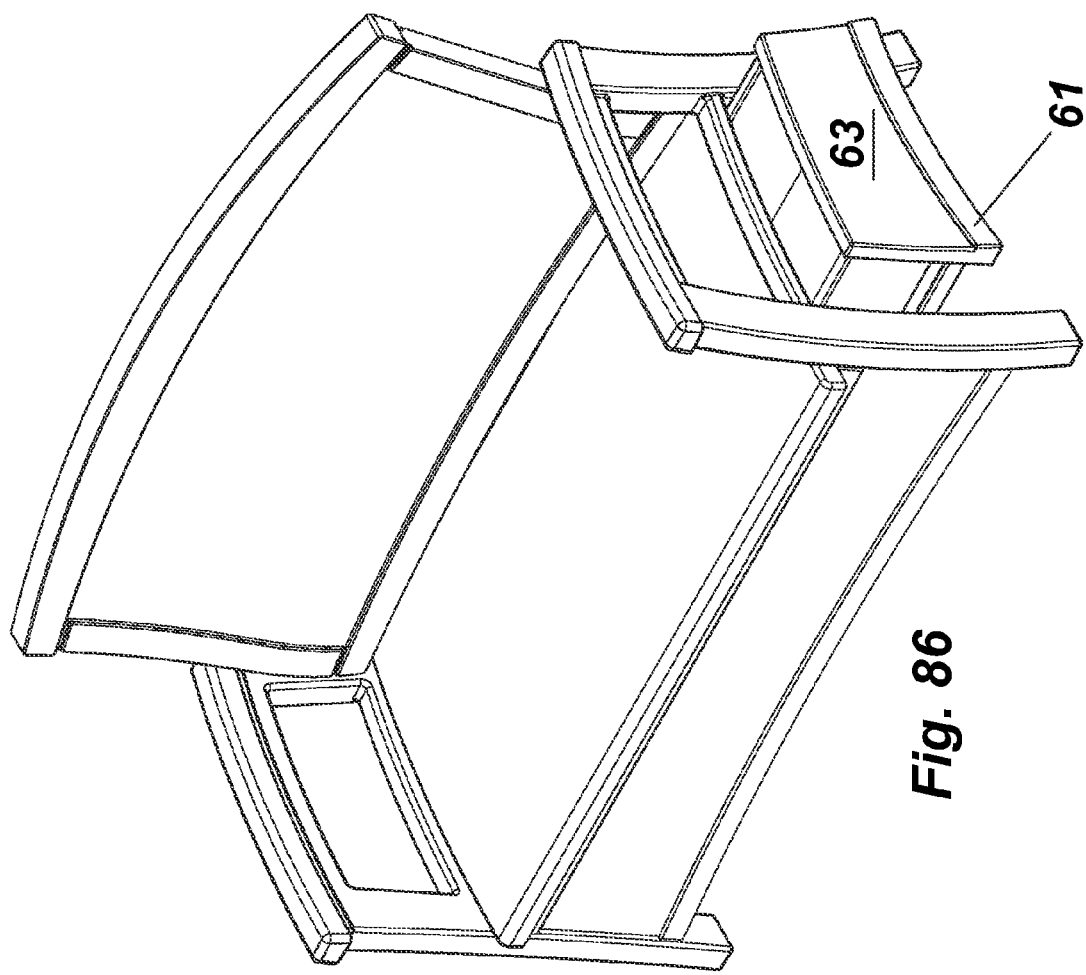
FIG. 86 is a perspective view of the embodiment illustrated in FIG. 85.
Figure 87:
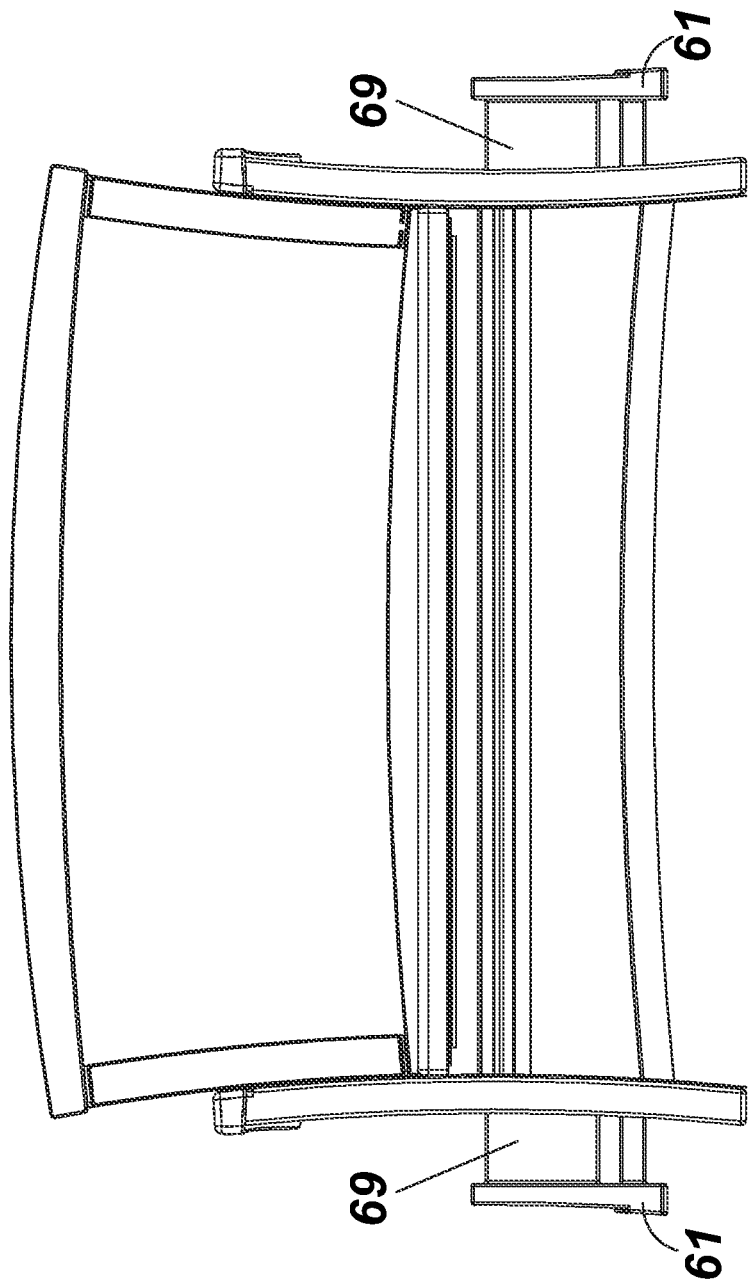
FIG. 87 is a front view of the embodiment illustrated in FIG. 85.
Figure 88:
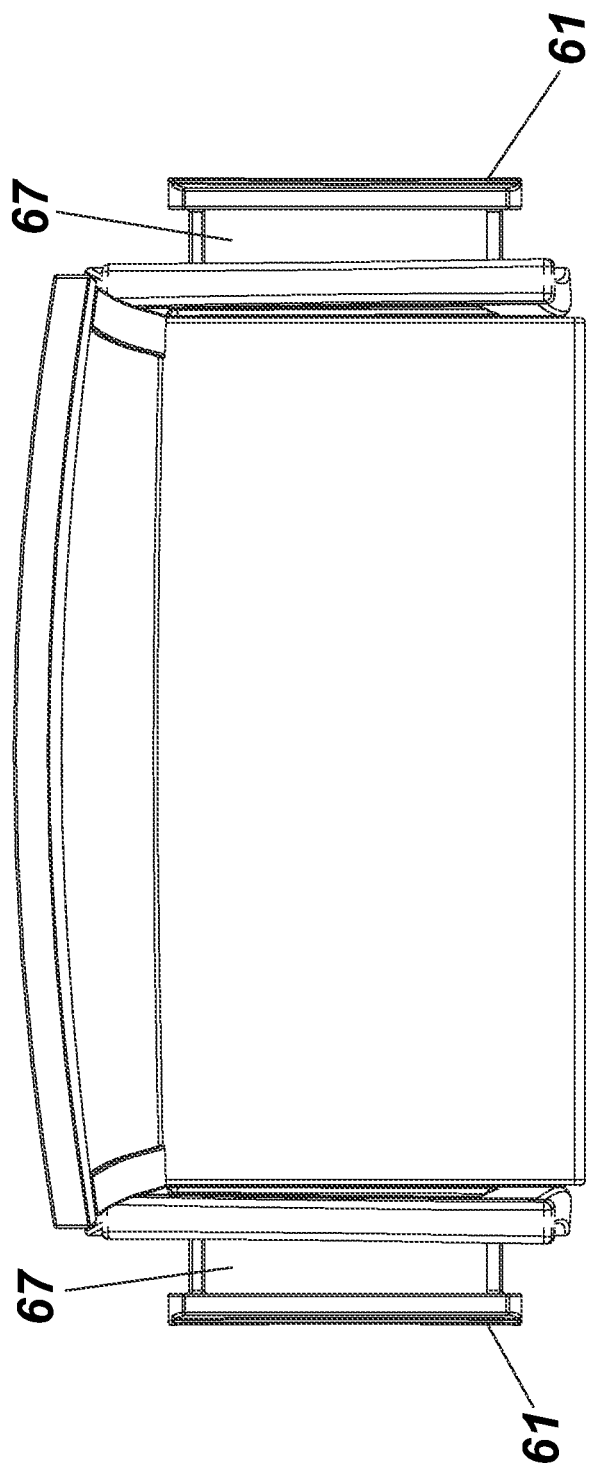
FIG. 88 is a top view of the embodiment illustrated in FIG. 85.
Figure 89:
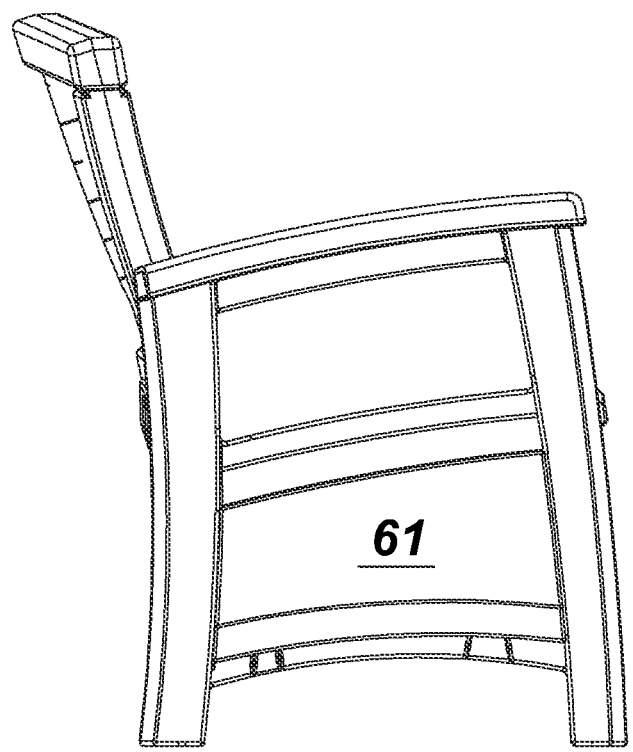
FIG. 89 is a left side view of the embodiment illustrated in FIG. 85.
Figure 90:
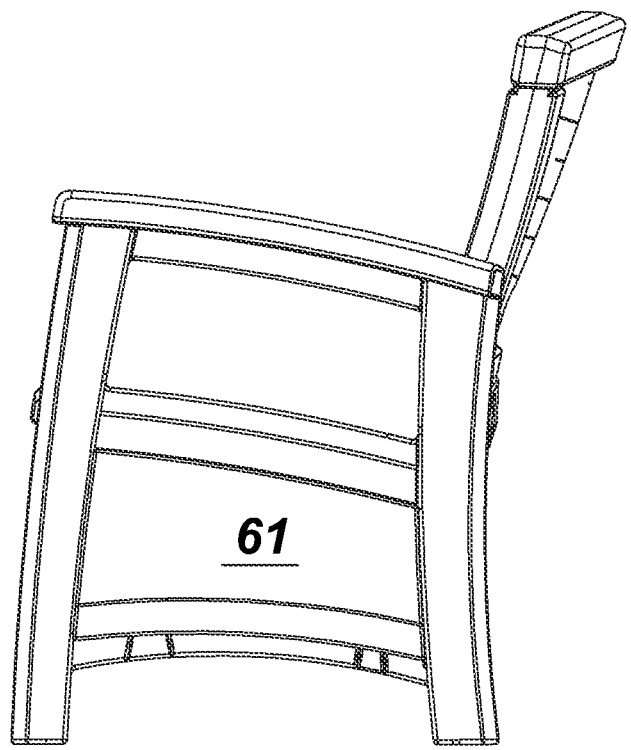
FIG. 90 is a right side view of the embodiment illustrated in FIG. 85.
Figure 91:
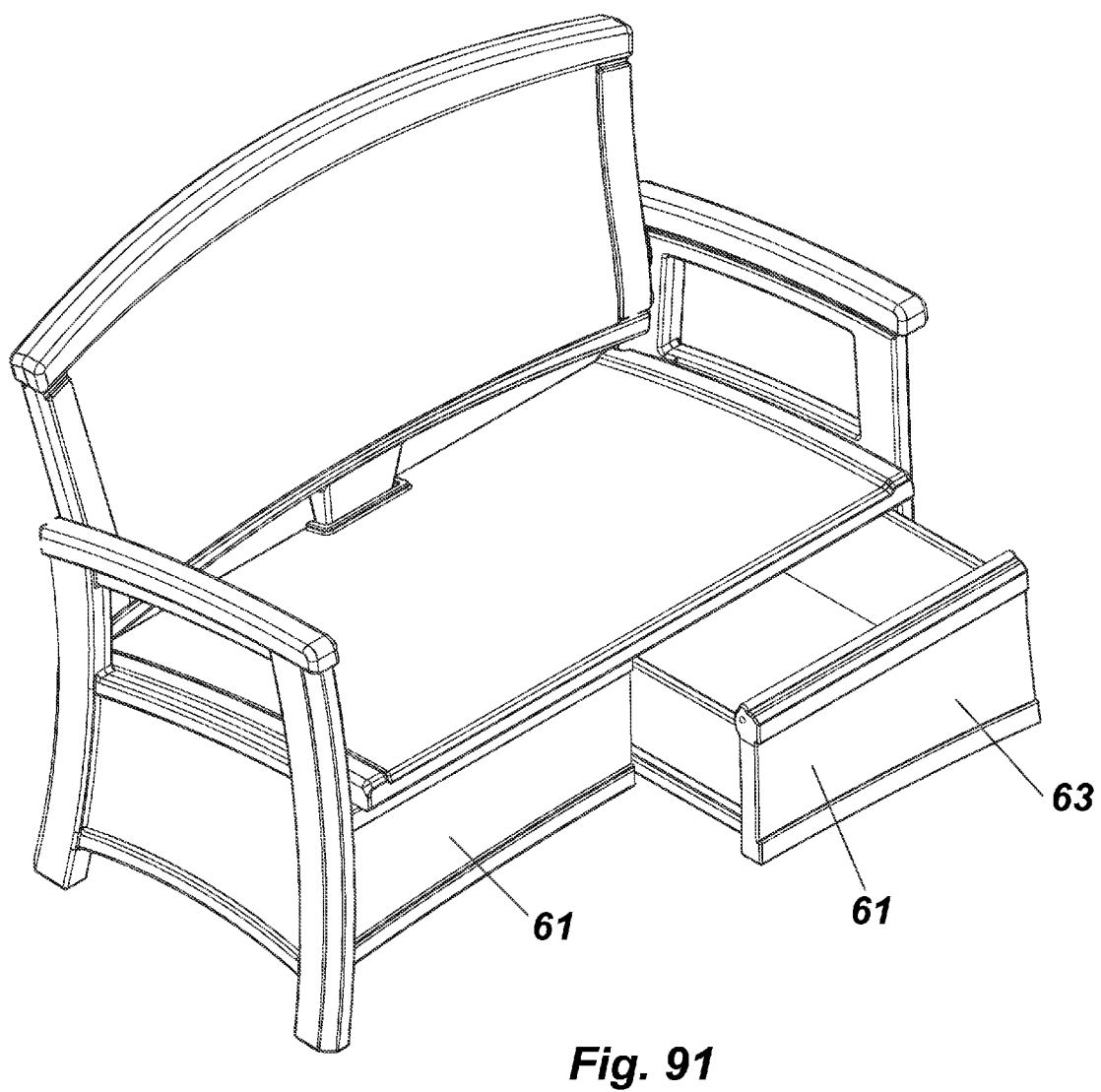
FIG. 91 is a top perspective view of an alternative embodiment of the present invention, illustrated with a sliding drawer within the storage space.
Figure 92:
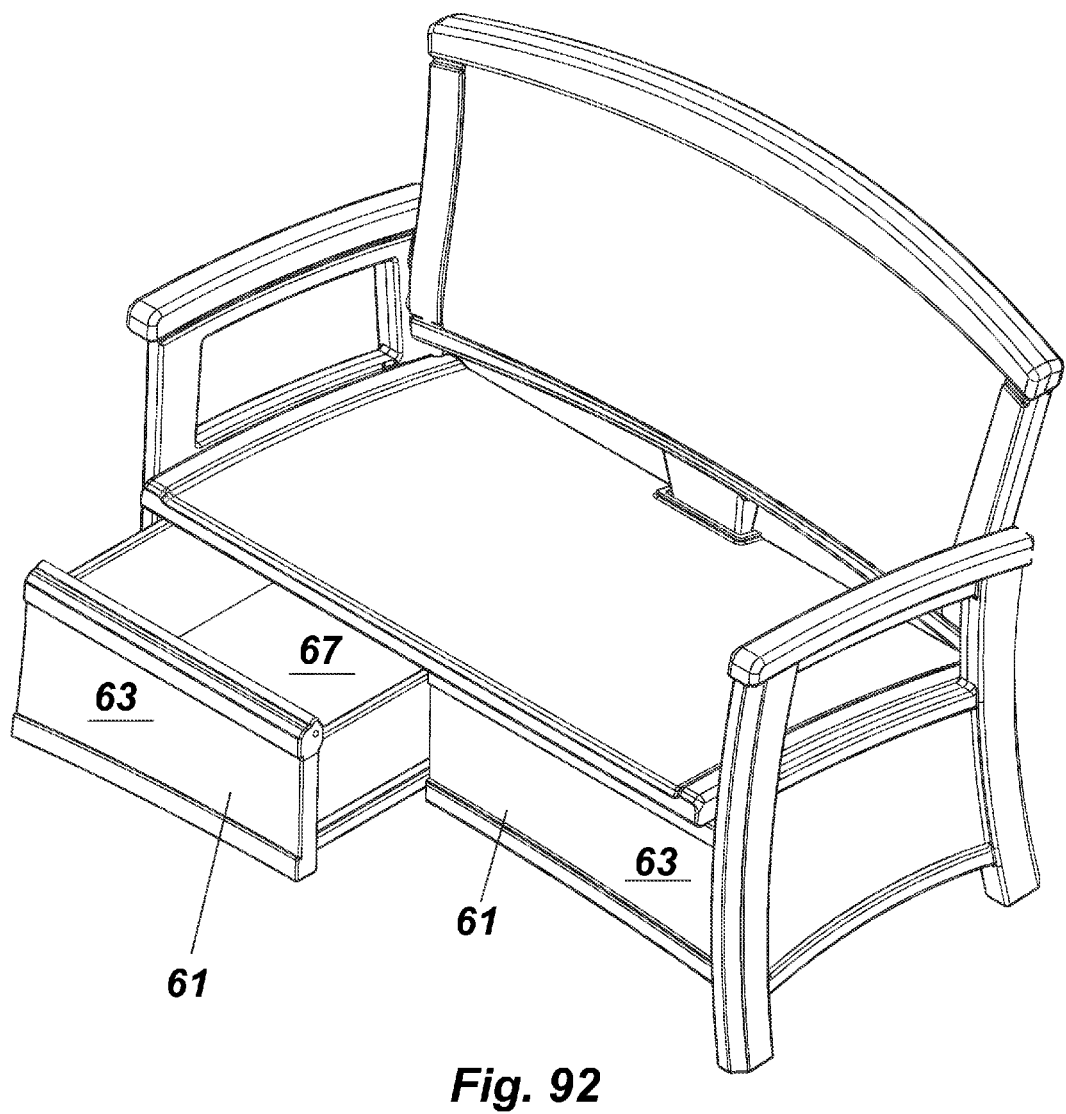
FIG. 92 is a perspective view of the embodiment illustrated in FIG. 91.
Figure 93:
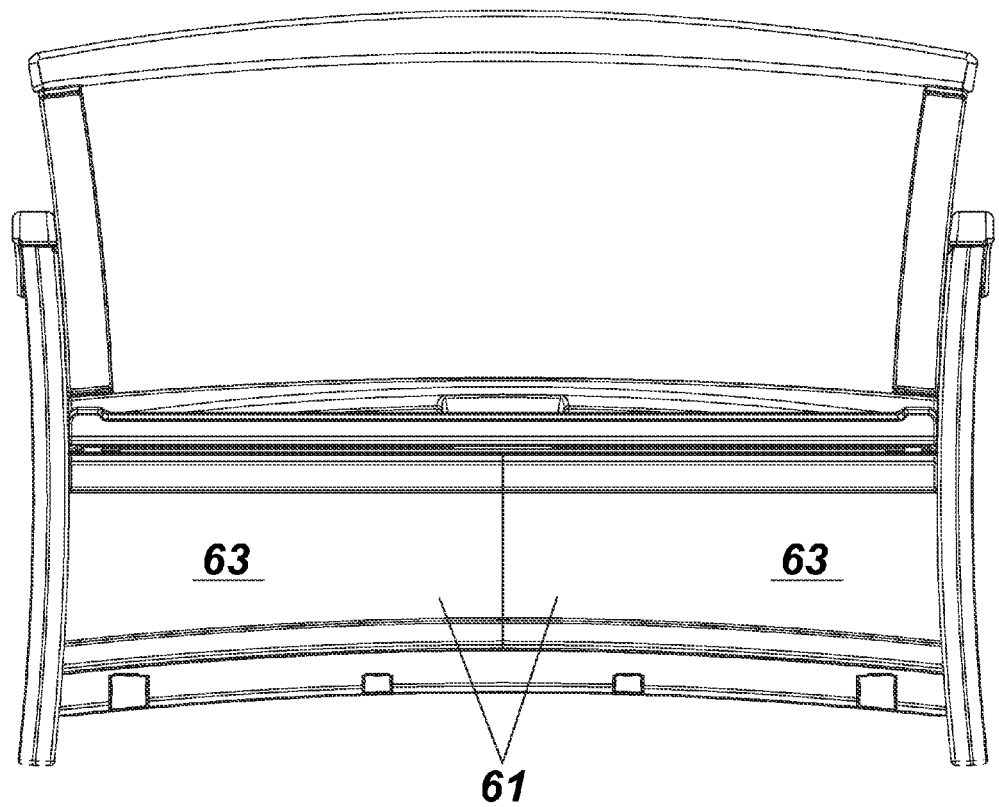
FIG. 93 is a front view of the embodiment illustrated in FIG. 91.
Figure 94:
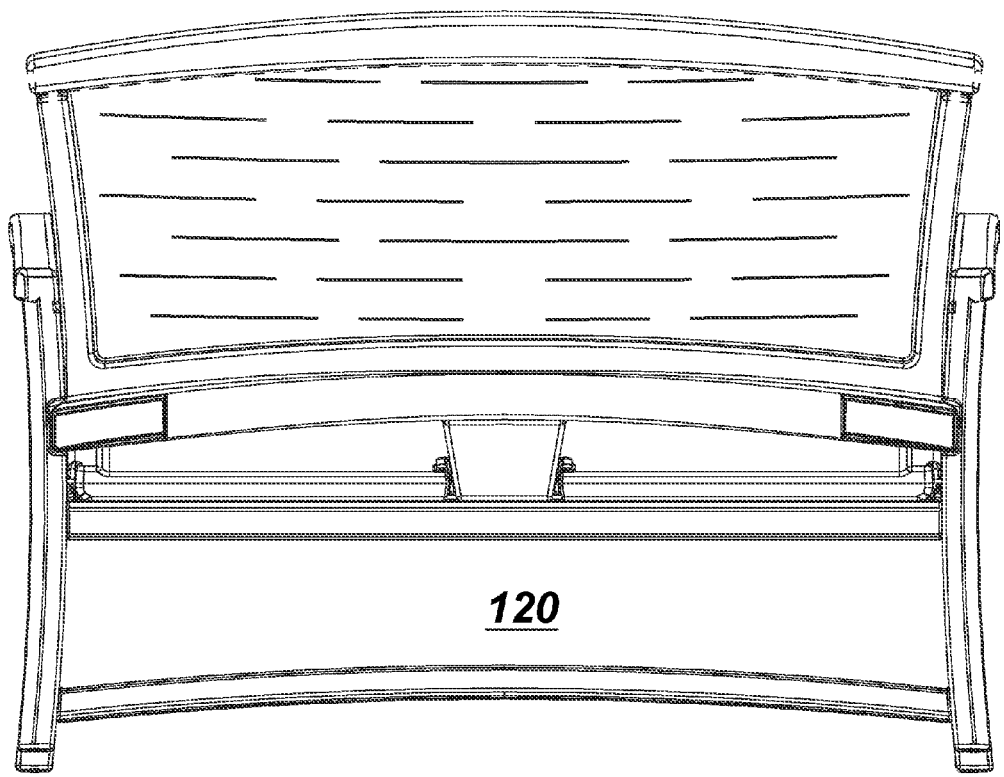
FIG. 94 is a rear view of the embodiment illustrated in FIG. 91.
Figure 95:
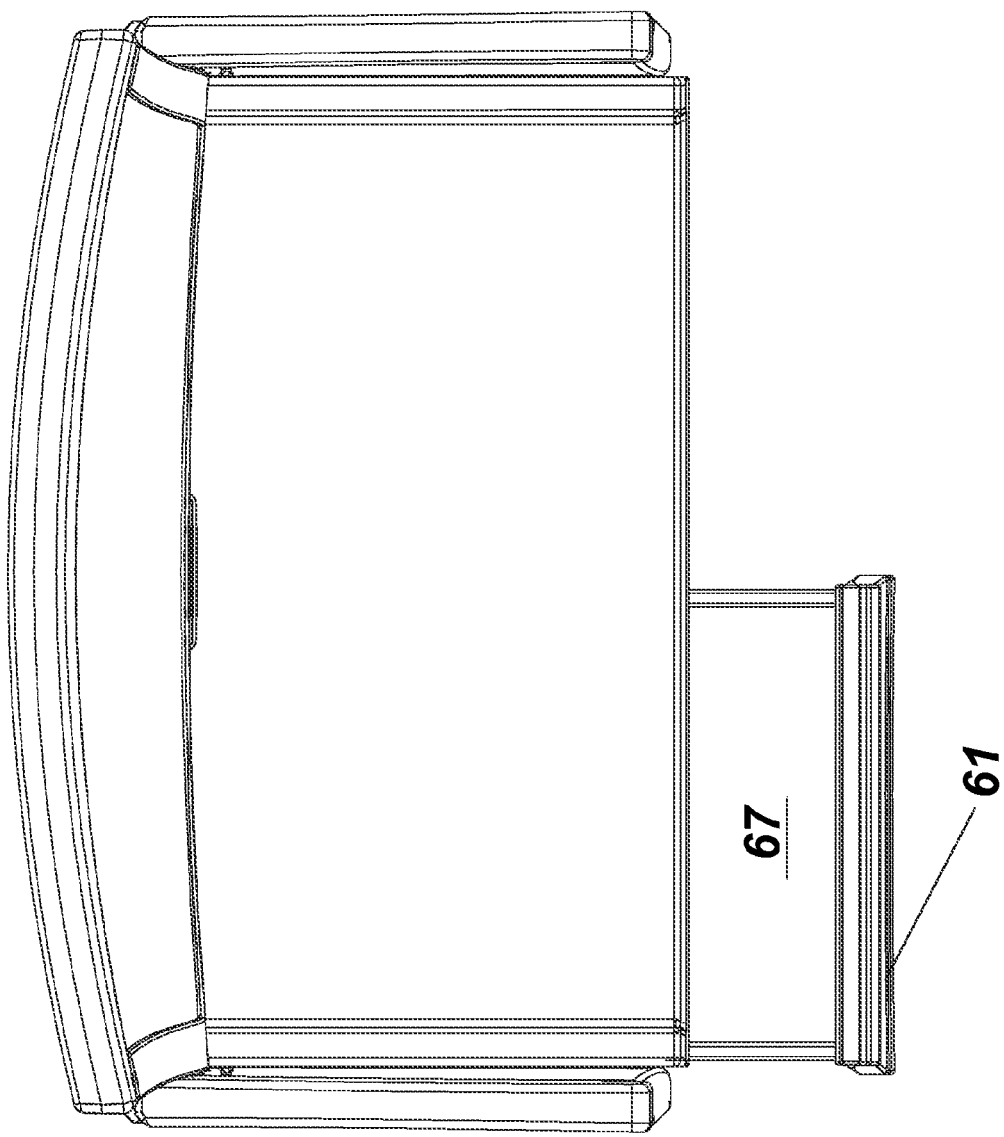
FIG. 95 is a top view of the embodiment illustrated in FIG. 91.
Figure 96:
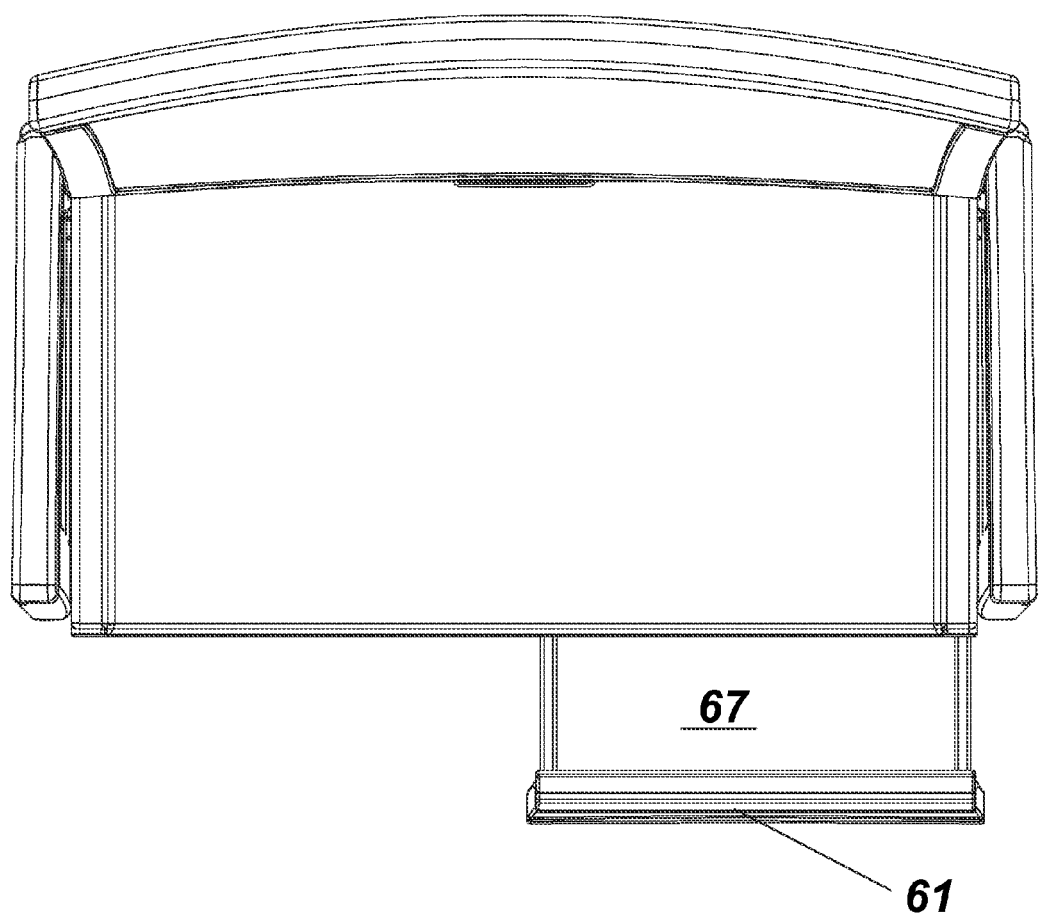
FIG. 96 is a bottom view of the embodiment illustrated in FIG. 91.
Figure 97:
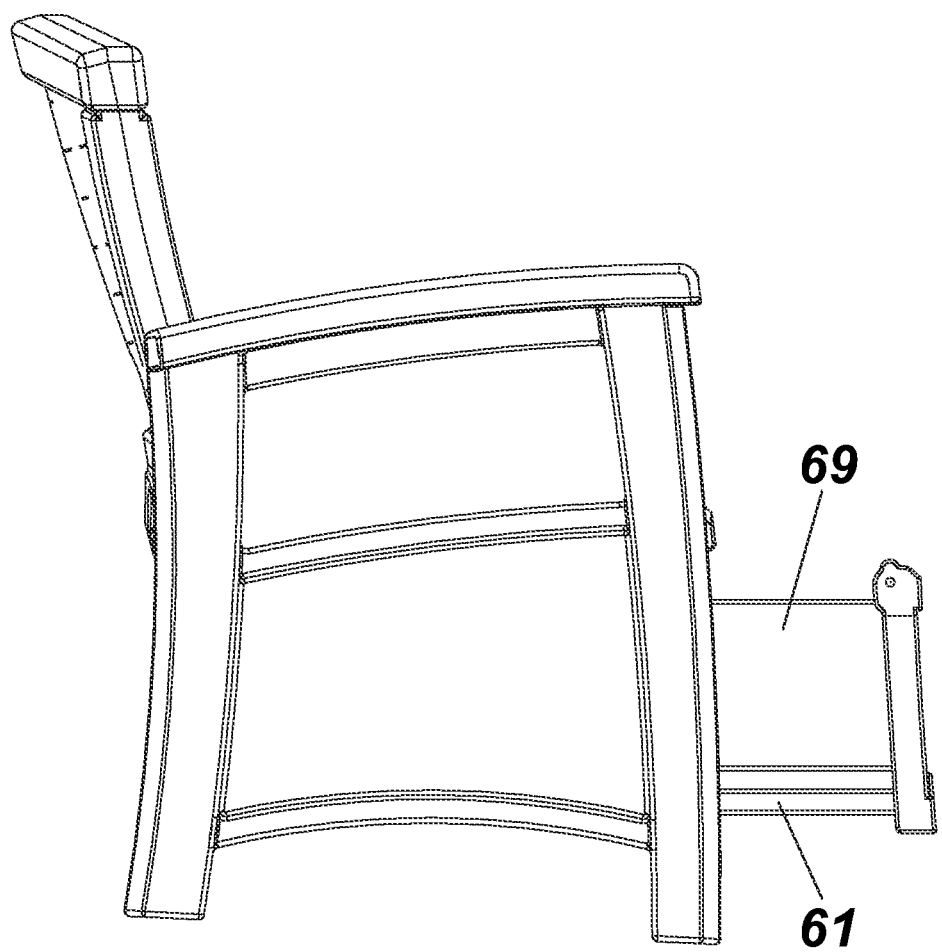
FIG. 97 is a left side view of the embodiment illustrated in FIG. 91.
Figure 98:
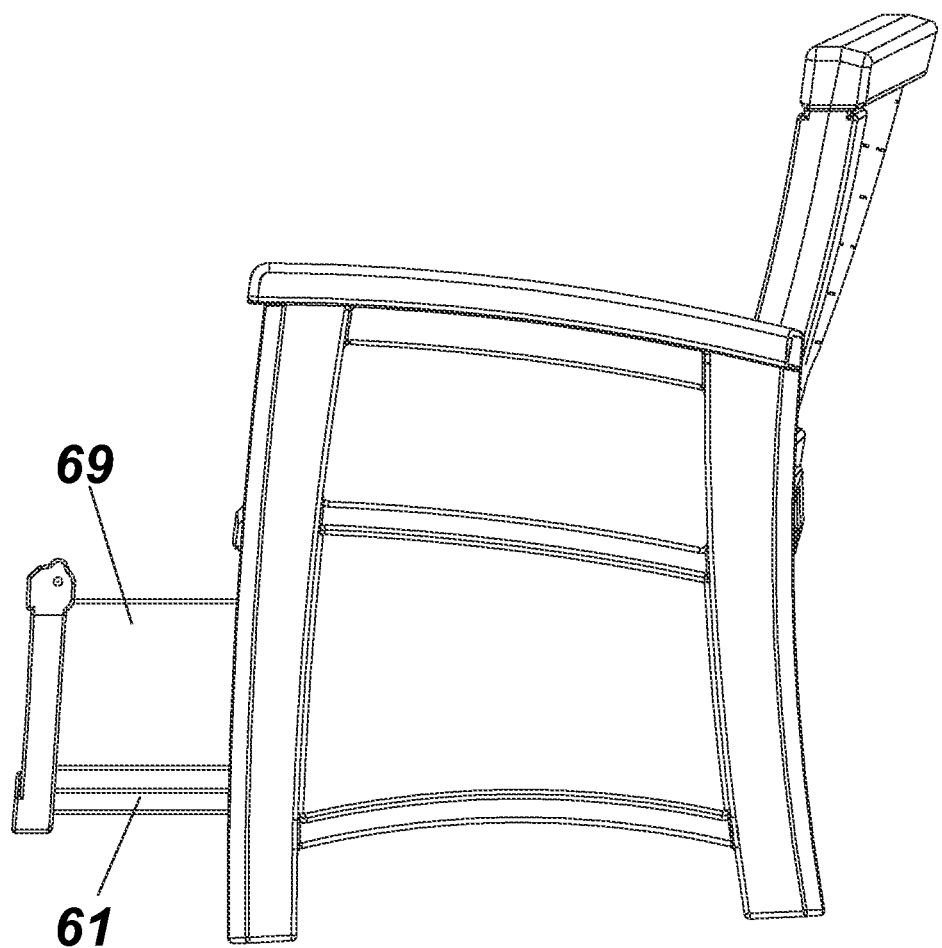
FIG. 98 is a right side view of the embodiment illustrated in FIG. 91.
Figure 99:
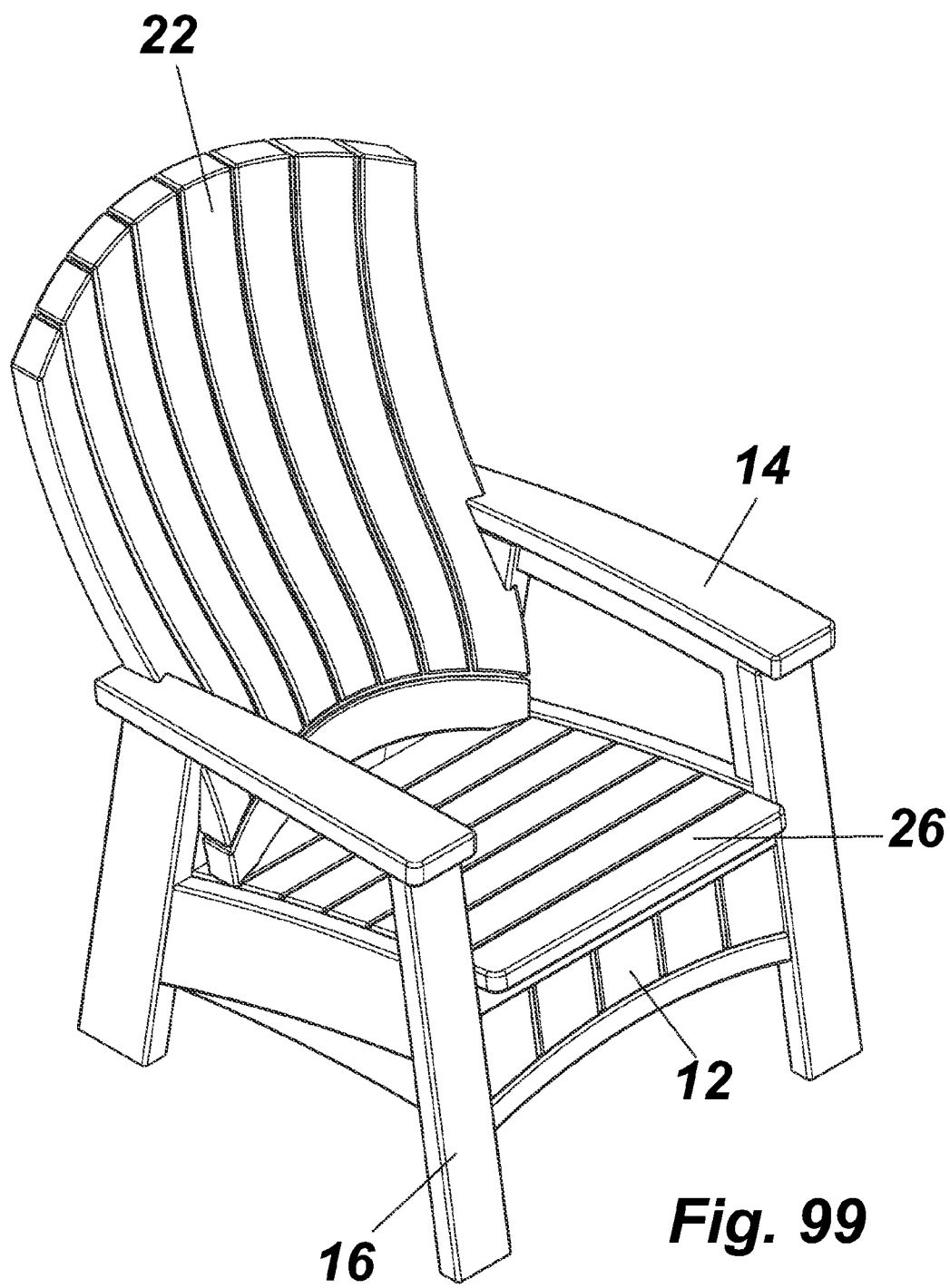
FIG. 99 is a top left perspective view of an alternative embodiment of the present invention, illustrated with a pivoting seat member for providing access to the storage space.
Figure 100:
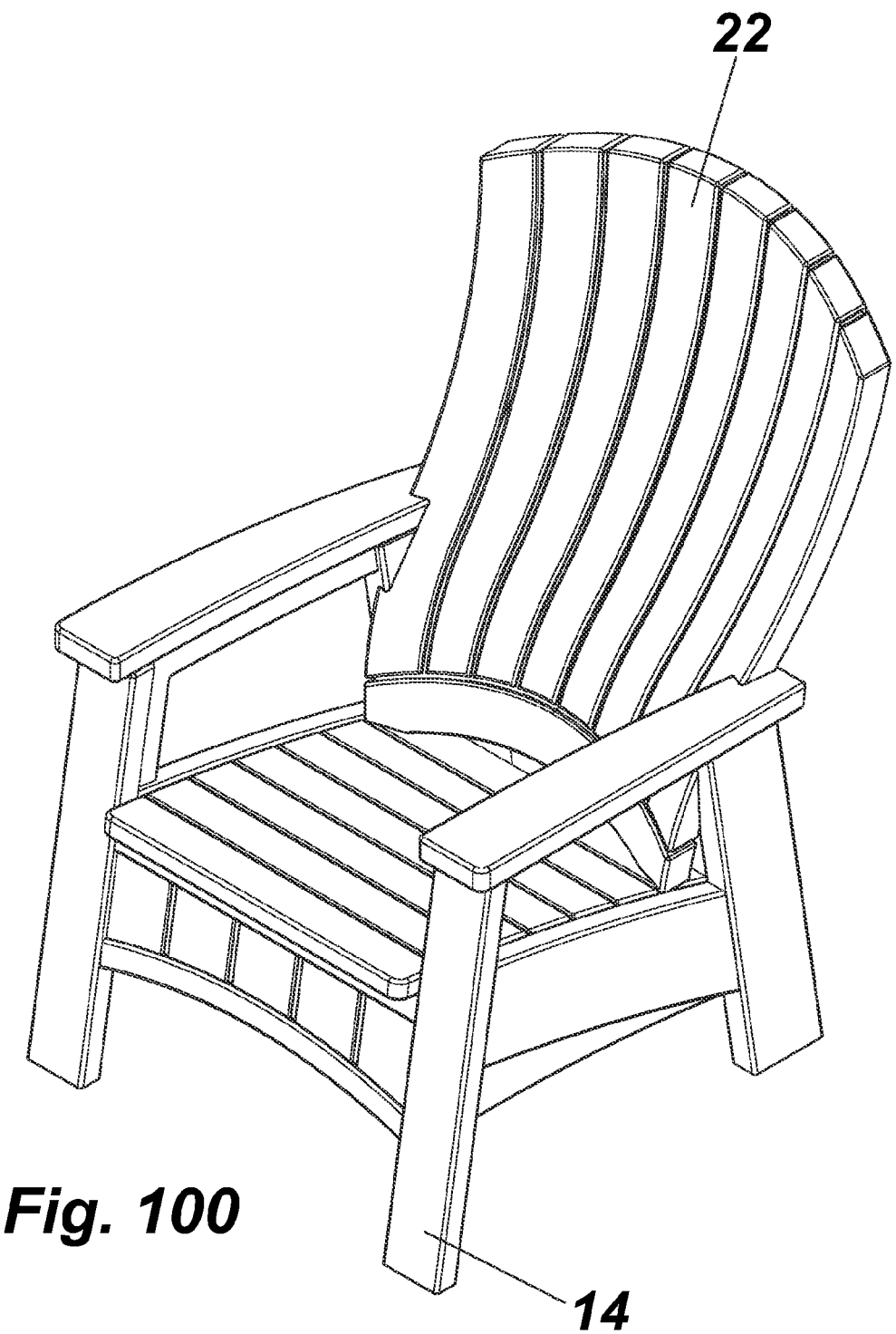
FIG. 100 is a top right perspective view of the embodiment illustrated in FIG. 99.
Figure 101:
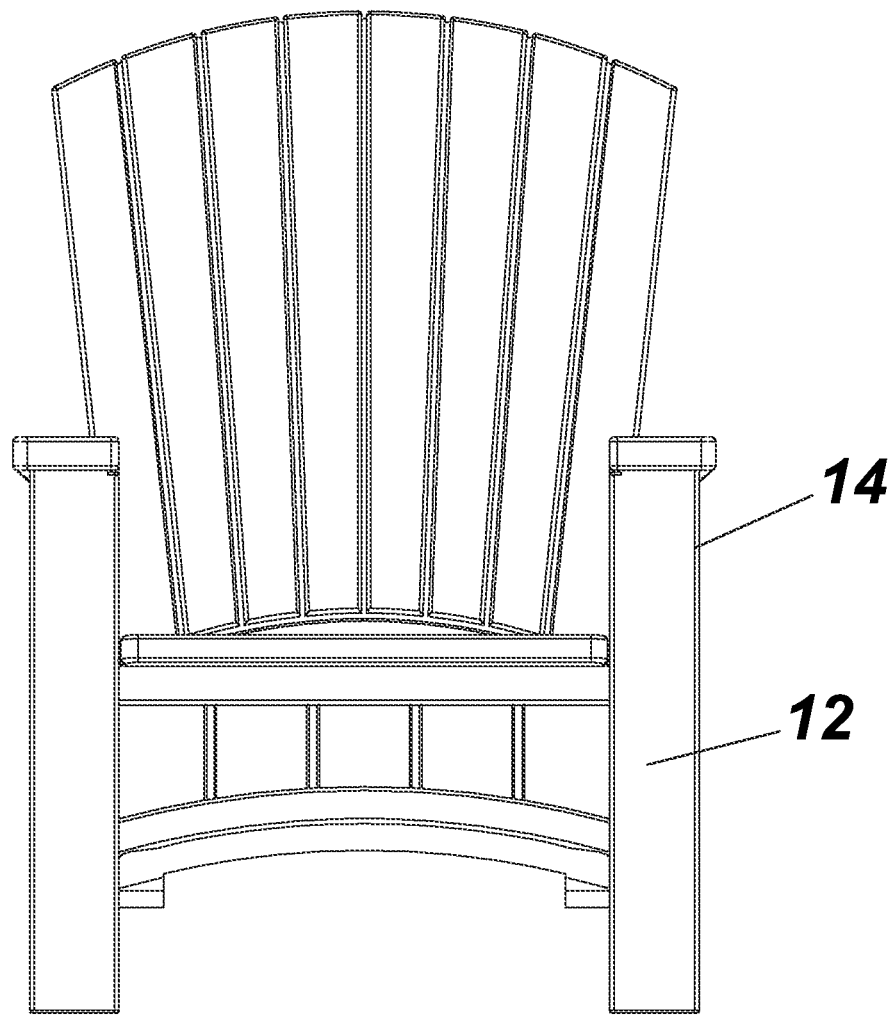
FIG. 101 is a front view of the embodiment illustrated in FIG. 99.
Figure 102:
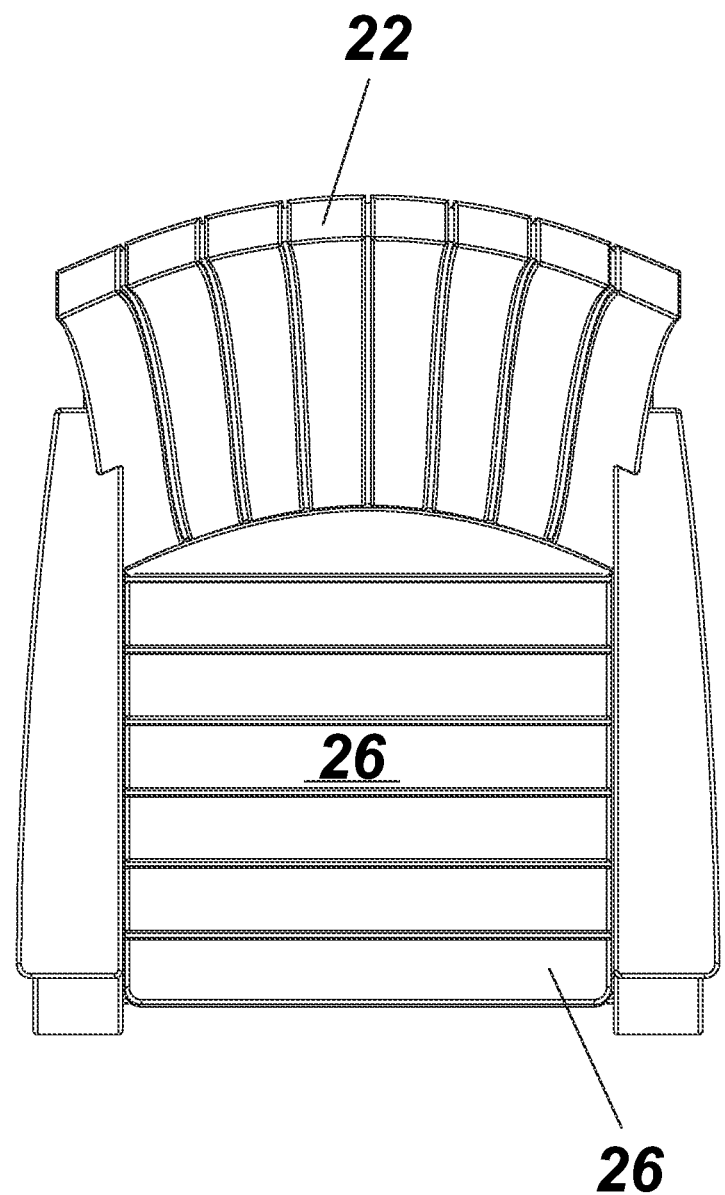
FIG. 102 is a top view of the embodiment illustrated in FIG. 99.
Figure 103:
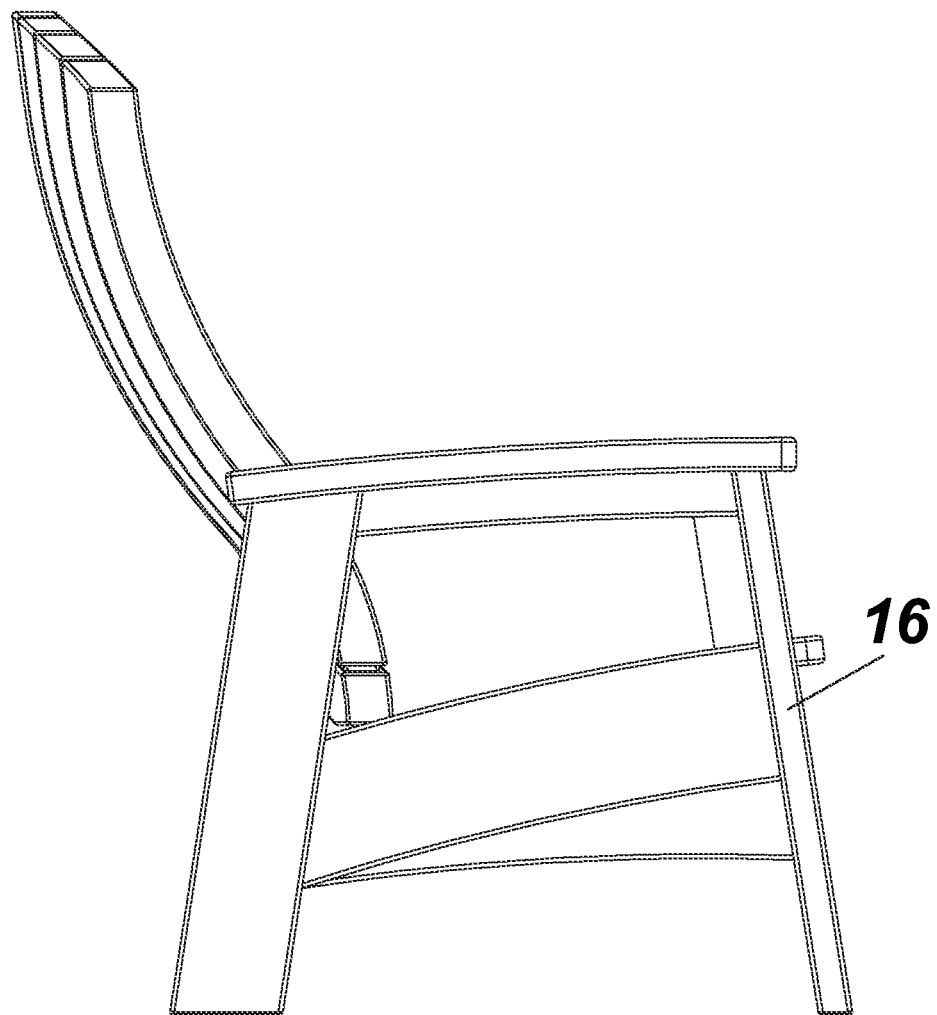
FIG. 103 is a left side view of the embodiment illustrated in FIG. 99.
Figure 104:
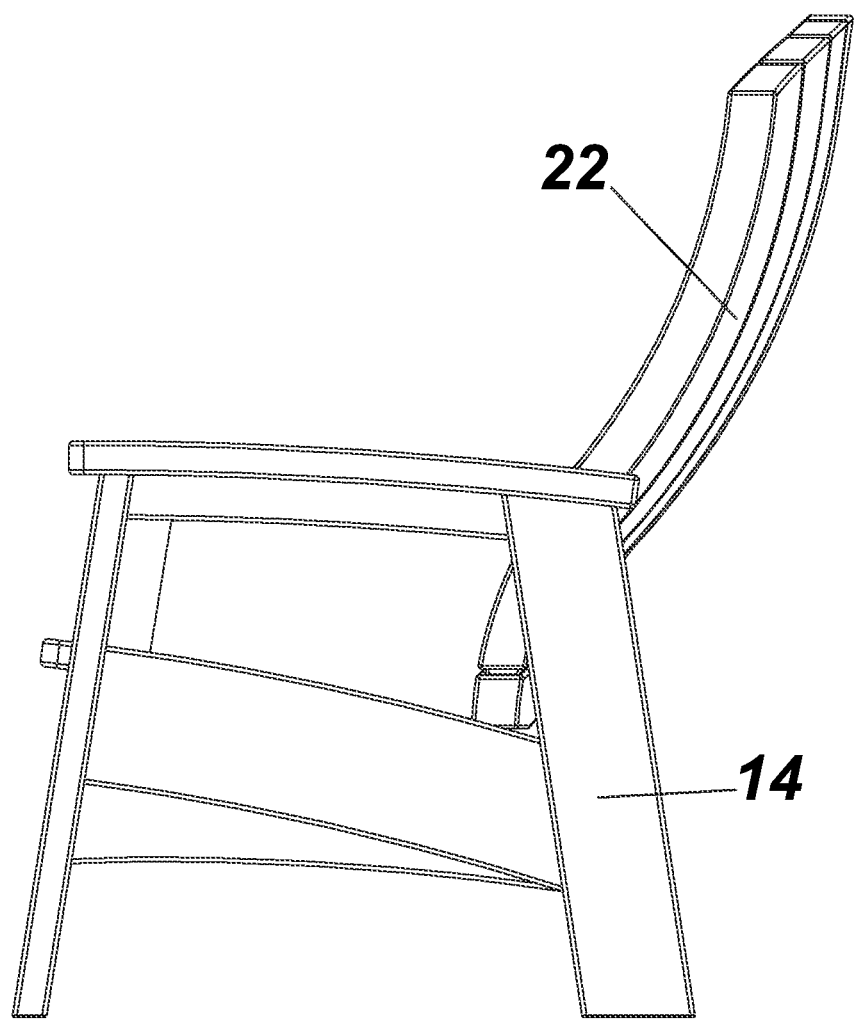
FIG. 104 is a right side view of the embodiment illustrated in FIG. 99.
Figure 105:
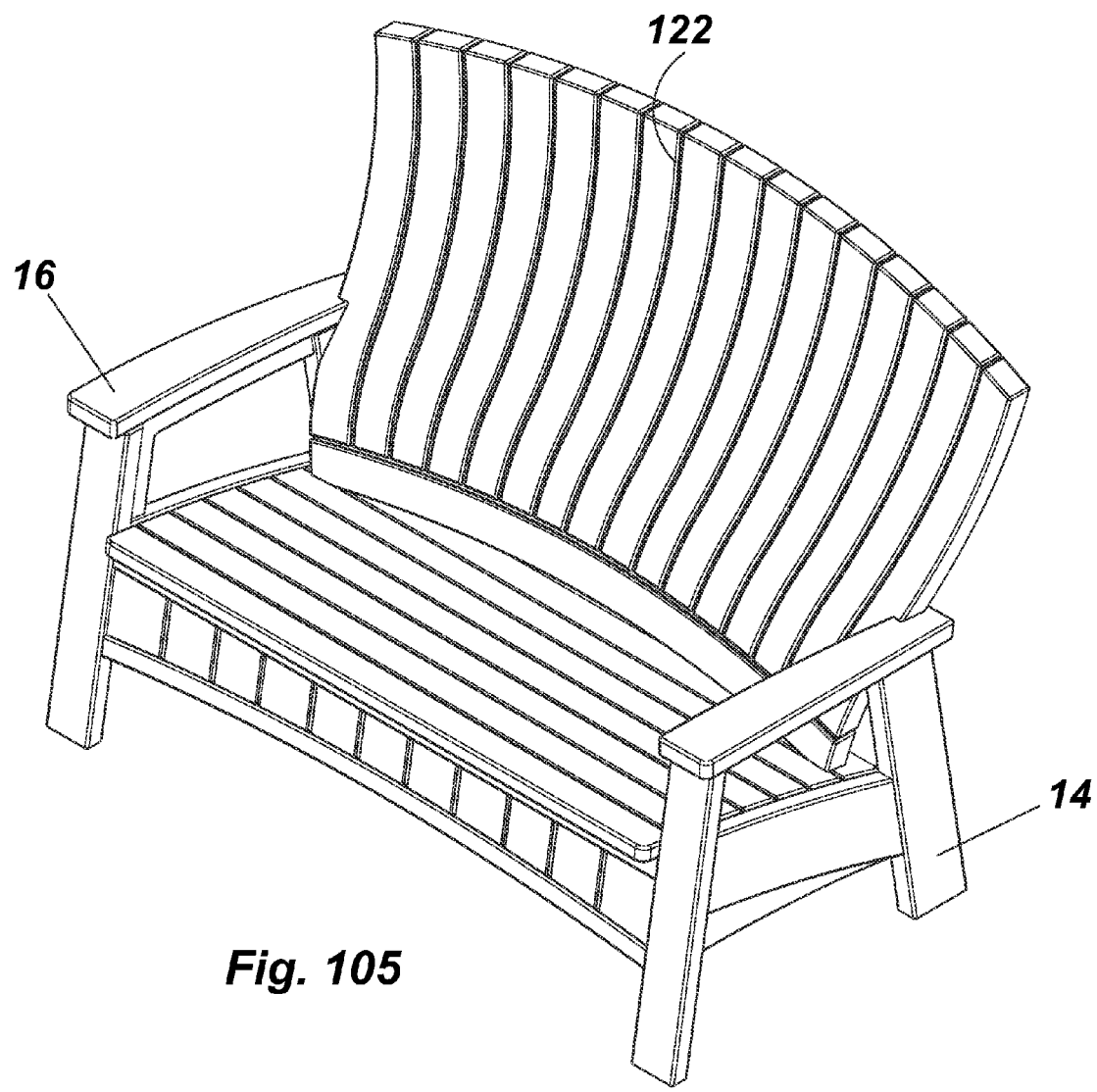
FIG. 105 is a top right perspective view of an alternative embodiment of the present invention, illustrated with a pivoting seat member for providing access to the storage space.
Figure 106:
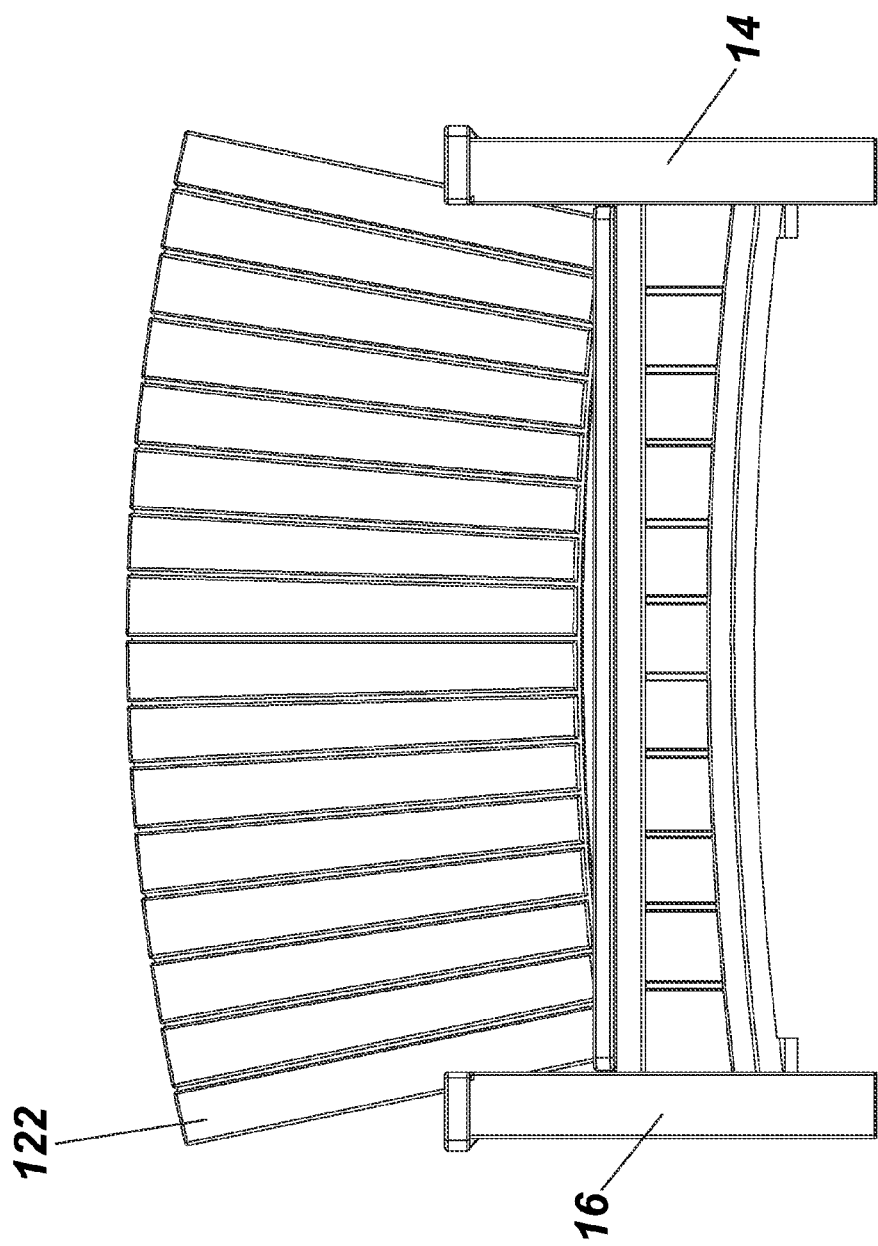
FIG. 106 is a front view of the embodiment illustrated in FIG. 105.
Figure 107:
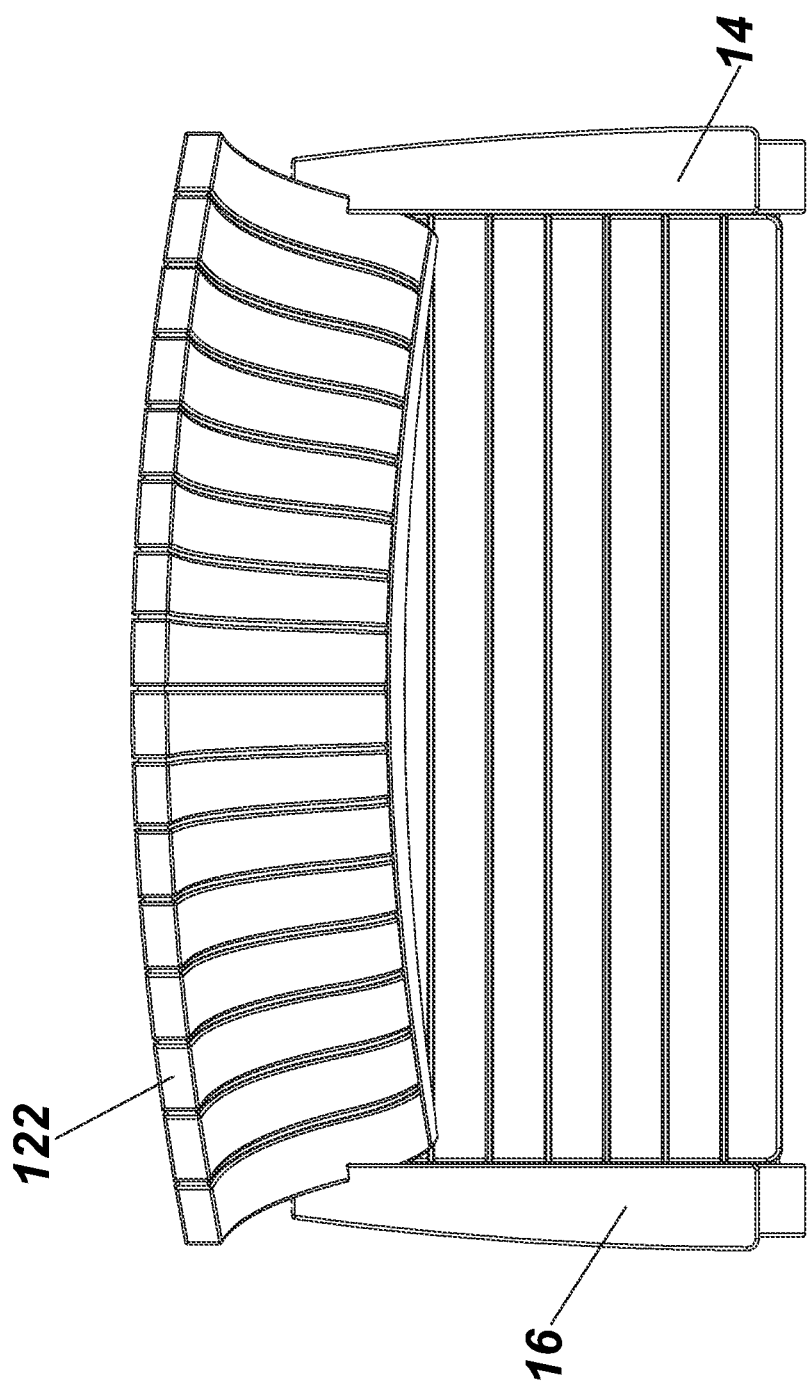
FIG. 107 is a top view of the embodiment illustrated in FIG. 105.
Figure 108:
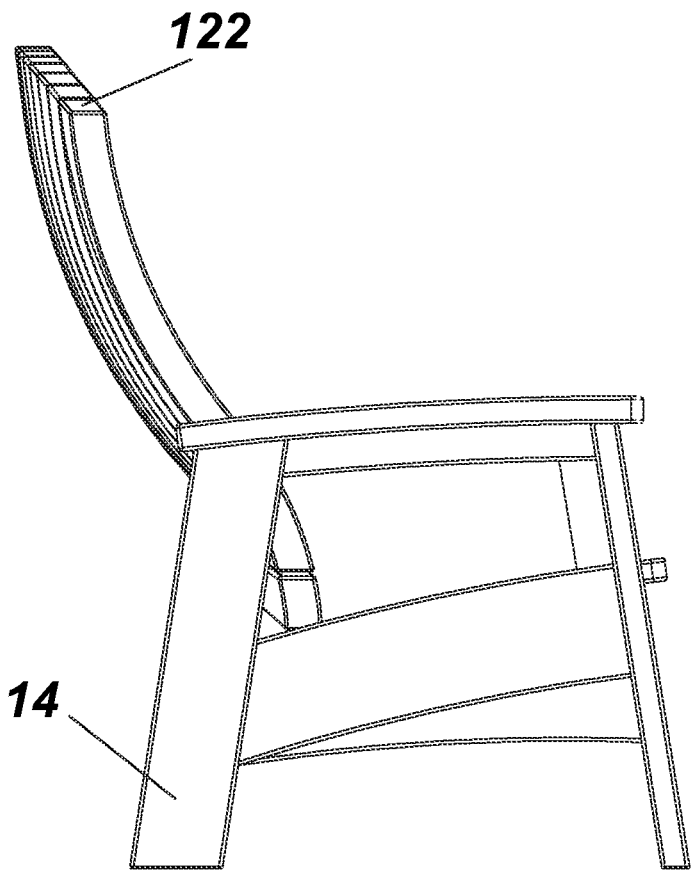
FIG. 108 is a left side view of the embodiment illustrated in FIG. 105.
Figure 109:
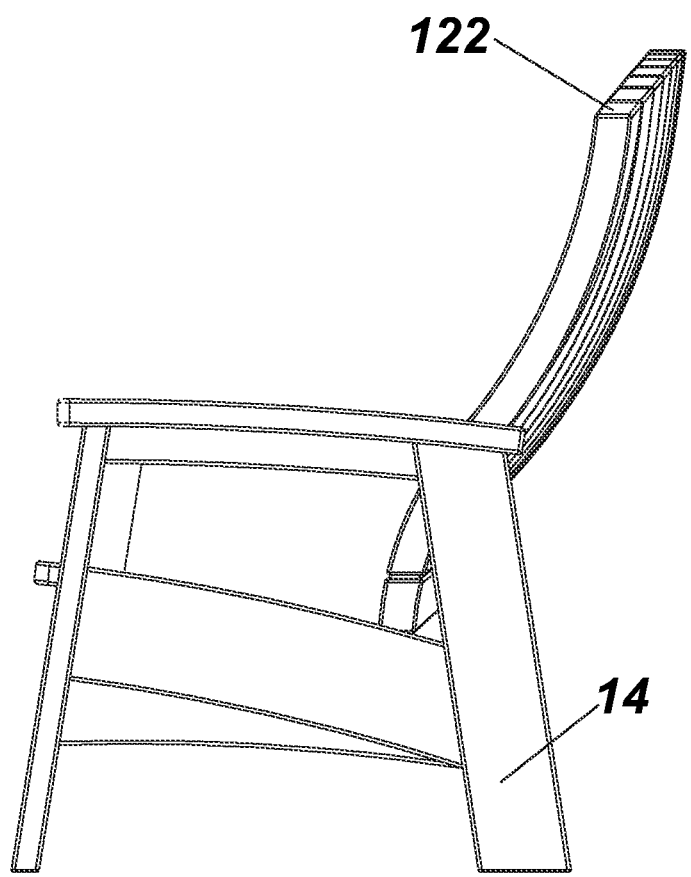
FIG. 109 is a right side view of the embodiment illustrated in FIG. 105.

Referring to FIGS. 71-94, alternative embodiments of the present device are illustrated. These embodiments are constructed to be substantially the same as the previous embodiments with the addition of at least one drawer assembly 61. The drawer assembly may be slidably secured to extend outwardly from any side or end panel member without departing from the scope of the invention. In a preferred embodiment, the drawer assembly 61 includes a front panel 63 which may include a handle 65 suitable for grasping by hand. The front panel is suitably secured to the drawer having a bottom panel 67 and side walls 69. The drawer assembly may also be provided with cooperating slide members 77 (FIG. 79). Alternatively, the drawer assemblies may be constructed and arranged to slide within tracks 71 formed on the inner surface of the end panel members or front and rear panel members. In this manner the drawers are contained in their sliding movement without the need for complex slide members. Snap locks 73 or the like may also be provided to hold the drawers in a normally closed position.

Referring to FIGS. 99-109, alternative embodiments of the present device are illustrated. These embodiments are constructed to be substantially the same as the previous embodiments with the exception of form. These chairs and love seats are constructed to appear as Adirondack chairs, yet include the same box structure 12 and under seat storage area 82 as the previous embodiments. Like the previous embodiments, these embodiments are constructed from plastic components formed by the process of blow molding and include surface texture. In these embodiments, the surface texture causes the furniture to appear to be constructed from a plurality of boards like a standard Adirondack chair. Like the other embodiment, these embodiments may utilize the pivoting seat member 26, 126, drawer assembly 61 or pivoting panel 35 to provide access to the storage area 82 within the box structure 12.

Thus, a resin furniture system having a structural box assembly has been illustrated. It is to be understood that while a certain form of the invention is illustrated, it is not to be limited to the specific form or arrangement of parts herein described and shown. It will be apparent to those skilled in the art that various changes may be made without departing from the scope of the invention, and the invention is not to be considered limited to what is shown and described in the specification.

One skilled in the art will readily appreciate that the present invention is well adapted to carry out the objects and obtain the ends and advantages mentioned, as well as those inherent therein. Any compounds, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A resin furniture assembly comprising:
a box structure, said box structure formed by a first end structure said first end structure including a first side panel, said first side panel including an inner wall, an outer wall, and a plurality of edge walls integrally connected to each other to create an enclosed hollow panel, a second end structure, said second end structure including a first side panel, said first side panel including an inner wall, an outer wall, and a plurality of edge walls to create an enclosed hollow panel, said first end structure and said second end structure each including at least one tack off, said at least one tack off including an inwardly extending cavity, said inwardly extending cavity connecting said inner wall to said outer wall of each of said first end structure and said second end structure, a front panel, a rear panel, a base panel and a seat panel to include a hollow interior portion, said box structure including a plurality of legs for supporting a bottom surface of said base panel in a spaced apart relationship above a ground surface so that an air gap is maintained between said bottom surface of said base panel and a ground surface, a back panel, said back panel secured to said box structure to form a seat back, said seat panel secured to said box structure for enclosing the top potion of said box structure, at least one of said first end structure, said second end structure, said front panel, said rear panel, or said seat panel being pivotally secured to said box structure for movement between a closed position enclosing said box structure and an open position providing access to an inner portion of said box structure, said inner portion of said box structure providing an enclosed storage area.

2. The resin furniture assembly of claim 1 wherein said first and second end structures being supported in a vertical spaced apart orientation, said front panel being secured to said inner wall of said first and said second end structures at a front portion of said first and said second end structures to be spaced above said ground surface, said rear panel being secured to said inner wall of said first and said second end structures at a rear portion of said first and said second end structures to be spaced above said ground surface, said base panel being secured to said inner wall of said first and said second end structures, said base panel being in contact with an inner surface of said front panel and an inner surface of said rear panel.

3. The resin furniture assembly of claim 2 wherein said seat panel is pivotally secured to said inner wall of said first and said second end structures.

4. The resin furniture assembly of claim 2 wherein at least one of said first end structure, said second end structure, said front panel, or said rear panel include a pivoting side door which provides access to said inner portion of said box structure, said pivoting side door including a catch member for releasably securing said pivoting side door in a closed position.

5. The resin furniture assembly of claim 2 wherein at least one of said first end structure, said second end structure, said front panel, or said rear panel include a drawer assembly which provides access to said inner portion of said box structure, said drawer assembly including a front panel said front panel suitably secured to a bottom panel and at least three side walls, whereby said bottom panel and said at least three side walls slide with said front panel along a track.

6. The resin furniture assembly of claim 2 wherein said first end structure and said second end structure each include armrest stands extending outwardly from an upper edge wall to support an armrest, said armrest stands secured to edges of said back panel for supporting said back panel in a generally vertical orientation.

7. The resin furniture assembly of claim 6 wherein said inner wall of said armrest stands each include a round dovetail receiver, said edges of said back panel including a round dovetail, said round dovetail securable within said round dovetail receiver for securing said back panel to said first end structure and said second end structure.

8. The resin furniture assembly of claim 1 wherein said first end structure, said second end structure, said front panel, said rear panel, said back panel, said base panel and said seat panel are formed from a resin plastic material by the process of blow molding to be fully enclosed hollow structural components.

9. A resin furniture assembly comprising:
a first end structure oriented in a substantially vertical orientation, said first end structure including a first side panel, said first side panel including said inner wall, an outer wall, and a plurality of edge walls integrally connected to each other to create an enclosed hollow panel, said first end structure including at least one tack off, said at least one tack off including an inwardly extending cavity, said inwardly extending cavity connecting said inner wall to said outer wall, a second end structure oriented at a substantially vertical orientation, said second end structure including a first side panel, said first side panel including said inner wall, an outer wall, and a plurality of edge walls to create an enclosed hollow panel, said first and said second end structures arranged in a spaced apart arrangement, said second end structure including at least one tack off, said at least one tack off including an inwardly extending cavity, said inwardly extending cavity connecting said inner wall to said outer wall, a front panel being secured to said inner wall of said first and said second end structures at a front portion of said first and said second end structures, to be spaced above a ground surface, a rear panel being secured to said inner wall of said first and said second end structures at a rear portion of said first and said second end structures to be spaced above said ground surface, a base panel being secured to said inner wall of said first and said second end structures, said base panel being in contact with an inner surface of said front panel and an inner surface of said rear panel, said base panel including a top surface and a bottom surface, said base panel secured within said inner wall of said first and second end structures so that an air gap is maintained between said bottom surface and said ground surface, a seat panel secured to cover an upper portion of said first end structure, said second end structure, said front panel, and said rear panel, said first end structure, said second end structure, said front panel, said rear panel and said seat panel combining to define a box structure, said first end structure and said second end structure including legs for supporting said box structure above said ground surface, at least a portion of one of said first end structure, said second end structure, said front panel, said rear panel or said seat panel being pivotally secured to the adjacent panels for allowing access to an inner portion of said box structure, said inner portion of said box structure providing an enclosed storage area within said resin furniture assembly.

10. The resin furniture assembly of claim 9 wherein said first end structure, said second end structure, said front panel, said rear panel, said back panel, said base panel and said seat panel are formed from a resin plastic material by the process of blow molding to be fully enclosed hollow structural components.

11. The resin furniture assembly of claim 10 wherein said first end structure and said second end structure each include armrest stands extending outwardly from an upper edge wall to support an armrest, said armrest stands secured to edges of said back panel for supporting said back panel in a generally vertical orientation.

* * * * *